US012688493B2

(12) United States Patent
Barrett et al.

(10) Patent No.: US 12,688,493 B2
(45) Date of Patent: Jul. 21, 2026

(54) TECHNIQUES TO PROCESS CONTACTLESS CARD FUNCTIONS IN A MULTIPLE BANKING SYSTEM ENVIRONMENT

(71) Applicant: Capital One Services, LLC, McLean, VA (US)

(72) Inventors: Casey Scott Barrett, Kensington, MD (US); Kevin Osborn, Newton Highlands, MA (US); Wayne Lutz, Fort Washington, MD (US); Jonathan T. Blocksom, Reston, VA (US); Michael Wolf, Ellicott City, MD (US); Bob Uni Koshy, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 22 days.

(21) Appl. No.: 18/221,704

(22) Filed: Jul. 13, 2023

(65) Prior Publication Data

US 2023/0360023 A1 Nov. 9, 2023

Related U.S. Application Data

(63) Continuation-in-part of application No. 18/207,831, filed on Jun. 9, 2023.

(60) Provisional application No. 63/350,699, filed on Jun. 9, 2022, provisional application No. 63/351,652, filed on Jun. 13, 2022, provisional application No. 63/405,749, filed on Sep. 12, 2022, provisional application No. 63/388,859, filed on Jul. 13, 2022.

(51) Int. Cl.
*G06Q 20/40* (2012.01)
*G06Q 20/34* (2012.01)

*G06Q 20/38* (2012.01)
*H04L 9/40* (2022.01)

(52) U.S. Cl.
CPC ..... *G06Q 20/352* (2013.01); *G06Q 20/38215* (2013.01)

(58) Field of Classification Search
None
See application file for complete search history.

(56) References Cited

U.S. PATENT DOCUMENTS

| | | |
|---|---|---|
| 5,590,038 A | 12/1996 | Pitroda |
| 5,666,415 A | 9/1997 | Kaufman |
| 6,199,114 B1 | 3/2001 | White |
| 6,324,271 B1 | 11/2001 | Sawyer |

(Continued)

FOREIGN PATENT DOCUMENTS

| | | |
|---|---|---|
| CN | 101192295 A | 6/2008 |
| EP | 2711889 A2 | 3/2014 |

(Continued)

OTHER PUBLICATIONS

Notification of Transmittal of the International Search Report and the Written Opinion of the International Searching Authority issued in PCT/US2023/027687, mailed Oct. 20, 2023, 14 pages.

(Continued)

*Primary Examiner* — Bennett M Sigmond
*Assistant Examiner* — Bhavin D Shah
(74) *Attorney, Agent, or Firm* — KDW Firm PLLC; Andrew D. Kasnevich

(57) ABSTRACT

A system and techniques to perform functions within a multiple banking system environment utilizing switchboard routing.

20 Claims, 27 Drawing Sheets

(56)                    References Cited

U.S. PATENT DOCUMENTS

| | | |
|---|---|---|
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | Von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,582,386 B1 * | 3/2020 | Newman ............... H04L 63/061 |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2002/0116439 A1 | 8/2002 | Someshwar et al. |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0118483 A1 * | 5/2007 | Hill ...................... G06Q 20/382<br>705/64 |
| 2007/0276765 A1 | 11/2007 | Hazel |
| 2008/0082452 A1 | 4/2008 | Wankmueller |
| 2008/0099552 A1 | 5/2008 | Grillion |
| 2008/0162312 A1 * | 7/2008 | Sklovsky ........... G06Q 20/3278<br>705/1.1 |
| 2009/0143104 A1 | 6/2009 | Loh |
| 2009/0235339 A1 | 9/2009 | Mennes |
| 2009/0282264 A1 | 11/2009 | Amiel |
| 2011/0113245 A1 | 5/2011 | Varadarajan |
| 2011/0155801 A1 | 6/2011 | Rowberry |
| 2012/0011070 A1 | 1/2012 | Ward et al. |
| 2012/0143703 A1 | 6/2012 | Wall |
| 2012/0172026 A1 * | 7/2012 | Kwon ................. H04W 12/068<br>455/419 |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0189505 A1 * | 7/2015 | Marien ............... H04L 63/0846<br>380/270 |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2016/0078430 A1 | 3/2016 | Douglas |
| 2016/0125417 A1 | 5/2016 | Huang et al. |
| 2016/0189143 A1 | 6/2016 | Koeppel |
| 2016/0253651 A1 | 9/2016 | Park |
| 2016/0277383 A1 | 9/2016 | Guyomarc'h |
| 2016/0307189 A1 | 10/2016 | Zarakas |
| 2016/0314472 A1 | 10/2016 | Ashfield |
| 2016/0379217 A1 | 12/2016 | Hammad |
| 2017/0017957 A1 | 1/2017 | Radu |
| 2017/0039566 A1 | 2/2017 | Schipperheijn |
| 2017/0068950 A1 | 3/2017 | Kwon |
| 2017/0243197 A1 | 8/2017 | Salvador |
| 2017/0330173 A1 | 11/2017 | Woo |
| 2018/0039987 A1 | 2/2018 | Molino |
| 2018/0268132 A1 | 9/2018 | Buer |
| 2018/0300716 A1 | 10/2018 | Carlson |
| 2019/0172055 A1 | 6/2019 | Hale |
| 2019/0243972 A1 * | 8/2019 | Krylov ................... G06N 20/00 |

(56)                    References Cited

U.S. PATENT DOCUMENTS

| | | |
|---|---|---|
| 2019/0303945 A1 | 10/2019 | Mitra |
| 2020/0104842 A1 | 4/2020 | Osborn et al. |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0189234 A1 | 6/2022 | Herrington et al. |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| GB | 2516861 A | 2/2015 |
| GB | 2551907 A | 1/2018 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

EMVCo, LLC, "EMV Card Personalization Specification," Specification version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, LLC, "EMV Card Personalisation Specification", Aug. 1, 2021, pp. 1-114, Retrieved from the Internet: URL:https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HAMC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

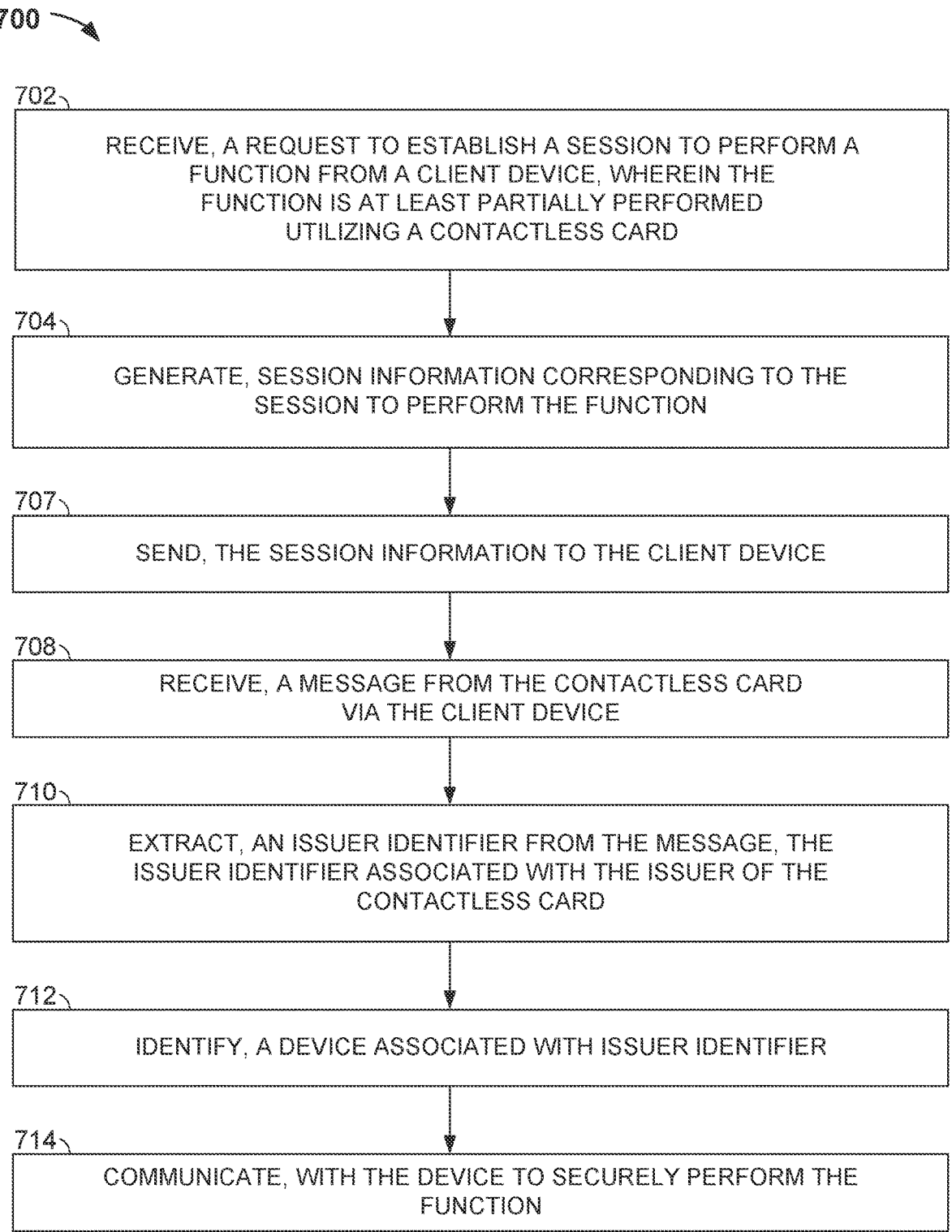

700

702
RECEIVE, A REQUEST TO ESTABLISH A SESSION TO PERFORM A FUNCTION FROM A CLIENT DEVICE, WHEREIN THE FUNCTION IS AT LEAST PARTIALLY PERFORMED UTILIZING A CONTACTLESS CARD

704
GENERATE, SESSION INFORMATION CORRESPONDING TO THE SESSION TO PERFORM THE FUNCTION

707
SEND, THE SESSION INFORMATION TO THE CLIENT DEVICE

708
RECEIVE, A MESSAGE FROM THE CONTACTLESS CARD VIA THE CLIENT DEVICE

710
EXTRACT, AN ISSUER IDENTIFIER FROM THE MESSAGE, THE ISSUER IDENTIFIER ASSOCIATED WITH THE ISSUER OF THE CONTACTLESS CARD

712
IDENTIFY, A DEVICE ASSOCIATED WITH ISSUER IDENTIFIER

714
COMMUNICATE, WITH THE DEVICE TO SECURELY PERFORM THE FUNCTION

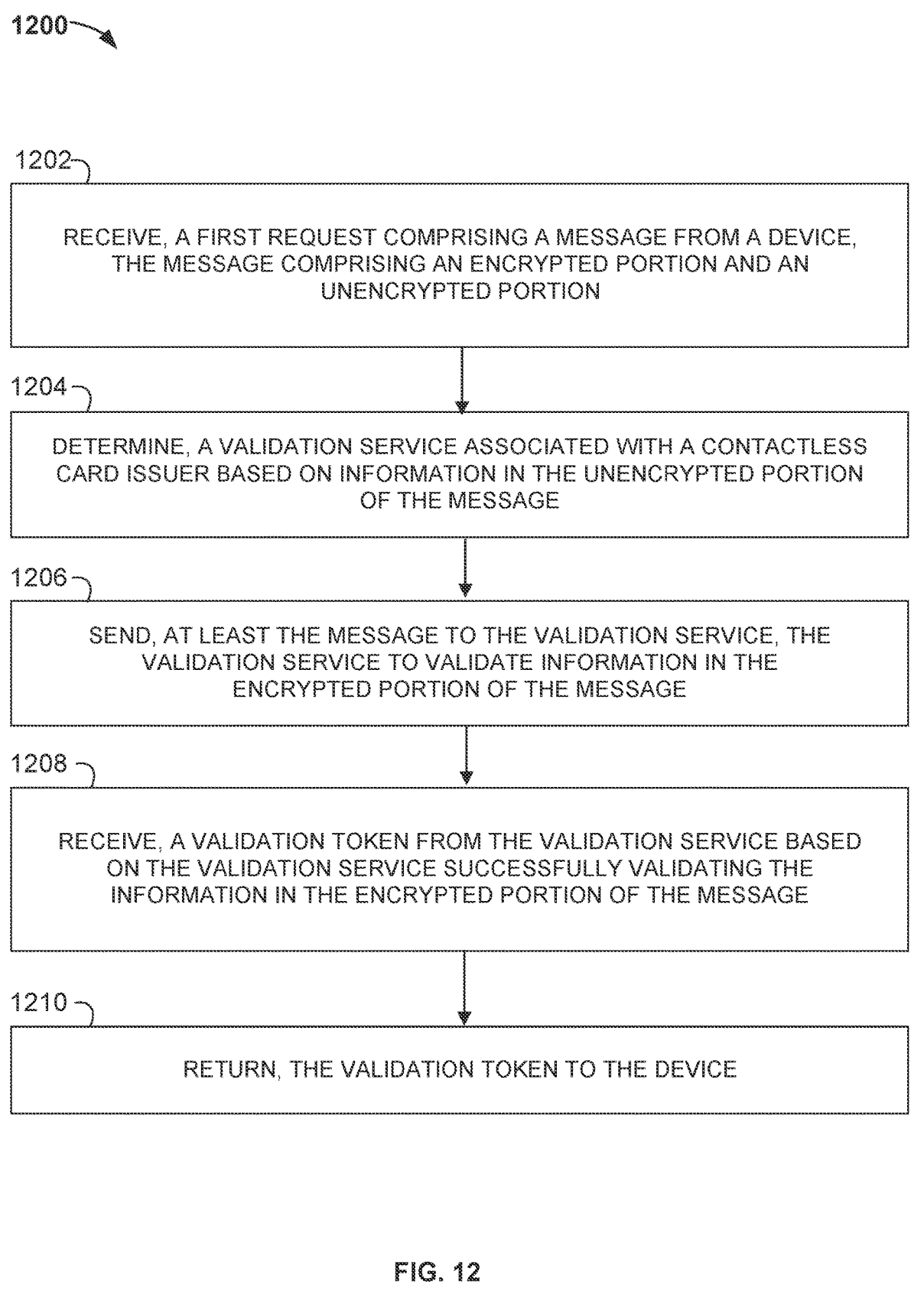

RECEIVE, A FIRST REQUEST COMPRISING A MESSAGE FROM A DEVICE, THE MESSAGE COMPRISING AN ENCRYPTED PORTION AND AN UNENCRYPTED PORTION

1204

DETERMINE, A VALIDATION SERVICE ASSOCIATED WITH A CONTACTLESS CARD ISSUER BASED ON INFORMATION IN THE UNENCRYPTED PORTION OF THE MESSAGE

1206

SEND, AT LEAST THE MESSAGE TO THE VALIDATION SERVICE, THE VALIDATION SERVICE TO VALIDATE INFORMATION IN THE ENCRYPTED PORTION OF THE MESSAGE

1208

RECEIVE, A VALIDATION TOKEN FROM THE VALIDATION SERVICE BASED ON THE VALIDATION SERVICE SUCCESSFULLY VALIDATING THE INFORMATION IN THE ENCRYPTED PORTION OF THE MESSAGE

1210

RETURN, THE VALIDATION TOKEN TO THE DEVICE

FIG. 12

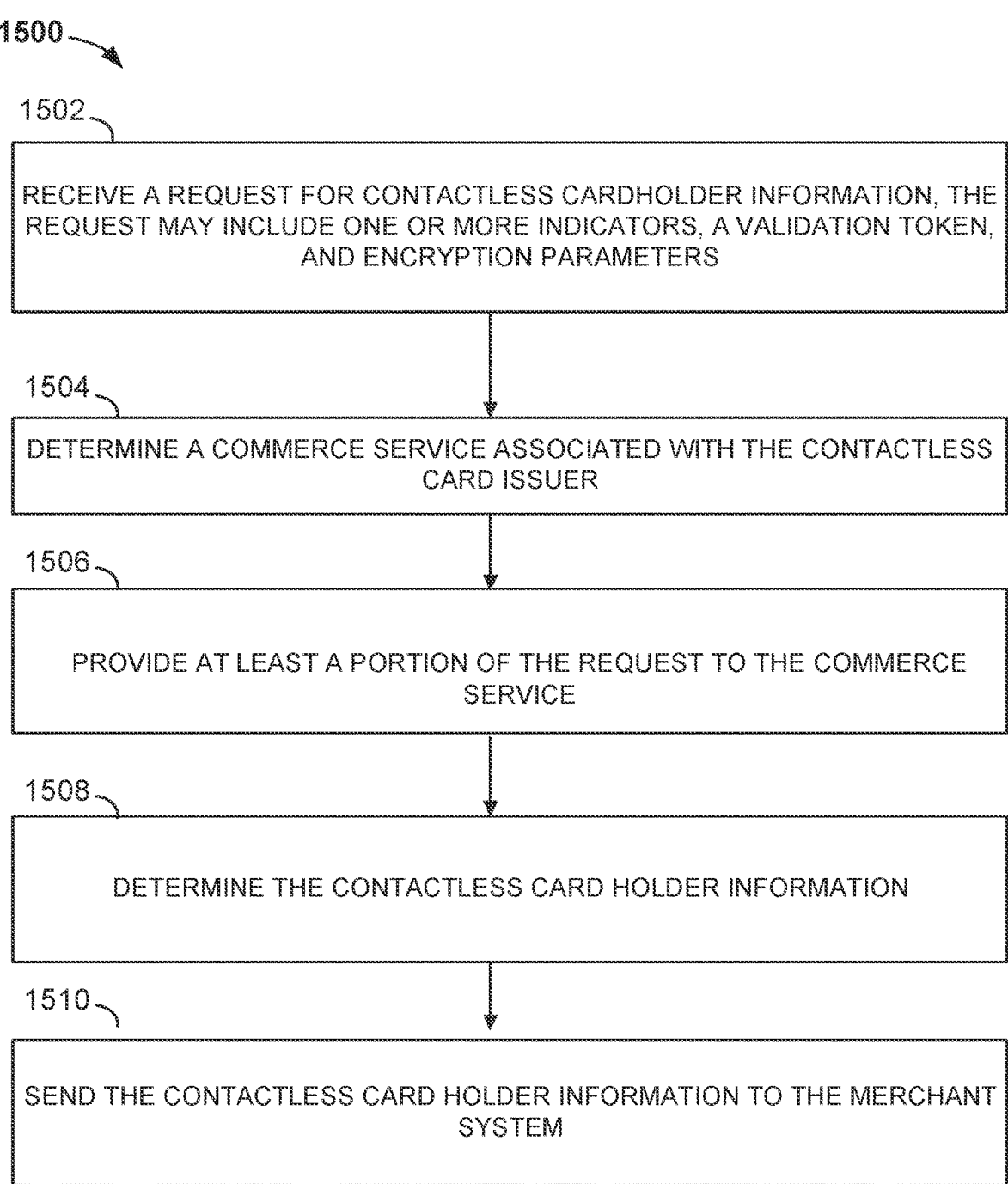

1500

1502

RECEIVE A REQUEST FOR CONTACTLESS CARDHOLDER INFORMATION, THE REQUEST MAY INCLUDE ONE OR MORE INDICATORS, A VALIDATION TOKEN, AND ENCRYPTION PARAMETERS

1504

DETERMINE A COMMERCE SERVICE ASSOCIATED WITH THE CONTACTLESS CARD ISSUER

1506

PROVIDE AT LEAST A PORTION OF THE REQUEST TO THE COMMERCE SERVICE

1508

DETERMINE THE CONTACTLESS CARD HOLDER INFORMATION

1510

SEND THE CONTACTLESS CARD HOLDER INFORMATION TO THE MERCHANT SYSTEM

Figure 20:
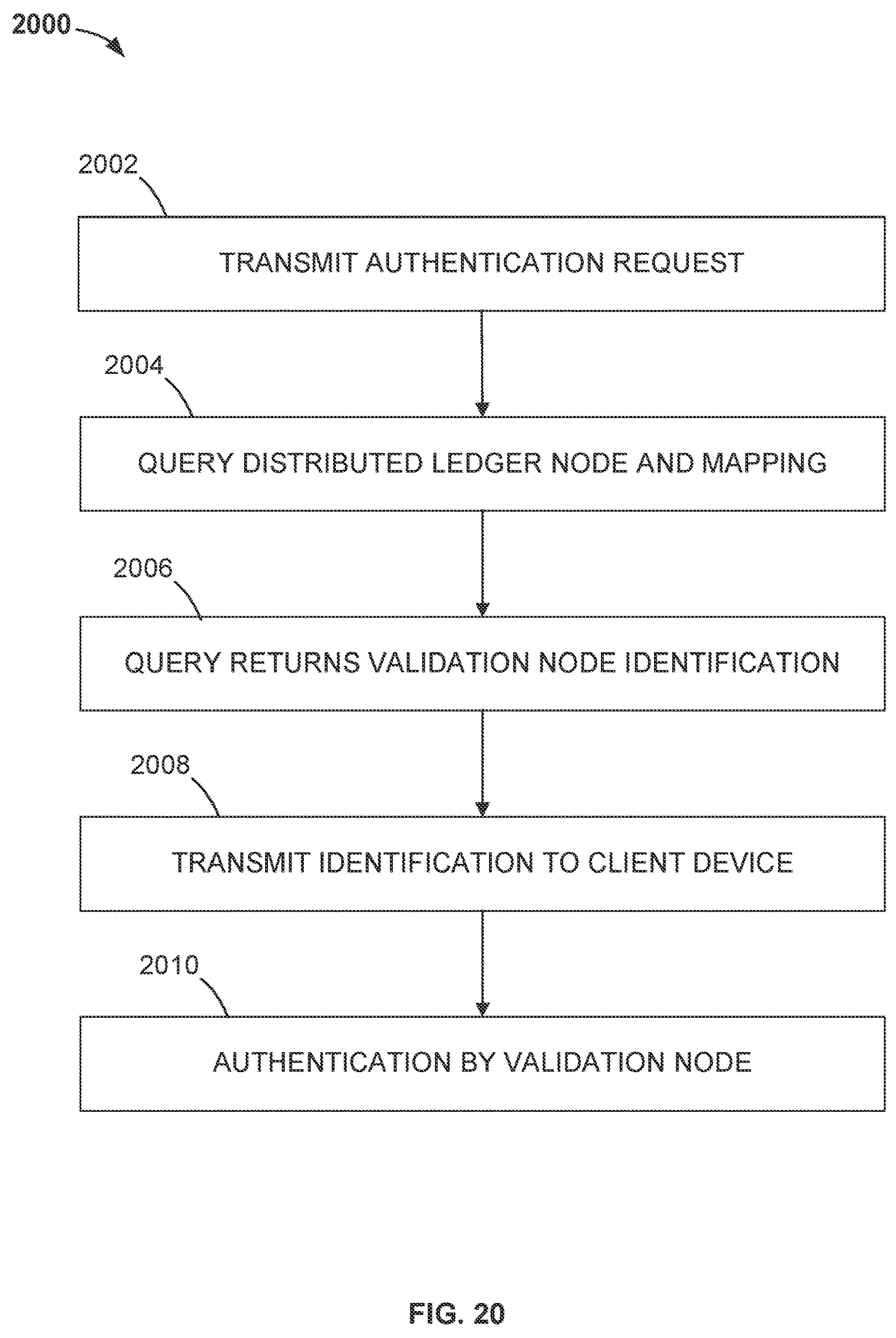

TRANSMIT AUTHENTICATION REQUEST

2004

QUERY DISTRIBUTED LEDGER NODE AND MAPPING

2006

QUERY RETURNS VALIDATION NODE IDENTIFICATION

2008

TRANSMIT IDENTIFICATION TO CLIENT DEVICE

2010

AUTHENTICATION BY VALIDATION NODE

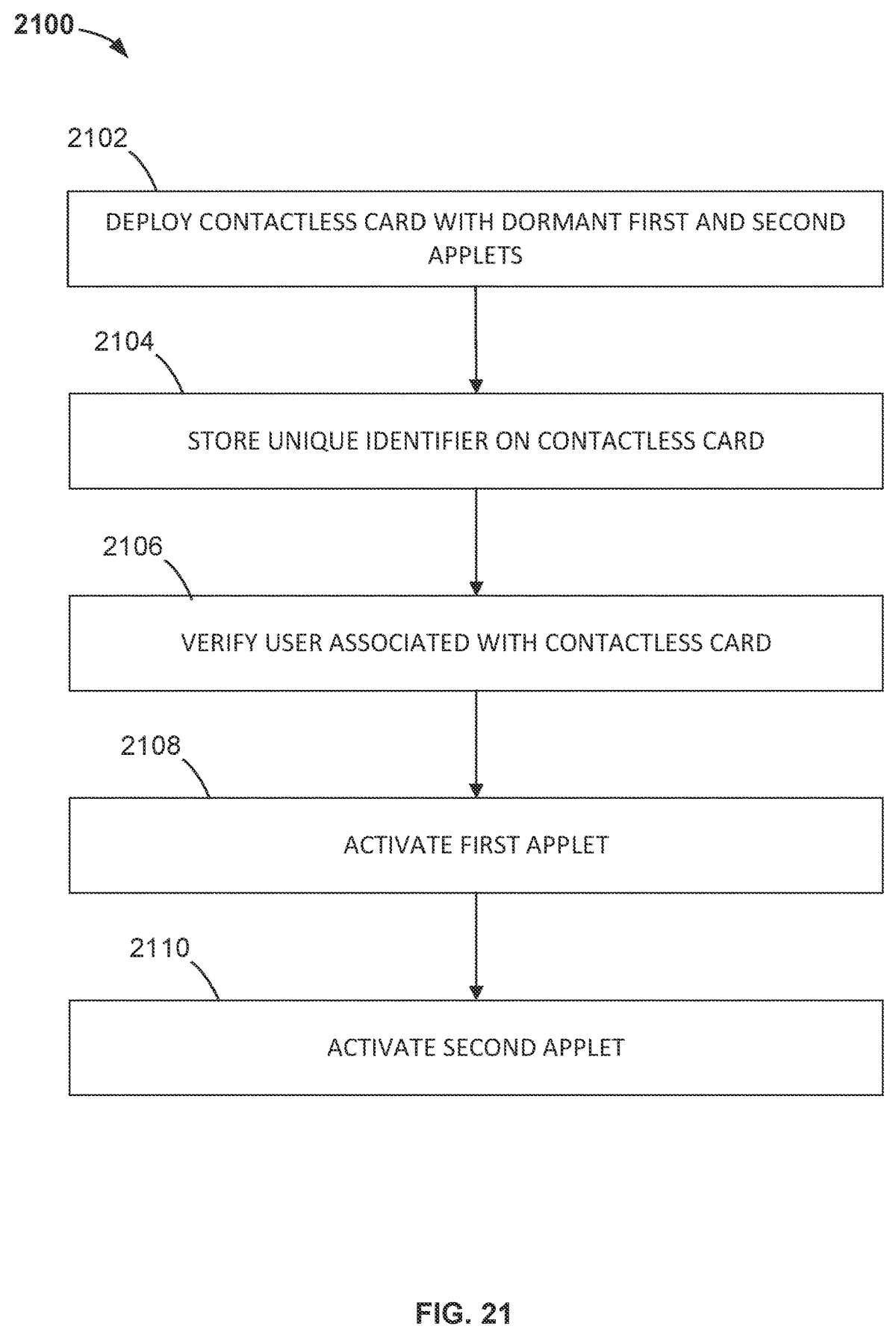

DEPLOY CONTACTLESS CARD WITH DORMANT FIRST AND SECOND APPLETS

2104

STORE UNIQUE IDENTIFIER ON CONTACTLESS CARD

2106

VERIFY USER ASSOCIATED WITH CONTACTLESS CARD

2108

ACTIVATE FIRST APPLET

2110

ACTIVATE SECOND APPLET

FIG. 21

TECHNIQUES TO PROCESS CONTACTLESS CARD FUNCTIONS IN A MULTIPLE BANKING SYSTEM ENVIRONMENT

This application is a continuation-in-part of U.S. Pat. No. 18,207,831, filed Jun. 9, 2023, which claims priority to U.S. Provisional Patent Application No. 63/350,699, filed on Jun. 9, 2022, U.S. Provisional Patent Application No. 63/351, 652, filed on Jun. 13, 2022, and U.S. Provisional Patent Application No. 63/405,749, filed on Sep. 12, 2022, the disclosures of which are incorporated herein in their entireties. This application claims priority to U.S. Provisional Patent Application No. 63/388,859, filed on Jul. 13, 2022, the disclosure of which is incorporated herein in its entirety.

BACKGROUND

Contactless card products have become so universally well-known and ubiquitous that they have fundamentally changed the manner in which financial transactions and dealings are viewed and conducted in society today. Contactless card products are most commonly represented by plastic or metal card-like members that are offered and provided to customers through credit card issuers (such as banks and other financial institutions). With a card, an authorized customer or cardholder is capable of purchasing services and/or merchandise without an immediate, direct exchange of cash. Data security and transaction integrity are of critical importance to businesses facilitating these transactions and to the customers. This need continues to grow as electronic transactions performed with contactless cards constitute an increasingly large share of commercial activity. Accordingly, there is a need to provide businesses and users with an appropriate solution that overcomes current deficiencies to provide data security, authentication, and verification for contactless card.

BRIEF SUMMARY

In one aspect, a computer-implemented method includes receiving, by a node in a system, a request to establish a session to perform a function from a client device, where the function is at least partially performed utilizing a contactless card, generating, by the node, session information corresponding to the session to perform the function, where the session information includes a nonce and a signed session token, sending, by the node, the session information to the client device, receiving, by the node, a message from the contactless card via the client device, extracting, by the node, an issuer identifier from the message, the issuer identifier associated with the issuer of the contactless card, identifying, by the node, a device associated with issuer identifier, and communicating, by the node, with the device to securely perform the function.

In one aspect, a computing apparatus includes a processor. The computing apparatus also includes memory storing instructions that, when executed by the processor, cause the processor to receive a request to establish a session to perform a function from a client device, where the function is at least partially performed utilizing a contactless card, generate session information corresponding to the session to perform the function, where the session information includes a nonce and a signed session token, send the session information to the client device, receive a message from the contactless card via the client device, extract an issuer identifier from the message, the issuer identifier associated with the issuer of the contactless card, identify a device associated with issuer identifier, and communicate with the device to securely perform the function.

In one aspect, a non-transitory computer-readable storage medium, the computer-readable storage medium including instructions that, when executed by a computer, cause the computer to receive a request to establish a session to perform a function from a client device, where the function is at least partially performed utilizing a contactless card, generate session information corresponding to the session to perform the function, where the session information includes a nonce and a signed session token, send the session information to the client device, receive a message from the contactless card via the client device, extract an issuer identifier from the message, the issuer identifier associated with the issuer of the contactless card, identify a device associated with issuer identifier, and communicate with the device to securely perform the function.

In one aspect, a computer-implemented method includes reading, by a computing apparatus after entry of a contactless card into a communication field, the contactless card, selecting, by the computing apparatus based on the read of the contactless card, an applet stored in a memory of the contactless card, transmitting, by the computing apparatus to the contactless card, a first command, and transmitting, by the computing apparatus to the contactless card, a second command.

In one aspect, a computing system includes a computing apparatus including a processor and a memory. The memory of the computing apparatus stores instructions that, when executed by the processor, cause the processor to read, after entry of a contactless card into the communication field, the contactless card, select, based on the read of the contactless card, an applet stored in a memory of the contactless card, transmit, to the contactless card, a first command, and transmit, to the contactless card, a second command.

In one aspect, a non-transitory computer-readable storage medium, the computer-readable storage medium stores instructions that, when executed by a computing apparatus, cause the computing apparatus to perform procedures. The procedures includes reading, after entry of a contactless card into a communication field, the contactless card, selecting, based on the read of the contactless card, an applet stored in a memory of the contactless card, transmitting, to the contactless card, a first command, and transmitting, to the contactless card, a second command.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates an example of a routine 700 in accordance with embodiments.

FIG. 12 illustrates an example of a routine 1200 in accordance with embodiments.

FIG. 15 illustrates an example of a routine 1500 in accordance with one embodiment.

FIG. 20 illustrates an example of a routine 2000 in accordance with embodiments.

FIG. 21 illustrates an example of a routine 2100 in accordance with embodiments.

DETAILED DESCRIPTION

Figure 1:
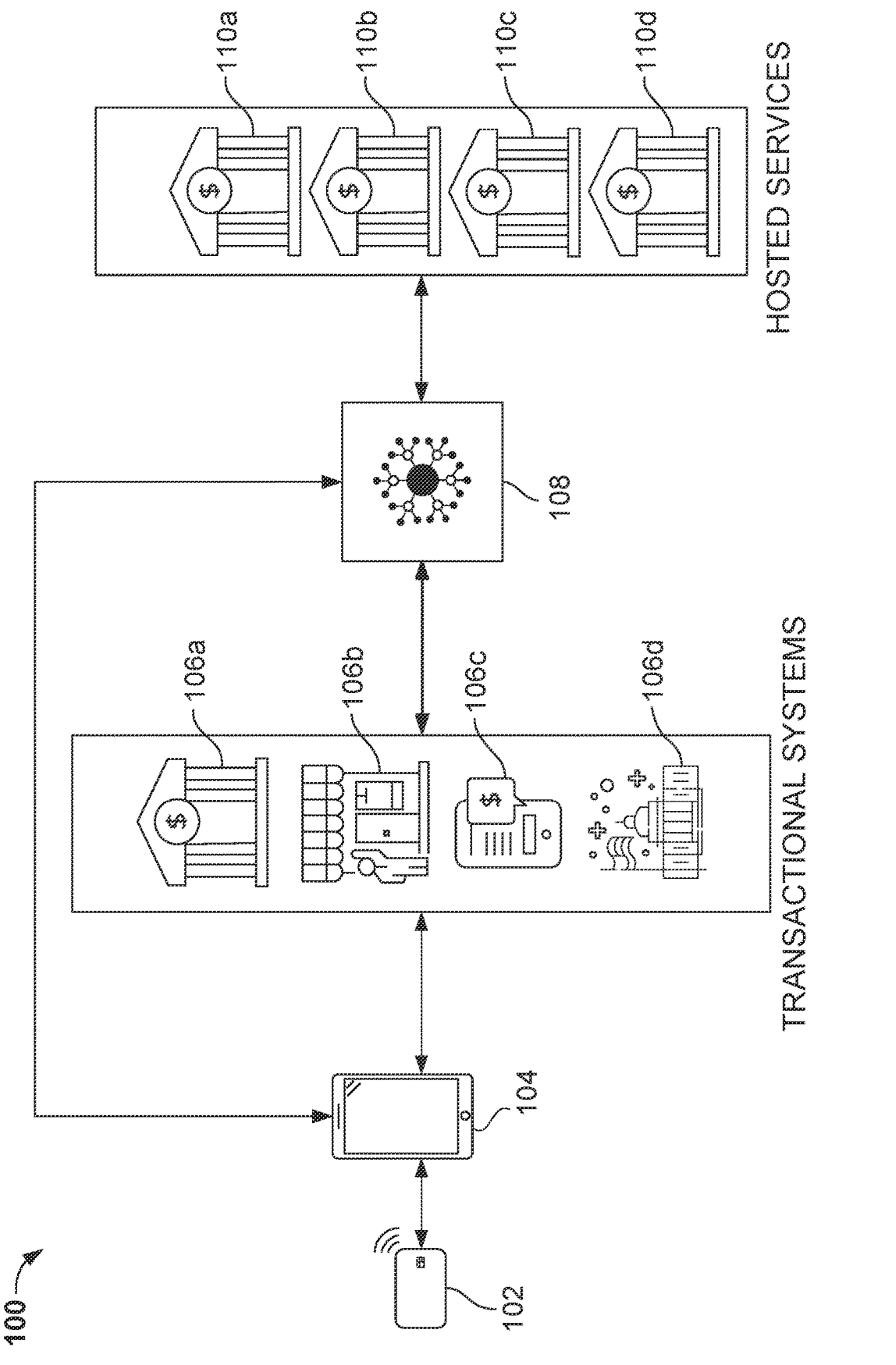
FIG. 1 illustrates an example of a system 100 in accordance with embodiments.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the exemplary embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will understand that the described features, advantages, and characteristics of any embodiment can be interchangeably combined with the features, advantages, and characteristics of any other embodiment.

Embodiments may be generally directed, enabling contactless card functions in a multi-issuer computing environment. These functions may include tap-to functions where a user may tap their contactless card on a device, such as a mobile device, to perform a function. For example, a user may utilize their contactless card to verify their identity, perform a payment, launch applications, login into applications, autofill a form or field, navigate to a specified web location or app on a device, unlock a door, initiate a contactless card, and so forth.

The systems discussed here may enable users to perform these functions in a multi-issuer environment. Further, the systems discussed herein enable card issuers, such as banks, to issue contactless cards with tap-to functions to customers while maintaining high-level security. The systems discussed differ from previous solutions because they provide a single platform for multiple issuers or banks to provide the tap-to functionality. Traditionally, each issuer or bank would be required to set up and maintain their own systems to provide contactless card features. This includes maintaining their own hardware, software, databases, security protocols, and so forth, which can become extremely costly for the issuer or banks to maintain. However, the embodiments discussed enable issuers or banks to offload much of the processing, storage, and security functionality to a neutral or central system. As will be discussed in more detail, the central system is configured to provide contactless card features for multiple issuers while maintaining a high level of security and data integrity. Each issuer's functionality and data may be separately managed and secured such that another issuer or bank cannot access another issuer's data or functions. As will be discussed in more detail, these features may be provided by a switchboard system that is configured to process and perform each contactless card function in a secure manner. Additional benefits for issuers may include providing a highly secure authentication option for mobile web, which typically lack the robust authentication options available in a native application.

Further, embodiments discussed herein support tap-to mobile web experiences on both major mobile platforms (iOS®, Android®) by leveraging App Clips® and Javascript® SDK with WebNFC®. For iOS®, embodiments include providing a tap-to software development kit, including functions and services to perform the operations discussed herein on the iOS® platform. The SDK may be installed into the host application, e.g., a native app or web browser app, and includes App Clip® support. The SDK provides functional support for near-field communication between the mobile device and contactless card, installing a native app via App Clips®, and functionality to obscure data and/or portions of a display. In one example, the SDK may be configured to download and install the app from an app store, such as the Apple® App Store.

In the Android® operating system environment, embodiments include utilizing a JavaScript SDK and the native Android SDK. The JavaScript SDK may be installed into a website, e.g., via website source code or app. The JavaScript SDK also includes functions to support NFC communications between the mobile device contactless card via WebNFC®. The JavaScript SDK may also include functions to provide customizable user interface (UI) capabilities and obfuscation. In embodiments, the JavaScript SDK supports websites utilizing Hypertext Transfer Protocol Secure (HTTPS) and supports the React® library. Embodiments are not limited in this manner, and UIs libraries may be supported. Embodiments further include utilizing the native Android SDK, which may be implemented in an application on a device, e.g., a mobile device. The Android SDK may aid an application and/or a website via a web browser with wireless communication with devices, such as contactless cards. The Android SDK also enables an application or web browser to communicate and utilize other foundational Android services, e.g., operating system and low-level services. Embodiments are not limited to these examples.

The systems and methods described herein provide data security, authentication, and verification for contactless cards and provide many advantages. For example, the systems and methods described herein allow for card tap requests to be routed to many different card validators through the addition of an issuer identification to a data payload communicated between the card and various other devices (e.g., clients devices and/or servers).

As another example, personalization of the card can be decoupled from validation of the card, which advantageously permits for multiple entities to perform validation securely, consistently, and without the unnecessary exchange of sensitive data. In some examples described herein, the decoupling of card personalization from validation may be achieved by adding a key identifier to a data payload communicated between the card and various other devices (e.g., clients devices and/or servers). In other examples described herein, the decoupling of card personalization from validation may be achieved by deriving a shared secret from a master key. In yet other examples described herein, the decoupling of card personalization from validation may be achieved by avoiding the use of the permanent account number (PAN) sequence number (PSN) for key derivation.

As another example, a challenge may be incorporated to advantageously avoid or reduce the risk of preplay and/or replay attacks. In some examples, a challenge may be generated and linked to a session, and then written to the card. The challenge can be used in generating encrypted a data, such as a cryptogram, and session validation can be added to the validation logic.

As further examples, additional improvements to data security, authentication, and validation can be made. For example, a NFC specification, a dormant applet, a signed hash of the card product customer identifier, a centralized validator, and generic cryptography may be advantageously used.

All of the foregoing examples provide many advantages with respect to data security, authentication, and verification for contactless cards. It is understood that these and further advantages may be achieved by a combination of one or more of the foregoing examples.

With general reference to notations and nomenclature used herein, one or more portions of the detailed description which follows may be presented in terms of program procedures executed on a computer or network of computers. These procedural descriptions and representations are used by those skilled in the art to convey the substances of their work most effectively to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 illustrates an example of a multi-issuer system 100 configured to operate in accordance with the embodiments discussed herein. The system 100 may include computing systems configured to enable functions to be performed with contactless cards, such as the contactless card 102 and cryptographic techniques discussed herein. These functions may include performing transactions, and other functions, such as verification of the user and tap-to functions. Tap-to functions may include tapping to autofill fields on a mobile device, tapping to launch applications on a mobile device, tapping to open doors, tapping to activate a card, tapping to generate and issue a virtual card number (VCN), and other tap-to operations.

System 100 illustrates a high-level configuration that enables multiple users to use contactless cards issued by one or more issuers to perform operations, including transactions with merchant systems. In the illustrated example, system 100 includes a number of banking systems 106a, retail systems 106b, other financial systems 106c, and government systems 106d. These transactional systems may be configured for users to perform transactions to purchase goods and services with contactless cards. Additionally, these systems may be configured to provide verification services to the customer via their contactless cards. Embodiments are not limited in this manner.

The system 100 may be configured to perform various operations for customers, issuing banks, merchants, etc. These operations may be initiated by the customer using the contactless card 102 causing an exchange of information between the contactless card 102 and the other systems of system 100. Depending on which operation is being performed, e.g., tap to launch an application, tap to autofill text, tap to authenticate, tap to perform a transaction, tap to provide (autofill) a VCN, etc., data may be routed and sent to the various systems of the system 100 to perform their respective operations.

For example, a contactless card 102 may initiate a transaction with one of the merchant systems when tapped on another device, such as mobile device 104, that may be further configured to communicate with one of the other systems, such as the hosted service(s). These services may include verification services and commerce services. However, embodiments are not limited in this manner. Other services may be configured to perform operations such that a customer can perform any number of taps to functions.

As will be discussed in more detail, the mobile device 104 may communicate data from the contactless card 102 to another system(s), such as one or more of the services 110 that are configured to provide transaction services and other operations. The data may be routed to a particular service 110 by the switchboard system 108 in a secure encrypted manner, as will be discussed herein. In embodiments, the data may be provided in a cryptogram.

To provide services in a multi-issuer environment, the system 100 includes a switchboard system 108 or hub system configured to communicate data between the systems (bank, retailer, other financial institutes, government, etc.) and participating banks' backend processing services. The switchboard system 108 enables any number of banks and different financial institutions to issue contactless cards with transactional functionality, verification functionality, and so forth and operate seamlessly to perform operations while maintaining a high level of security with sensitive data. As will be discussed in more detail, the switchboard system 108 enables mobile devices, and merchant systems, a central system of communication to communicate with many issuing banks' data to perform transactions and other functions.

For example, a customer may wish to perform a transaction for a goods or service (retailer system 106*b*). The customer may initiate the transaction via their mobile device or interaction with a point-of-sale (POS) terminal. The device or terminal may send a message for the transaction to the switchboard system 108, which may determine how further to process the message and complete the transaction. The message may include an encrypted portion and an unencrypted portion. The encrypted portion may include sensitive data that may be used by the issuing banking system functions to process the transaction, and the unencrypted portion may include data that may be used by the switchboard system 108 to route the message and data to the correct issuing banking system functions via application programming interfaces and services, such as commerce services. The switchboard system 108 may communicate with mobile device 104 and then with the merchant backend system (106) to first verify the contactless card and the user, establish a commerce session between the mobile device, commerce services, and a merchant system, and enable the performance of a transaction in a secure manner.

In embodiments, a switchboard system 108 may also include administrative services that may be utilized to onboard card issuers, validators, and merchants onto the system to provide contactless card services. In one example, the switchboard system may onboard an issuer/validator by generating a unique identifier to identify the issuer/validator and storing a mapping between the unique identifier and issuer/validator in a data store, such as validation HSM. The unique identifier may also be provided to an issuer system such that the issuer may provide the unique identifier on each contactless card to provide during transactions and other operations.

Any number of banks or financial institutions may provide a number of services 110 or functions that may be utilized by the customers, merchants, and the banks to provide services 110, including processing transactions and verifying customers and their contactless cards. These services may include validation services and commerce services. These services may be hosted on a central platform, such as a cloud-based system, and each bank may have its own set of services. Further, each bank's services 110 may be hosted by the same central platform, and the switchboard system 108 may determine which bank's services 110 to call via an API based on information in the messages.

In embodiments, the system 100 may also perform onboarding operations to onboard merchants and merchant systems to operate with the switchboard system 108 environment. In embodiments, onboarding a merchant may include generating a unique identifier associated with the merchant and providing the unique identifier to the merchant, e.g., issuing a merchant certificate. The system 100 may also enable merchants and issuers to exchange data, such as key pairs, to securely perform operations without sensitive data being revealed to the switchboard system 108. System 100 may also enable merchants to configure and set one or more configurations, such as configuring data fields to support merchant use cases.

The system 100 may also perform onboarding operations for card issuers. For example, the system 100 may enable banks or card issuers to generate a unique identifier, e.g., issuer id, that may be used to uniquely identify the issuer when performing validation and other functions. The system 100 may also enable a bank or issuer to generate and/or distribute key pairs with merchants and other service providers. These and other details will be described in the following description.

Figure 2:
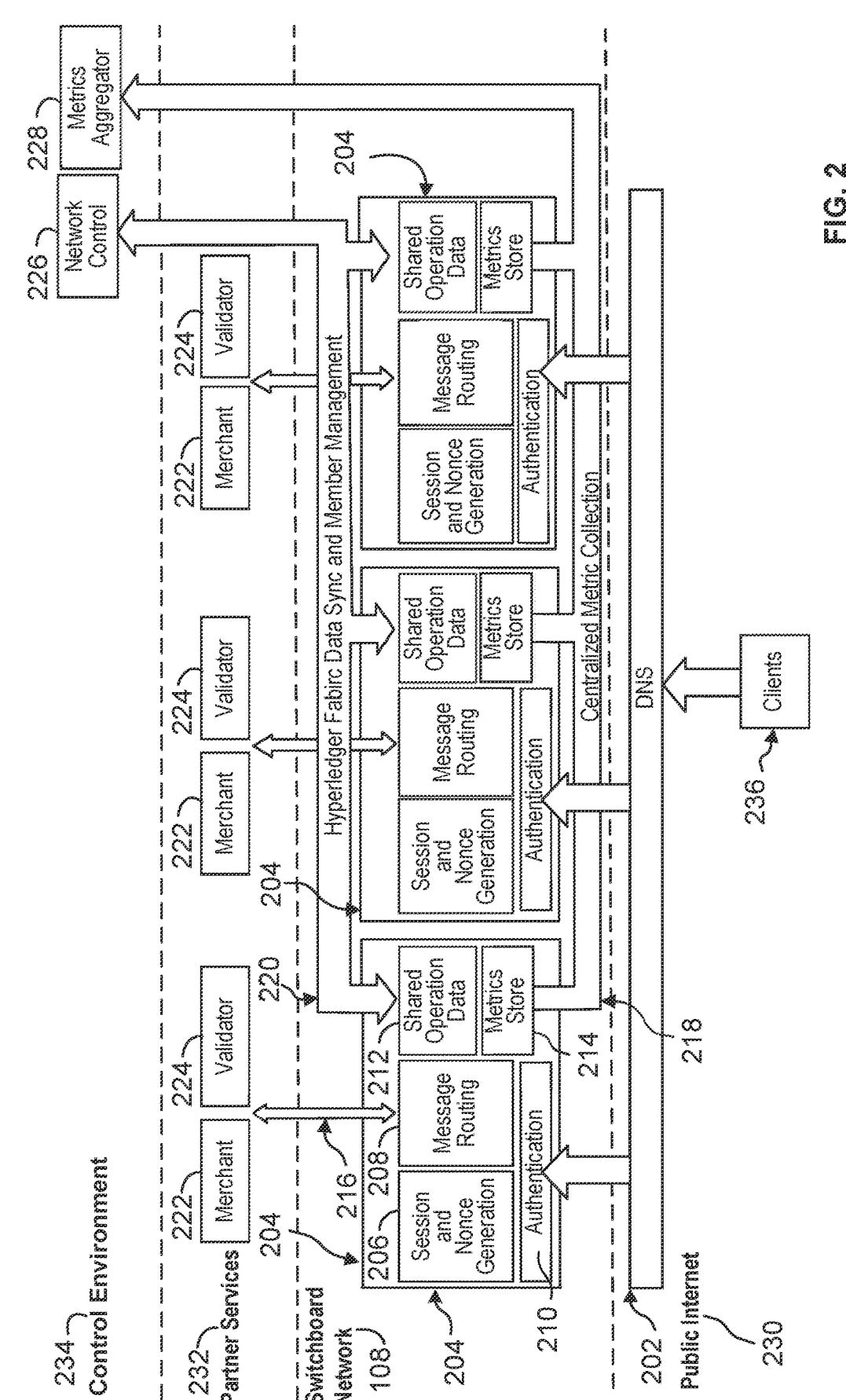
FIG. 2 illustrates an example of a system 200 configured to operate in accordance with embodiments.

FIG. 2 illustrates an example of system 200 in accordance with the embodiments discussed herein. The system 200 includes additional devices and systems configured to enable contactless card issuers to tap-to-card services. Specifically, system 200 enables any number of issuer systems to provide card services to their clients through a switching fabric, i.e., the switchboard system 108 in a secure and safe manner.

In embodiments, the switchboard system 108 includes one or more nodes 204 configured to perform routing operations. Each switchboard node 204 may include a session and nonce generator 206, a message router 208, a 210, an operation data 212 store, and a metrics store 214. Further, each of the nodes may be configured the same and share configurations, but each switchboard node 204 may independently process and route messages and requests to the appropriate systems, such as the merchant systems and issuer systems. Each of the nodes 204 is configured to act as a broker of trust between an issuer system, the merchant system 222, and/or validation system 224, for example. Each switchboard node 204 is configured to route each message to the correct issuer system while maintaining data security. For example, a switchboard node 204 may route a message between an issuer system and merchant system while the node is not able to gain access to the private data in the message.

The switchboard system 108 may be configured as a server system including a collection of hardware, software, and networking components that work together to provide services to the clients. Hardware components may include one or more server computers, storage devices, and network adapters. The server computers are configured to run server applications, such as those executable on each of the nodes 204. In some instances, each of the server computers may be configured to operate one or more nodes, e.g., in a virtual environment. The storage devices are configured to store data that is accessed by the applications, and the network adapters are used to connect the server computer to the network.

Each of the server computers may be configured to execute software, including the operating system, the applications, and security software. The networking components of a server system include the network switch, router, and firewall. The network switch is used to connect the server computers to other devices on the network. The router is used to route traffic between different networks. The firewall is used to protect the server system from unauthorized access and attacks.

Figure 3:
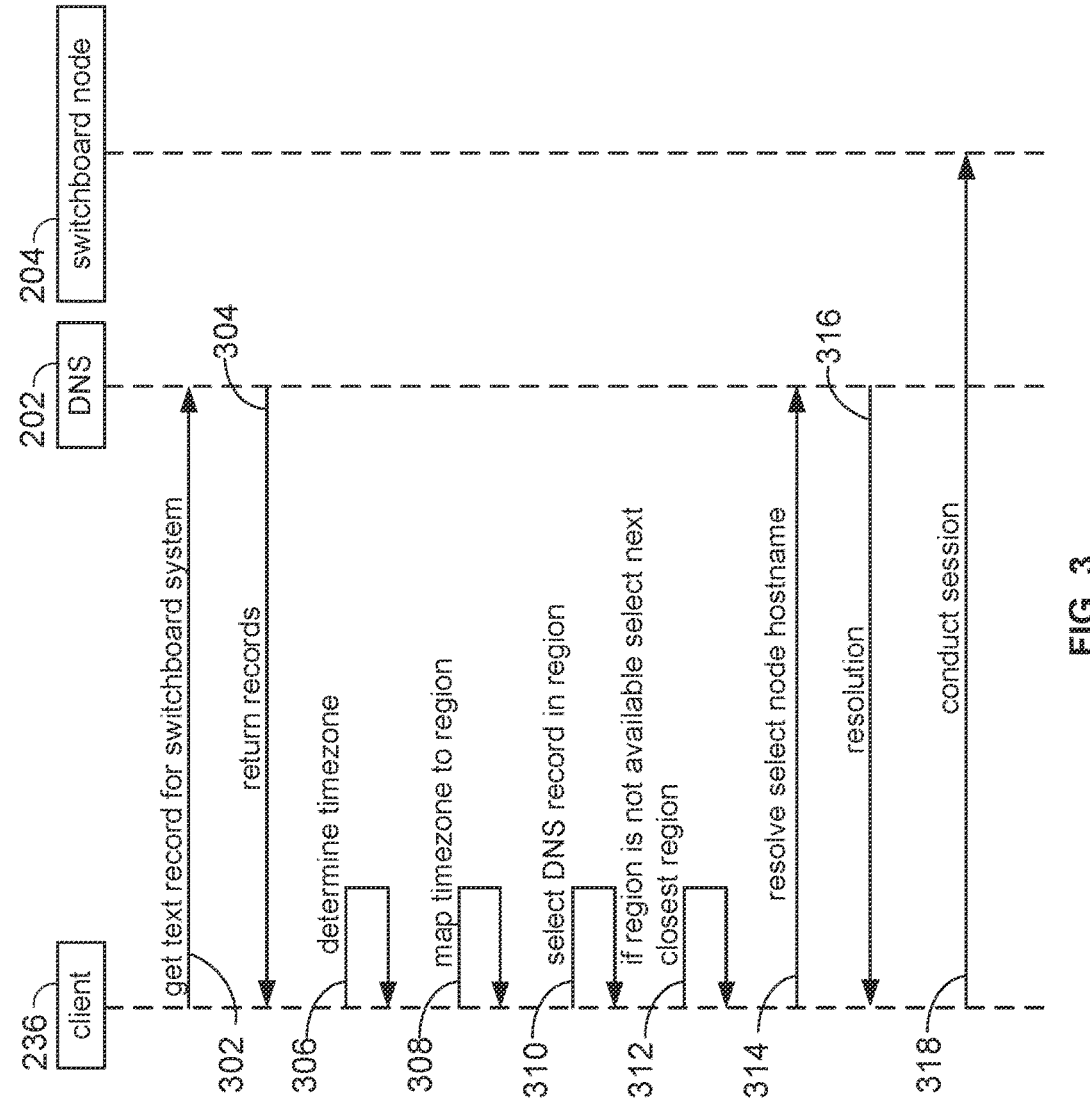
FIG. 3 illustrates an example of sequence 300 in accordance with embodiments.

In some embodiments, the nodes 204 may operate in a cloud-based computing environment, e.g., a collection of hardware, software, and networking components that enable the delivery of cloud computing services. The switchboard nodes 204 and the computing services are delivered over the Internet, and they can be accessed from anywhere in the world with an Internet connection. In embodiments, a client 236 may access a switchboard node 204 through Domain Name System 202 or domain name system (DNS). The DNS 202 a hierarchical and distributed naming system for computers, services, and other resources connected to the Internet or other networks. It associates various information with domain names assigned to each registered participant. In one example, the DNS 202 may translate a name known to software executing on a client 236 to route data to one or more of switchboard node 204 of the switchboard system 108. In embodiments, the DNS 202 may generate into a number, such as an Internet Protocol (IP) address, an address record (A-record), or another Host name (C-name record). FIG. 3 illustrates one example sequence 300 for a client to identify and resolve an identifier for one of the nodes 204 of the switchboard system 108. At a high level, the Domain Name System 202 translates known domain names to numerical Internet Protocol (IP) addresses needed for locating and identifying computer services and devices with the underlying network protocols. Clients use the global DNS system to select the best node to use, as discussed in the sequence 300.

In embodiments, a client sdk 236 communicates with the switchboard system 108 to perform one or more of the partner services 232, such as conducting a transaction with a merchant, validate the customer, or other tap-to functions. Once the client sdk 236 identifies a switchboard node 204 and resolves an address to communicate with the switchboard node 204, the client sdk 236 may send one or more messages to the switchboard node 204 to authenticate and perform the operation. The switchboard node 204 includes an authentication 210 function that is configured to authenticate the client sdk 236. In embodiments, the client sdk 236 sends a message or authorization request to the switchboard node 204 with the following header set:

X-Sb-Api-Key: <CLIENT API KEY>
X-Sb-Dvc-Fngrprnt: Device-specific device fingerprint
The CLIENT API KEY may have the following example structure: 65535-GReyx5BuEAaE72bWbFZJfHRL8Dbt1Uum, where table 1 describes the value, name, and meaning:

TABLE 1

| Value | Name | Meaning |
|---|---|---|
| 65535 | Client ID | Individual identifier of client |
| GReyx5BuEAaE72bWbFZJfHRL8Dbt1Uum | Client Key | Randomly assigned key |

Figure 4A:
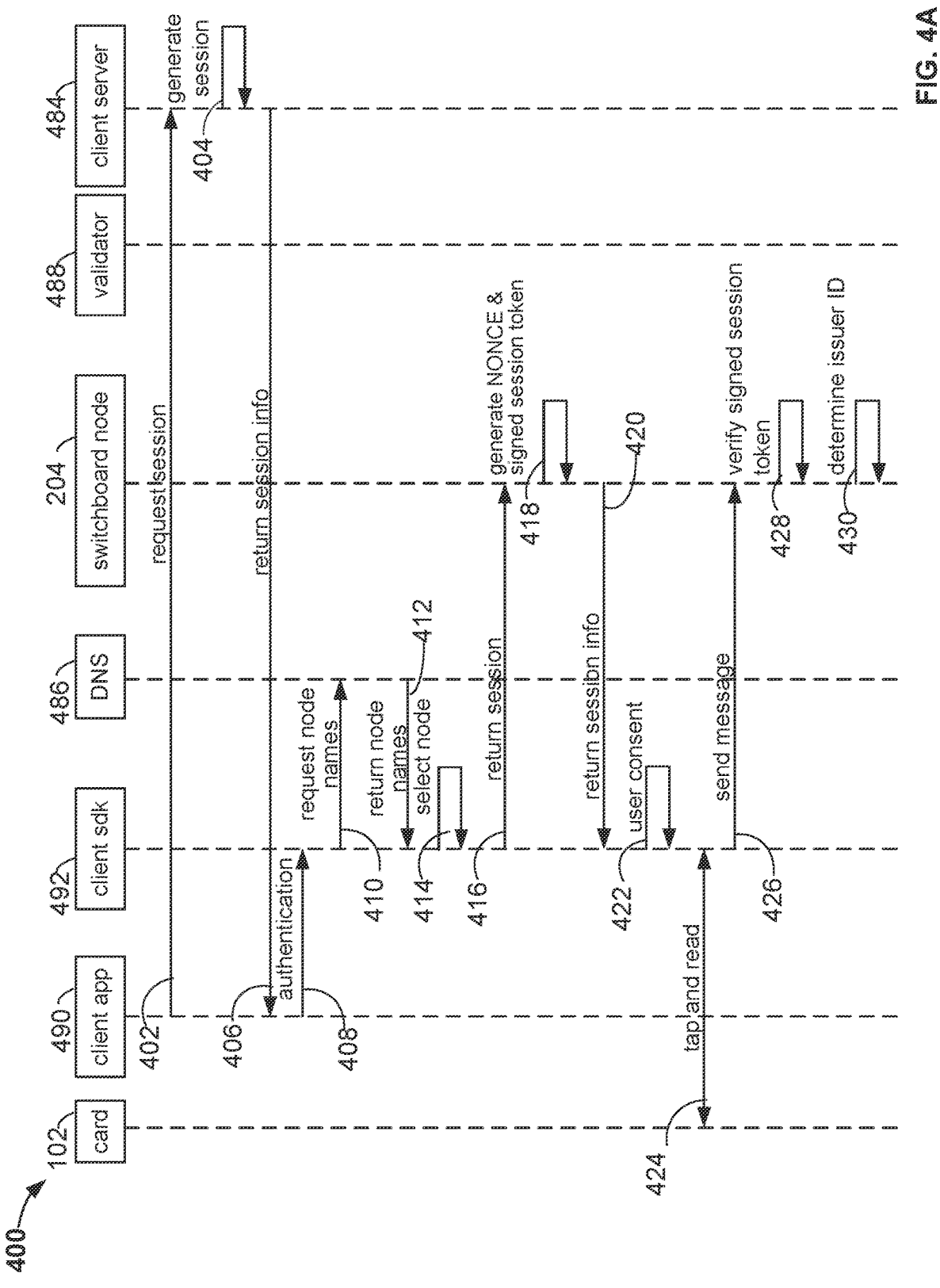
FIGS. 4A-4C is an example of a sequence 400 in accordance with embodiments.
Figure 4B:
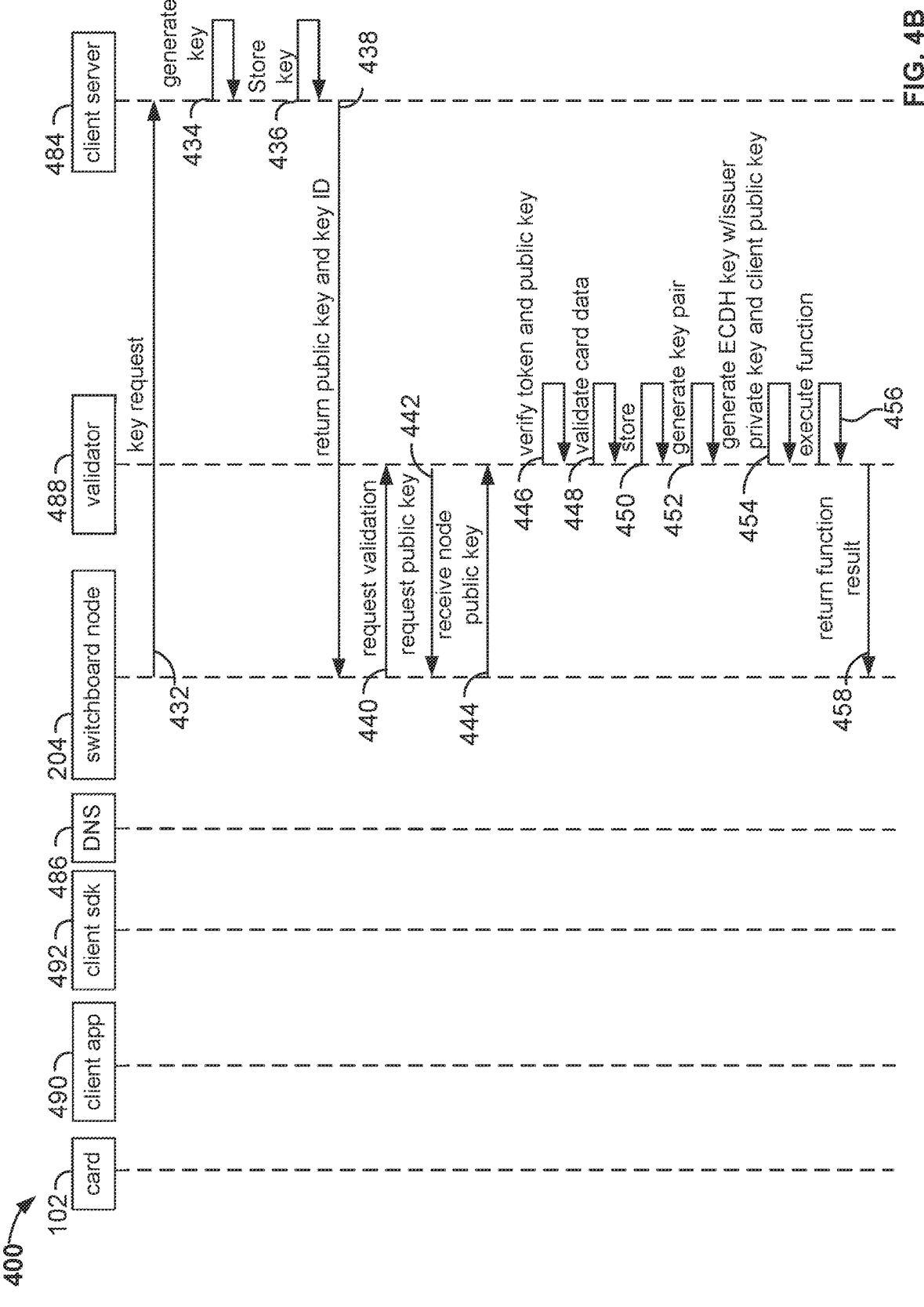
Figure 4C:
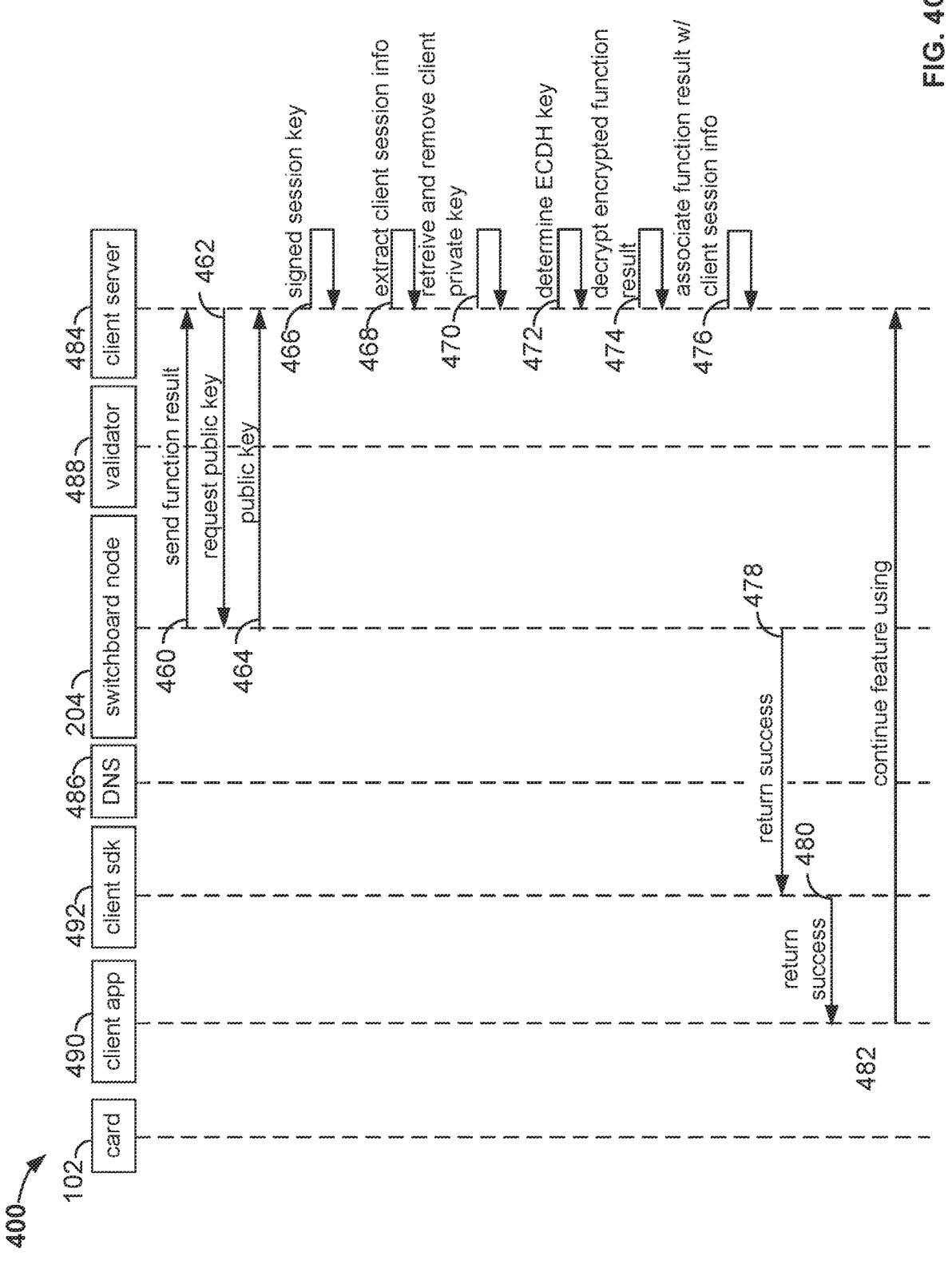

The switchboard node 204 may authorize or authenticate the client sdk 236 or user, and the switchboard node 204 may utilize the additional components, such as the session and nonce generator 206 and message router 208, to perform the operation, as discussed in FIG. 4A-FIG. 4C. Note the Validators validation systems 224 never interact with the merchant systems 222, nor vice versa. The nodes 204 brokers all communication.

In embodiments, the switchboard system 108 may utilize a hyperledger fabric 220 to manage synchronizing the shared operation data 212 and member management across the network. The hyperledger fabric 220 is distributed ledger framework having a permissioned network model that only authorized participants can join the network and access the data that is stored on a ledger.

In embodiments, the hyperledger fabric 220 may be generated by creating one or more set of peers, an ordering service, and a channel. Once the network is created, the system 200 deploys chaincode to the network or nodes 204 permitted to access the fabric. The chaincode is the code that runs on the blockchain and executes the network control 226 and operation data 212 logic code. Once the chaincode is deployed, each of the switchboard nodes 204 is configured to invoke transactions on the blockchain to add data to the blockchain, e.g., the operational data. A switchboard node 204 or another device can query the ledger to retrieve data. The ledger is a distributed database that stores all of the data that has been added to the blockchain.

All nodes 204 keep an independently verifiable log of their actions that can be transmitted to a centralized aggregator to build a picture of overall network usage. At a central level, system 200 can manage network operation data and management and have a centralized view of network use, aggregated and abstracted to the appropriate level.

FIG. 3 illustrates an example sequence 300 for a client to utilize DNS to resolve and communicate with one or more nodes of a switchboard system. The illustrated sequence 300 includes a client 236, a DNS 202, and a switchboard node 204. At 302, the sequence 302 includes the client 236 sending a request to a default DNS server for a text record switchboard. {domain}. {tld}. The text record may be preconfigured in a client app and/or client sdk. At 304, the DNS 202 returns one or more records. A DNS record structure may include the following:

Root Record:
    Name: switchboard. {domain}. {tld}
    Type: TXT
    Resolution:
        {nodename_1}.         {operator_a}. {region_i}.switchboard. {domain}. 414
        {nodename_2}.         {operator_a}. {region_i}.switchboard. {domain}. 414
        {nodename_1}.         {operator_b}. {region_ii}.switchboard. {domain}. 414
        {nodename_2}.         {operator_b}. {region_ii}.switchboard. {domain}. 414
        etc.
    Used For determining where there are active nodes
Node Record:
    Name:         {nodename}.         {operator}. {region}.switchboard. {domain}. {tld}
    Type: A/AAAA or CNAME
    Resolution: Actual node hostname or IP
    Used For: communicating with a node In embodiments, the client 236 may determine the current timezone at 306. For example, the client app or sdk may utilize a get current timezone function, such as in JavaScript: Intl.DateTimeFormat( ).resolvedOptions( ).timeZone). Embodiments are not limited in this manner, and the app or sdk may determine the timezone via another/different function call. At 308, the client 236 is configured to map the timezone to a region or short-version identifier of the region. One example includes America/New York→na-e. The region may be based on DNS names, for example. Table 2 illustrates a few examples of timezone mappings to regions:

TABLE 2

| Timezone | Region | Short Version |
|---|---|---|
| America/New_York | North America/East | na-e |
| America/Buenos_Aires | South America | sa |
| US/Pacific | North America/West | na-w |
| Europe/Paris | Europe | eu |

Embodiments are not limited to these examples, and other timezone-to-region mappings may be utilized. Further and in embodiments, Regions can also be represented as a bidirectional graph structure with the edges representing geographic neighbors. For example, na-e <—→ na-w and sa<—→ na-w and sa<—→ na-e. This representation is useful for node selection.

At 310, the client may identify or select a DNS record option returned at 304 that is in the region. If there are multiple matches, the client may select one at random. If there's no node available in a region, the client may determine and use a data graph of neighboring regions to select a node in the closest region where a node is available at 312. For example, sa has no node but is connected to na-e where there is a node and so na-e is selected. In some embodiments, At 314, the client may resolve a selected node's hostname. In embodiments, the client 236 may automatically resolve the hostname using the client's HTTP request default resolver. At 316, the Domain Name System 202 may return a result. And at 318, the client 236 may communicate with a switchboard node 204 and begin the process to interact with the switchboard.

FIG. 4A-FIG. 4C illustrate an example sequence 400 to perform operations between a contactless card and services provided by a card issuer and/or merchant. The illustrated sequence 400 includes actions and communications performed by a contactless card 102, a client sdk 236 including a client app and a client sdk, a Domain Name System 202, a switchboard system 108, a partner services 232 including a merchant and/or validator, and control services 234 including a client server or system.

In embodiments, at 402 the client sdk 236 including the client app may send a request and establish a session with a client server 484 such that a result may be associated with the correct client device or user. The request establishes a relationship between the client device and client server, which may be an issuer server. At 404, the client server 484 generates a session and CLIENT SESSION INFORMATION. At 406, the client server 484 returns the session information, e.g., the CLIENT SESSION INFORMATION. In embodiments, the CLIENT SESSION INFORMATION may be the Client implementation-specific user session identification information.

At 408, the client sdk 236 may initiate a contactless card authentication process with the client sdk 236. For example, the client sdk 236 may call a function and/or pass information to the client sdk 236 to initiate authentication via a contactless card. At 410-414, the client may utilize DNS to identify a node and establish communication with the node. Specifically, at 410, the client sdk 236 may send a request for switchboard hostnames, and at 412 the DNS 486 may return information including one or more hostnames. At 414, the client sdk 236 may determine a switchboard node to communicate. FIG. 3 illustrates an example of a more detailed sequence of the process to establish communication with a switchboard node.

At 416, the client sdk 236 may send a request for a session to the switchboard system 108. In embodiments, the request for a session may be for a function request in the format <FUNCTION REQUEST>. In embodiments, the FUNCTION REQUEST may be the data/function that the client would like to request once a contactless card has been validated. The function could be for any service discussed herein, e.g., authenticate the user, perform a transaction, request autofill data, etc. At 418, switchboard system 108 may generate a nonce and a signed session token. The signed session token may be a JSON Web Token (JWT). When generating the JWT, the following elements should be set:

iss: The unique ID of the current node, nonce: An 8 hex character, randomly generated nonce, exp: The expiration timestamp (+5 minutes), client id: The requesting client's Client ID, sub: The requesting client's Device Fingerprint, sid: Arbitrary session info sent from the client, scope: The function being requested to be performed.

The nonce may be unique, random bytes generated to ensure the unrepeatability of a message with a contactless card. The nonce is critical to the security and operation of the switchboard system. The nonce validity is tracked by tying it to a session which can be validated by any member of the platform. As mentioned, sessions are JSON Web Tokens signed using a node-specific private key issued by the network. These JWTs are verifiable by a system with the corresponding public key, which they can also verify by confirming it was issued by us or an approved delegate. The signed session token is a MT-generated token to establish the validity and expiration of the nonce and to associate the contactless card tap to the current client session. For example, the signed session token includes <NONCE>, <CLIENT SESSION INFO>, and <FUNCTION REQUEST> signed with <NODE PRIVATE KEY>, where the NODE PRIVATE KEY is the switchboard system 108 private key. The switchboard system 108 may include a NODE PUBLIC/PRIVATE KEY, which is a keypair used to sign and validate JWTs.

In embodiments, the switchboard system 108 can employ the nonce as a challenge to avoid or reduce the risk of preplay and/or replay attacks. For example, the contactless card 102 may transmit data communications by, e.g., NFC, and such communications can be intercepted by other readers, e.g., NFC readers, and played at a later time to circumvent security requirements. This may be counteracted by binding a transmission by the contactless card, e.g., a cryptogram, to a session time (e.g., a time and/or a device).

At 420, the switchboard system 108 may return session information to the client sdk 236. The session information may include the signed session token (<SIGNED SESSION TOKEN>), the NONCE <NONCE>, the function terms of service <FUNCTION TOS>, and the terms of service version <TOS VERSION>. The FUNCTION TOS may be the terms of service that the user must consent to in order to allow the client to execute the requested function, and the TOS VERSION may be the version of the terms of service. At 422, the client sdk 236 may determine and/or receive user consent to the terms of service. In one example, the client sdk 236 captures and records the user consent to <FUNCTION TOS> on <CONSENT DATE> with <TOS VERSION>. The CONSENT DATE may be the timestamp for the user's consent to the TOS.

At 424, the client sdk 236 exchanges one or more messages with a contactless card. In one example, the exchange may be based on the contactless card being tapped to a client device. In embodiments, the client sdk 236 may provide data to the contactless card 102 to use during the session to perform the function. The data may be provided to the contactless card 102 in an NDEF message. In one example, the data is written to the card in NDEF format using a binary update command. The data may include a NONCE to provide a level of security that the message received from the card is part of the same session. Additionally, the data may include additional information, such as one or more control bits to control the format generated by the contactless card. Table 3 below illustrates an NDEF message format example.

| Byte | Data Item | Value |
|---|---|---|
| 00 | NDEF Message Tag | D1 (only record) |
| 01 | Length of Record Type | 01 |
| 02 | Length of Record | 33 |
| 03 | text record type | 54 |
| 04 | Length of Language | 02 |
| 05-06 | Language | 65 6E ("en") |
| 07 . . . 0E | NONCE | 8 bytes of ASCII HEX encoded 4 bytes binary data |
| 0F . . . 12 | Session Indicators | 4 bytes of ASCII HEX encoded 2 bytes binary data |
| 13 . . . 16 | Control Indicators | 4 bytes of ASCII HEX encoded 2 bytes binary data |
| 17 ... 26 | Update Date creation Time | 16 bytes of ASCII HEX encoded 8 bytes binary data - represents 64 bit unix timestamp |
| 27 . . . 26 | Update MAC | MAC to protect control indicators - 16 bytes of ASCII HEX encoded 8 bytes binary data |

In embodiments, the updated MAC may be calculated to protect the control indicators. Specifically, The MAC M is determined by calculating a MAC over the 10 bytes of the update data U with the Update MAC Card Key (MCK) as follows:

$$U=[\text{Control Indicators (2 bytes)}\| \text{Update Date Time (8 bytes)} \| \text{`80'} \| \text{'00 00 00 00 00'}]$$

Consider U as two blocks of 8 bytes of data: U=U1|| U2

Compute B=DES(MCKL) [U1]

Compute B=[B XOR U2]

Compute B=DES(MCKL) [B]

Compute B=DES$^{-1}$(MCKR) [B]

Finally, the MAC M=DES(MCKL) [B]

At 424, the contactless card may generate and provide a message to the client device including the client sdk 236. The data in the message may be utilized by the system discussed herein to perform the function requested. One example of the message is illustrated and discussed in FIG. 5, message 600.

At 426, the client including the client sdk 236 may send a message and information to the switchboard system 108. The message may be the message received from the contactless card 102, e.g., message 600. In addition, the client sdk 236 may send the consent date, the TOS version, and the signed session token to the switchboard system 108. The switchboard system 108 may utilize the information to ensure that the session is valid. At 428, the switchboard system 108 verifies the signed session token is valid, e.g., is the previously provided signed session token and includes the nonce previously generated and is in the message.

In some embodiments, the switchboard system 108 is configured to determine which issuer system or client server it should route the message to for processing. At 430, the switchboard system 108 may determine the issuer ID by extracting it from the message received from the contactless card 102 via the client sdk 236. As mentioned, the issuer ID identifies the issuer of the contactless card 102.

In embodiments, the switchboard system 108 is configured to generate and communicate secure communications with the issuer system, e.g., the client server 484 and the validator 488. At 432, the switchboard system 108 sends a request for a key to the client server 484. The key may be utilized to perform the secure communications. In one example, the key request may be an elliptical curve Diffie-Hellman (ECDH) key request. Embodiments are not limited in this manner and alternative key protocols may be utilized, e.g., Supersingular isogeny Diffie—Hellman key exchange (SIDH or SIKE), a private/public key pairing (RSA), etc.

At 434, the client server 484 generates a portion of the key. In some instances, the client server 484 may generate half of the ECDH key for encryption/decryption of PII. Specifically, the client server 484 may generate <CLIENT EC PUBLIC KEY> and <CLIENT EC PRIVATE KEY> using Elliptic Curve P256. The CLIENT EC PUBLIC KEY AND CLIENT EC PRIVATE KEY is the first half of the ECDH key negotiation.

At 436, the client server 484 stores the generated portion of the key in a storage. Specifically, the client server 484 may store <CLIENT EC PUBLIC KEY> and <CLIENT EC PRIVATE KEY> with <KEY ID>, where the KEY ID is used by the Client Server to cache its short-lived EC public/private key for later ECDH key completion, e.g., to identify the ECDH key portions to generate the whole ECDH key. In one example, the key may be stored in a secure memory location and may be used to when PII is received for the session.

In embodiments, the client server 484 may return the public key portion to the switchboard system 108 with the KEY ID at 438. The switchboard system 108 may store the public key portion with the KEY ID for later use, e.g., generation of the ECDH key. At 440, the switchboard system 108 may request a validation to be performed by the validator 488. In one example, the switchboard system 108 may send a request validation as Request validation <MESSAGE>, <SIGNED SESSION TOKEN>, <CLIENT EC PUBLIC KEY>, <CONSENT DATE>, and the <TOS VERSION>. The validator 488 may make an out-of-band request back to the switchboard system 108 for the public key to verify the session at 442. At 444, the switchboard system 108 may provide the node's public key, i.e., <NODE PUBLIC KEY>. Further and at 446, the 488 may utilize the node's public key to verify the secure session token.

Figure 13A:
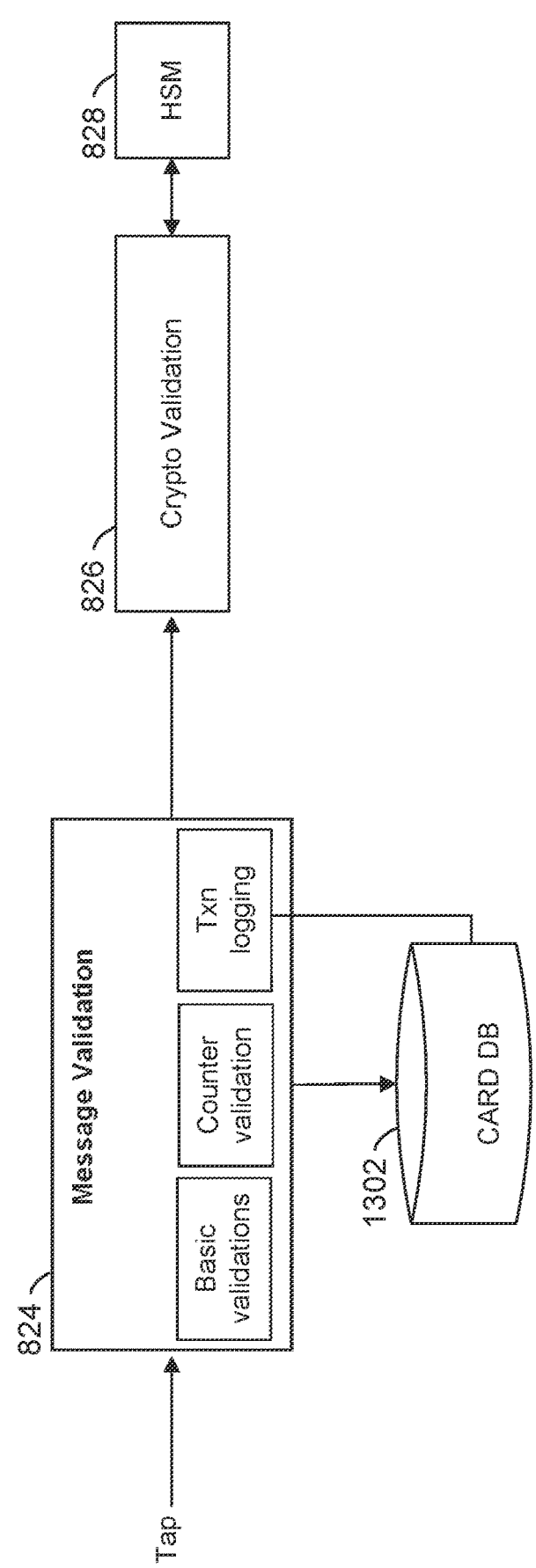
FIG. 13A illustrates an example of a system 1304 in accordance with embodiments.
Figure 13B:
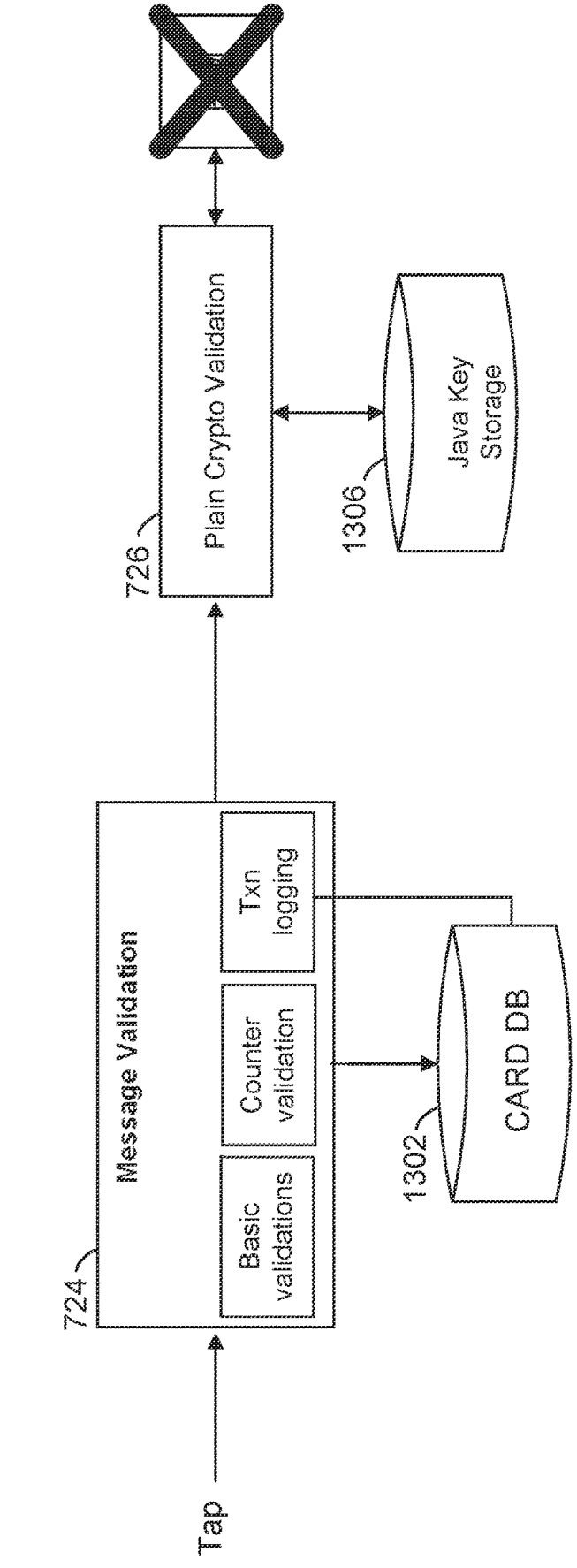
FIG. 13B illustrates an example of a system 1304 in accordance with embodiments.

In embodiments, the validator 488 may validate the message at 448. In embodiments, the validator 488 may perform a number of validations including ensure the nonce in the message is correct along with additional information, such as the card's unique identifier (pUID), and the counter value (pATC). FIG. 13A and FIG. 13B discuss additional details of a validation process that may be performed.

At 450, the validator 488 may store information associated with the session. For example, validator 488 may store the <CONSENT DATE> with the <TOS VERSION> and the <PUID>. Teh validator 488 may also generate another portion of the key, e.g., the ECDH key. For example, the 488 may Generate <ISSUER EC PUBLIC KEY> and <ISSUER EC PRIVATE KEY> using Elliptic Curve P256. The ISSUER EC PUBLIC KEY and ISSUER EC PRIVATE KEY may be the second half of the ECDH key negotiation.

At 454, the validator 488 may generate the complete ECDH key. For example, the validator 488 generate the <ECDH KEY> from <ISSUER EC PRIVATE KEY> and <CLIENT EC PUBLIC KEY>. The ECDH KEY is the final key generated using ECDH key negotiation.

The validator 488 may utilize the ECDH KEY to encrypt data for the function. For example, and in some instances, if the validator 488 validates the message, the validator 488 may execute a function request to create a function result and encrypts the result with the ECDH KEY at 456. For example, the validator 488 may Execute <FUNCTION REQUEST> to create <FUNCTION RESULT> and encrypt it with the <ECDH KEY>. The function result may be any result based on the requested function, e.g., verification of the card.

At 458, the validator 488 may return the function result to the switchboard system 108. In some instances, the function result is returned encrypted. For example, the validator 488 may return the <ENCRYPTED FUNCTION RESULT> and the <ISSUER EC PUBLIC KEY>.

In embodiments, the switchboard system 108 sends the function result to the client server 484 to process the result. In one example, the switchboard system 108 may send the <ENCRYPTED FUNCTION RESULT>, <KEY ID>, <ISSUER EC PUBLIC KEY>, and <SIGNED SESSION TOKEN>. At 462 and 464, the client server 484 may make a request for and receive the public key from the switchboard system 108. In some instances, the exchanged may be performed via out-of-band communication channels. The public key for the node may be <NODE PUBLIC KEY>. The public key may be used to verify the sender of the function result, etc. At 466, the 484 may verify the signed session key with the node's public key <NODE PUBLIC KEY> to verify the sender of the information. At 468, the client server 484 may extract client information from the signed session token. For example, the client server 484 may Extract <CLIENT SESSION INFO> from <SIGNED SESSION TOKEN>, i.e., extracting the client implementation-specific user session identification information.

Further and at 470, the client server 484 may retrieve client private key with the KEY ID. Specifically, the client server 484 may get and remove the <CLIENT PRIVATE KEY> from cache using the <KEY ID>. At 472, the client server 484 may generate or compute the ECDH key. For example, the client server 484 may compute the <ECDH KEY> with the <CLIENT PRIVATE KEY>+<ISSUER EC PUBLIC KEY>. The client server 484 may decrypt the function result with the computed key at 474. Specifically, the client server 484 may decrypt the <ENCRYPTED FUNCTION RESULT> with the <ECDH KEY> to determine the <FUNCTION RESULT>. At 476, the client server 484 associates the function result with the session.

In embodiments, the switchboard system 108 may return that the function result was successfully completed or not at 478 to the client sdk 492. Further and at 480, the client sdk 492 may notify the client app 490 of the result. At 482, the client app 490 may utilize the feature. For example, the 482 may communicate with the client server 484 to continue the feature using the <CLIENT SESSION INFO> to fetch the redacted <FUNCTION RESULT>.

In embodiments, the switchboard system 108 can generate the nonce for use as a challenge and link this challenge to a session. The challenge can be written to the contactless card 102 (e.g., to an applet contained in the memory of contactless card) and can be used by the contactless card in the generation and/or calculation of a cryptogram as described herein. In addition, session validation may be added to the validation logic as part of the validation described herein.

The use of a challenge can provide many advantages, including the benefits of greatly improving security and reducing false positive declines based on issues arising with the counter value (pATC). In embodiments, writing a challenge can be implemented by changing the configuration of the contactless card. For example, the contactless card (e.g., an applet contained in the memory of the contactless card) may be provided with new internal records, including a new configuration file. The contactless card may be configured to support an optional WRITE BINARY and/or UPDATE BINARY to facilitate the transmission of the challenge to the card. The contactless card may be configured to support processes including a challenge and processes not including a challenge. In addition, the cryptogram approach utilized by the contactless card may be configured to support processes including a challenge and processes not including a challenge.

In embodiments, writing a challenge may be implemented by changing the configuration of one or more SDKs used by the systems and methods described herein, including by the contactless card, the client device, the server, and other network-enabled computers. For example, an SDK may be updated to implement an NDEF read at the application protocol data unit (APDU) level. The SDK may be updated to determine process flows by interrogating an applet capabilities file. In addition, the SDK may be updated to request a challenge from the validator.

In embodiments, writing a challenge may be implemented by changing the configuration of the validator. For example, the validator may be updated to support the generation and provision of a challenge. The validator may be updated to support the generation and provision of a session. In addition, the validatory may be updated to support validation policies based on a version number including, without limitation, an applet and/or software version number.

Figure 5:
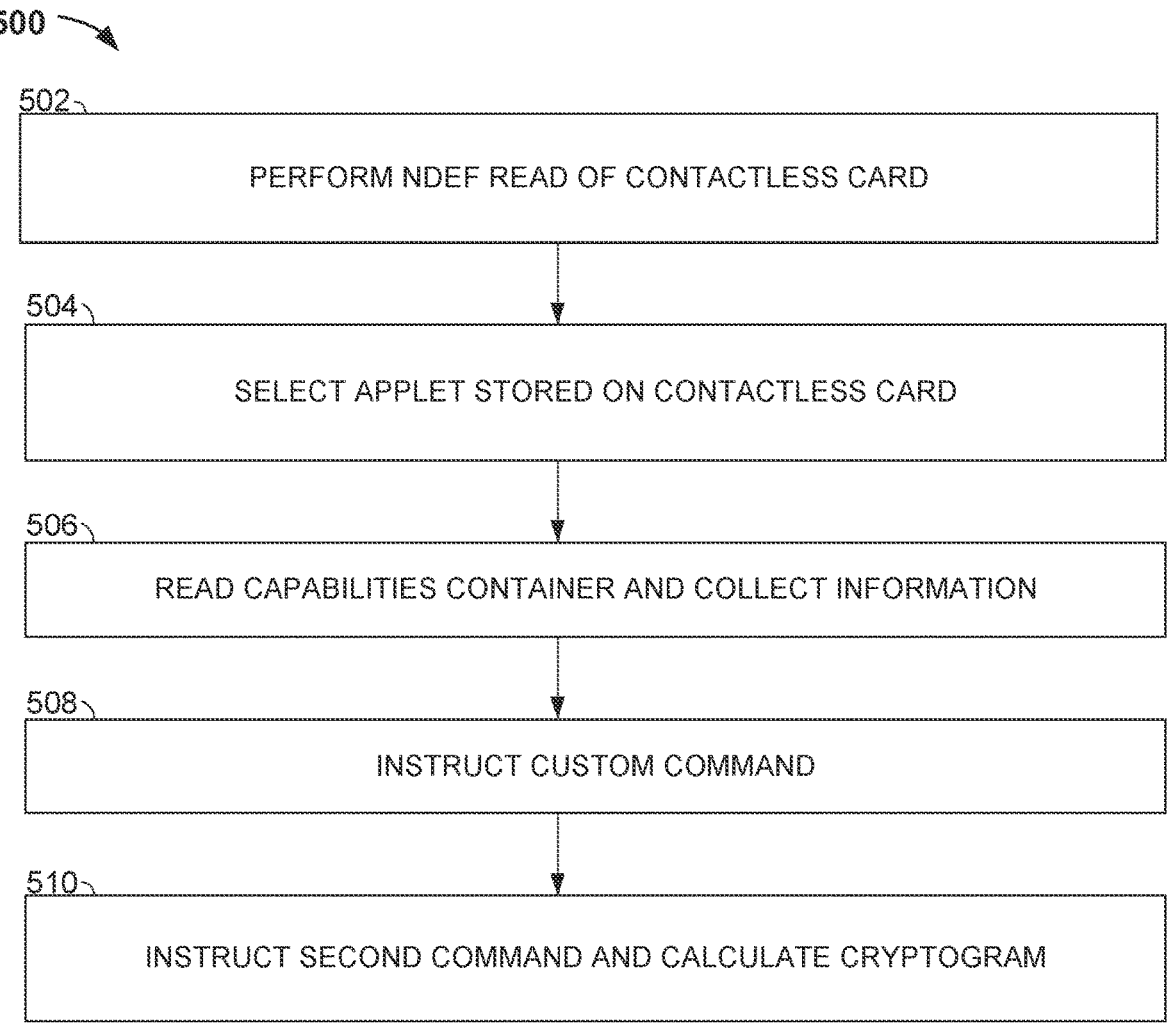
FIG. 5 illustrates an example of a routine 500 in accordance with embodiments.

FIG. 5 illustrates an example of a routine 500 in accordance with embodiments discussed herein. For example, the routine 500 can be performed by the devices and systems described herein, including, without limitation, the mobile device 104, the client app 490, the issuer system 802, the personalization system 804, the contactless card 102, a client device, a software development kit (SDK), a POS terminal, and a personal computer.

In block 502, an NDEF read of the contactless card 102 can be performed. The NDEF read can be performed after entry of the contactless card 102 into an NFC field of a device, such as the mobile device 104.

In block 504, an applet of the contactless card 102 can be selected. The contactless card 102 can store a plurality applets in its memory, and the plurality of applets can include a payments applet (e.g., an applet configured to conduct payment transactions, such as EMV transactions) and an authentication applet (e.g., an applet configured to perform authentication operations, such as the authentication operations described herein).

In block 506, a capabilities container associated with the selected applet can be read to collect information relating to the container and the applet. Information collected can include, without limitation, container size, number of files stored in the container, file sizes of files stored in the container, file names of files stored in the container, and read status of files stored in the container, and write status of files stored in the container.

In block 508, a custom command can be performed. For example, the custom command can be transmitted to the contactless card 102 and can comprise data and one or more instructions. The custom command can be used to update one or more of the selected applet, the capabilities container, and the files within the container. For example, the custom command can update a file to include a nonce. As another example, the custom command can be a WRITE BINARY command. As further examples, the custom command can be a command to change a state of an applet on the contactless card 102 (e.g., a change from a dormant state to an active state, a change from a locked state to an unlocked state, a change from a deactivated state to an activated state; a change from a first version to a second version); a command to change a format of a message stored on the contactless card 102 or generated by the contactless card 102; a command to change one or more parameters used for calculations performed by the contactless card; a command to change a form of authentication operation used by the contactless card 102 (e.g., a cryptographic MAC operation, a signed message with public key certificate); and/or a command to transmit one or more certificates (e.g., a digital certificate such as a public key certificate, a code-signing certificate, a client certificate, a user certificate). It is understood that the custom command can be other commands and instructions and the custom command is not limited to these examples.

In block 510, a second command can be given and in response to the second command, a cryptogram can be calculated. The cryptogram can be calculated in accordance with embodiments described herein, and the nonce can be used in the calculation of the cryptogram. In embodiments, the second command can be a READ BINARY command. In embodiments, the second command can instruct that the nonce be used in the calculation of the cryptogram.

Figure 6:
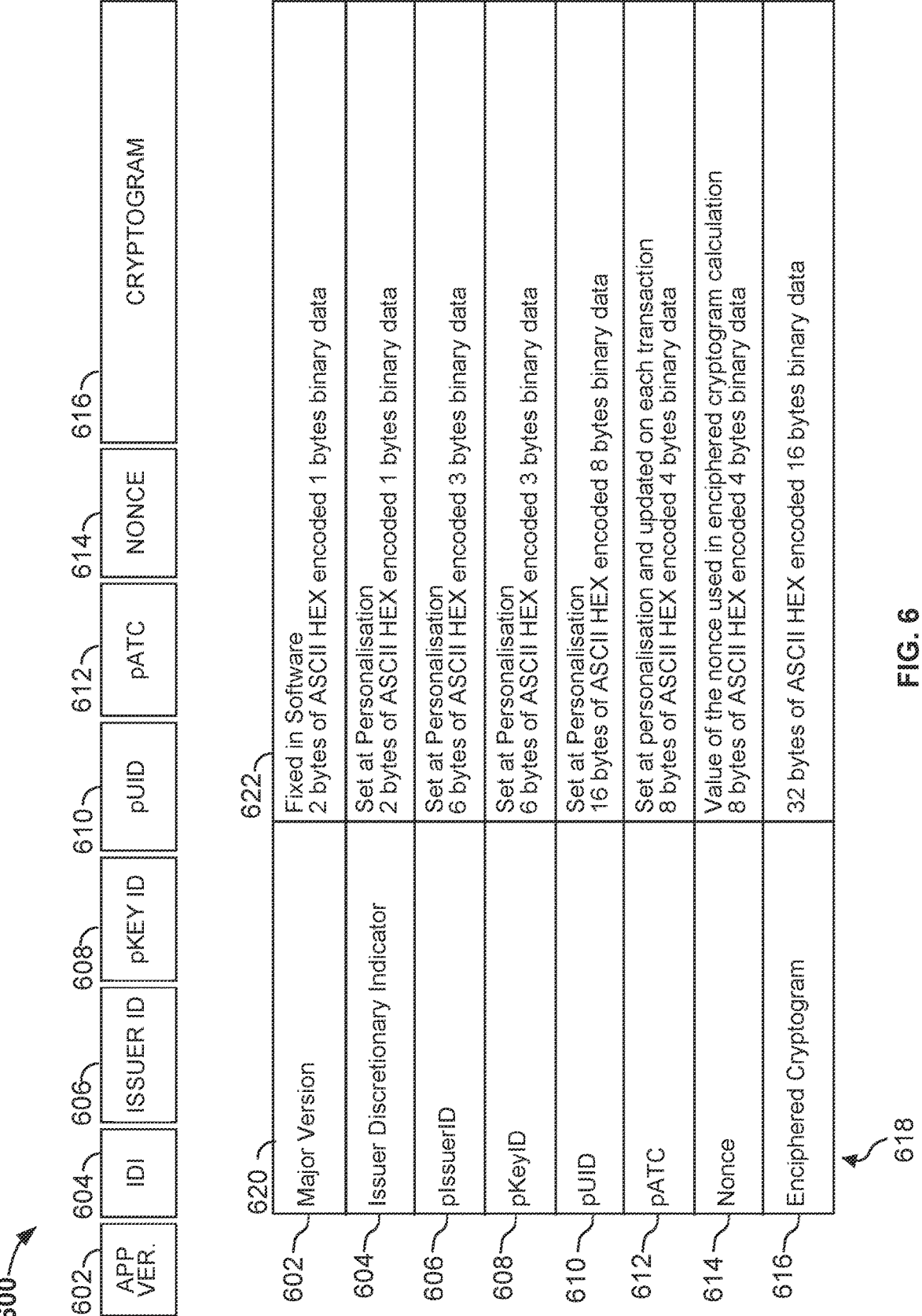
FIG. 6 illustrates an example of a message 600 in accordance with embodiments.

FIG. 6 illustrates an example of a message 600 that may be communicated by a contactless card 102 to perform the functions described herein. One or more of the fields in message 600 may also be utilized to route the message 600 through the switchboard system and perform authentication/validation techniques.

In embodiments, the message 600 includes an applet version 602 field, an issuer discretionary indicator 604 field, an Issuer Identifier 606 field, a pKey ID 608 field, a pUID 610 field, a pATC 612 field, a nonce 614 field, and an encrypted cryptogram 616.

In embodiments, the fields may be in plain text or encrypted. For example, the applet version 602 field may include an applet version in plain text. The applet version to indicate which applet version is installed on a contactless card 102 and may be used by the other systems to determine how to process the message 600 when communicated. For example, different applet versions require different validation logic, e.g., an older message may be routed through the issuer system to perform various operations for validation, while a newer message may be routed through the switchboard system to perform the various operations, including validation. As another example, different applet versions require different personalization logic.

In embodiments, the message 600 includes an issuer discretionary indicator 604 field that may include issuer data and set at the time of personalization. In addition, the message 600 includes an Issuer Identifier 606 field that may include a unique ID assigned to the entity issuing the card, e.g., the issuer, or other entity associated with the contactless card. For example, each issuer may be assigned a unique identifier during an onboarding operation when joining the system. The issuer ID can be used by the switchboard system 108 to route a message and its contents to the appropriate services that are associated with that particular issuer.

In embodiments, the message 600 includes a pKey ID 608 field. In some instances, the pKey ID 608 field may include data that identifies a set of master keys for a card issuer. The issuer's set of master keys may utilize each cards set of derived master keys or unique derived keys (UDK). Further, each card's own set of master keys (UDKs) may be generated during the personalization of the card. The card's UDKs may be utilized to generate session keys that are used to generate the application cryptogram. The session keys generated by a card may be regenerated by a system, e.g., the validator system, utilizing pKeyID to identify the issuer's masters keys to regenerate session keys by the system to perform a validation.

In embodiments, each contactless card 102 is given a unique 16-decimal digit identity (pUID) at the time of personalization. Derivation of the card applet's unique keys using the pUID is performed off-card. The resultant Application Keys are injected during the personalization of the card. In embodiments, a card's Application Keys are the same as the card's derived master keys or UDKs. The process for deriving the Application Keys (UDKs) is as follows:

1. Create a number of Issuer Master Key sets and assign each a unique three-byte pKey ID (6 hexadecimal digits).
2. For each card Application:
   1. Associate one of the Issuer's pKey ID with a card's pUID.
   2. Use the pKey ID to identify the Issuer Master Keys for application key generation (UDK) and subsequent Cryptogram calculation and Data Encipherment.
   3. For each of the application keys (UDK), create Diversification data as follows:
      1. Create a 16-digit quantity X from the 16 digits of the pUID
      2. Each application key (UDK) is formed by the following steps:
         1. Compute ZL by encrypting X using the appropriate Issuer Master Key identifier (pKey ID);
         2. Compute ZR by XOR'ing X with FFFFFFFFFFFFFFFF and then encrypting the result using the Issuer Master Key;
         3. Concatenate ZL with ZR to form the Application Key (UDK key).

In embodiments, key derivation processes can avoid, or stop, the use of a PSN. In these embodiments, the need to look up a PSN from a database in order to generate UDKs is eliminated. This results in the avoidance of a dependency on the database and the retrieval of information from the database. Accordingly, personalization and validation of devices (e.g., card personalization and validation) can be performed independently.

In embodiments where diversified keys can be derived from master keys using 16 digits from a pUID (instead of being derived from 14 digits from the pUID and the PSN), entropy is not decreased and further, this change can beneficially impact personalization, applet or other software, and validation. For example, an encryption master key may be used with 16 digits from the pUID to derive an encryption UDK. As another example, an authentication master key may be used with 16 digits from the pUID to derive an authentication UDK.

The message 600 may include a pUID 610 field, including a card unique identifier assigned to the contactless card at personalization time. The pUID 610 field data may be a combination of alphanumeric characters used to uniquely identify each card and associated with a user. In embodiments, the pUID 610 field may include data relating to the user associated with the contactless card and/or an account associated with the user.

In embodiments, the inclusion of the pUID 610 field allows for namespacing specific to an individual entity. That is, the pUID 610 field can include namespacing for an issuing entity or a validator entity to further the decoupling between personalization and validation.

In embodiments, the message 600 includes a pATC 612 field configured to hold a counter value. The counter value keeps a count of reads (taps) made on the contactless card in a hexadecimal format in one example. Further, a counter value may be used to generate session keys to encrypt at least a portion of a message.

In embodiments, each time a message 600 is created, a new session key is derived and utilized to generate one or more portions of the message 600. Specifically, a session key is used to calculate the cryptographic MAC (Application Cryptogram).

The card's applet supports an improved variation of the session key derivation option as per EMV 4.3 book 2 annexes A1.3.1 to generate a unique cryptogram session key ASK as follows:

Compute SKL by encrypting [ATC[2]|| ATC[3]|| 'F0' || [ATC[0] || [ATC[1]]|| [ATC[2] [ATC[3]] with the Application Key Compute SKR by encrypting [ATC[2]|| ATC[3]|| '0F' || [ATC[0] || [ATC[1]]|| [ATC[2] [ATC[3]] with the Application Key Concatenate SKL with SKR to form the Authentication Session Key.

An Authentication Session Key is used to encrypt the cryptographic MAC.

The card applet also supports the improved variation of the session key derivation option as per EMV 4.3 book 2 Annex A1.3.1 to generate a unique encipherment session key DESK as follows:

Compute SKL by encrypting [ATC[2]|| ATC[3]|| 'F0' '00' || '00' || '00' || '00' || '00' ] with the Data Encryption Key Compute SKR by encrypting [ATC[2]||ATC[3]|| '0F' ||'00' ||'00' ||'00' ||'00' || '00' ] with the Data Encryption Key Concatenate SKL with SKR to form the Data Encipherment Session Key.

The cryptogram C is determined by calculating a MAC over the 32-byte transaction data T using the Authentication Session Key (ASK) as follows:

$T$=[pVersion (2 bytes)|| pIssuerID (3 bytes) || pKeyID (3 bytes) pUID (8 bytes) || pATC (4 bytes)|| nonce (4 bytes)|| pSHSEC (4 bytes)|| '80' ||'00 00 00' ]

Consider T as four blocks of 8 bytes of data: T=T1||T2||T3 ||T4

Compute B=DES(ASKL) [T1]

Compute B=[B XOR T2]

Compute B=DES(ASKL) [B]

Compute B=[B XOR T3]

Compute B=DES(ASKL) [B]

Compute B=[B XOR T4]

Compute B=DES(ASKL) [B]

Compute B=DES$^{-1}$(ASKR) [B]

Finally, the cryptogram C=DES(ASKL) [B]

The cryptogram encipherment is performed with the Data Encipherment Session Key (DESK) being used to encrypt in Cipher Block Chaining mode (CBC) as follows:

Generate an 8-byte random number [RND]

Compute E1=DES3(DESK) [RND]

Compute B=[E1] XOR [C]

Compute E2=DES3(DESK) [B]

Finally, the 16 byte enciphered payload E=[E1] ||[E2]

To recover using decryption mode:

RND=DES3$^{-1}$(DESK) [E1]

B=DES3$^{-1}$(DESK) [E2]

C=[E1] XOR [B]

In embodiments, a portion of the data provided in message 600 is static and set on the card during the personalization of the card and other data is dynamic and may be generated by the card during an operation, e.g., when a read operation is being performed. Note that in some instances, the static information may be updateable, but may require the customer and card to go through a secure update process, which may be controlled by the issuer.

In embodiments, the contactless card 102 may communicate a message between a device, such as a mobile device, during a read operation. For example, in response to the contactless card 102 being tapped onto a surface of the device, e.g., brought within wireless communication range, a read operation may be performed on the contactless card 102, and the contactless card 102 may generate and provide the message to the device. For example, once within range, the contactless card 102 and the device may perform one or more exchanges for the contactless card 102 to send the message to the device. FIG. 4A, step 424 illustrates one example of an exchange.

The wireless communication may be in accordance with a wireless protocol, such as near-field communication (NFC), Bluetooth, WiFi, and the like. In some instances, a message may be communicated between a contactless card 102 and a device via wired means, e.g., via the contact pad 904, and in accordance with the EMV protocol.

The message 600 provides several benefits. For example, the message 600 provides the data communication, data security, card authentication, and validation benefits described herein. As another example, the inclusion of the Issuer Identifier 606 field permits the message 600 to be routed to the appropriate issuing entity for validation (or to the appropriate validator entity if different than the issuing entity). This allows for the decoupling of the issuing entity or the entity that performed personalization of the transmitting device (e.g., when the transmitting device is a contactless card, the contactless card issuing entity) from the validator entity. Accordingly, any validator entity authorized to perform validator, not just the issuing entity or the entity that performed personalization of the transmitting device can be identified in the Issuer Identifier 606 field. In addition, this routing is scalable across many messages, many issuing entities, and many validator entities.

As another example, the inclusion of the pKey ID 608 can replace the requirement of a database lookup upon receipt of the data payload. This supports decoupling validation from the database and the requirement of access to the database to perform validation.

FIG. 7 illustrates an example of routine 700 in accordance with embodiments discussed herein. In block 702, the routine 700 includes receiving, by a node in a system, a request to establish a session to perform a function from a client device, wherein the function is at least partially performed utilizing a contactless card. In some instances, the node may be one of a plurality nodes of a switchboard system. The node may be previously selected by the sending device via a DNS operation performed.

In block 704, the routine 700 includes generating, by the node, session information corresponding to the session to perform the function, wherein the session information comprises a nonce and a signed session token. The nonce and/or signed session token may be utilized by systems to perform the functions described herein while ensuring the node routing the data is authenticate, the message from the contactless card is authenticate, and to keep track of the session for the function.

In block 706, routine 700 sends, by the node, the session information to the client device. The client device may communicate with a contactless card to receive data from the card to authenticate and perform a function. In some instances, the client device may send the nonce from the node to the contactless card. The contactless card may utilize the nonce when generate the message to communicate back to the client device and finally the node, e.g., incorporate it into a cryptographic portion of the message (see FIG. 6).

In block 708, routine 700 receives, by the node, a message from the contactless card via the client device. The message may be generated by the contactless card. FIG. 6 illustrates one example of a message 600.

In block 710, routine 700 extracts, by the node, an issuer identifier from the message, the issuer identifier associated with the issuer of the contactless card. In some instances, the issuer identifier may be in a plaintext format.

In block 712, routine 700 identifies, by the node, a device associated with issuer identifier. For example, the node may perform a lookup to determine a server associated with the issuer identifier and the function to be performed.

In block 714, routine 700 communicates, by the node, with the device to securely perform the function.

Figure 8A:
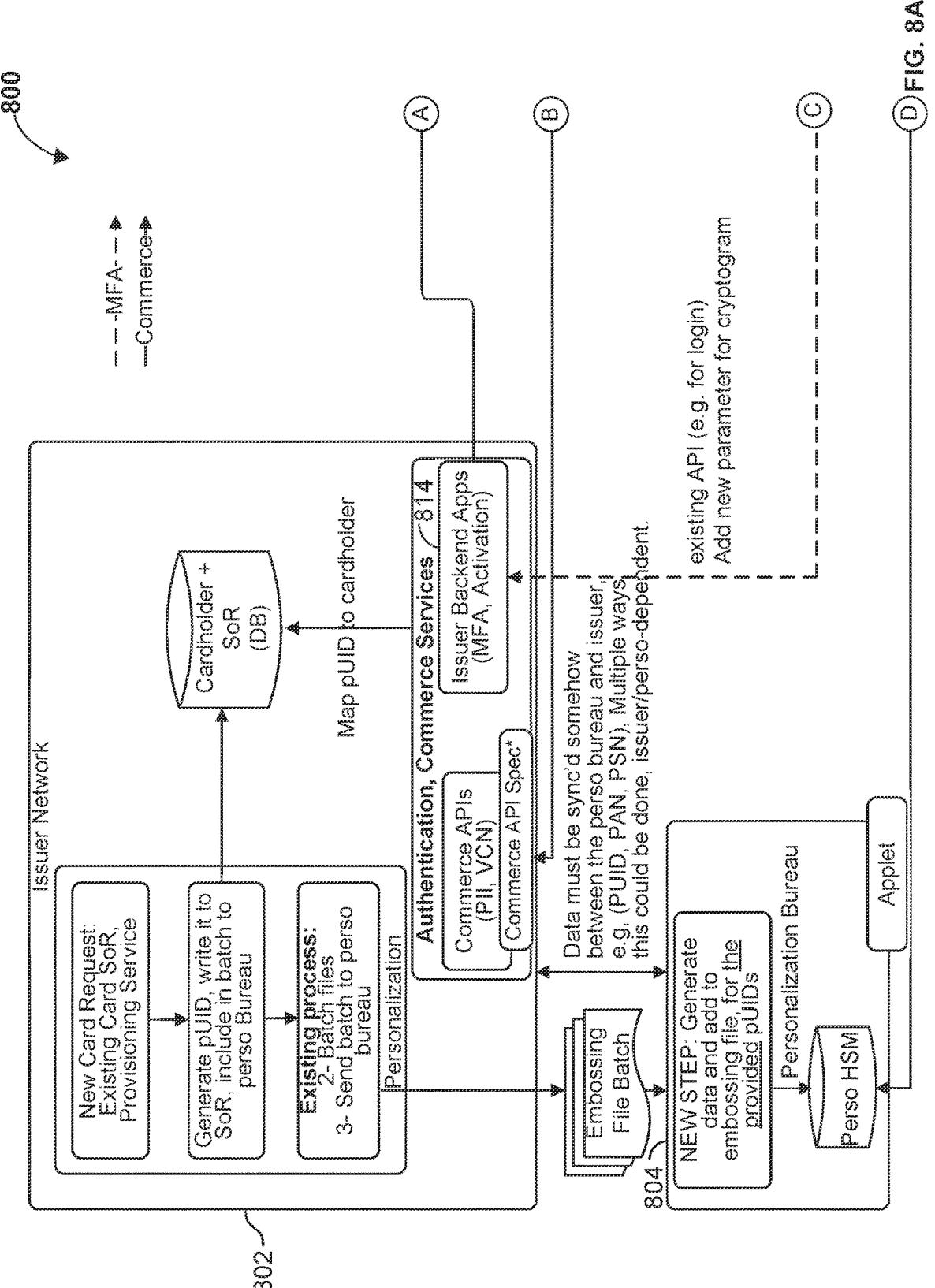
FIGS. 8A and 8B illustrate an example of a system 800 in accordance with embodiments.
Figure 8B:
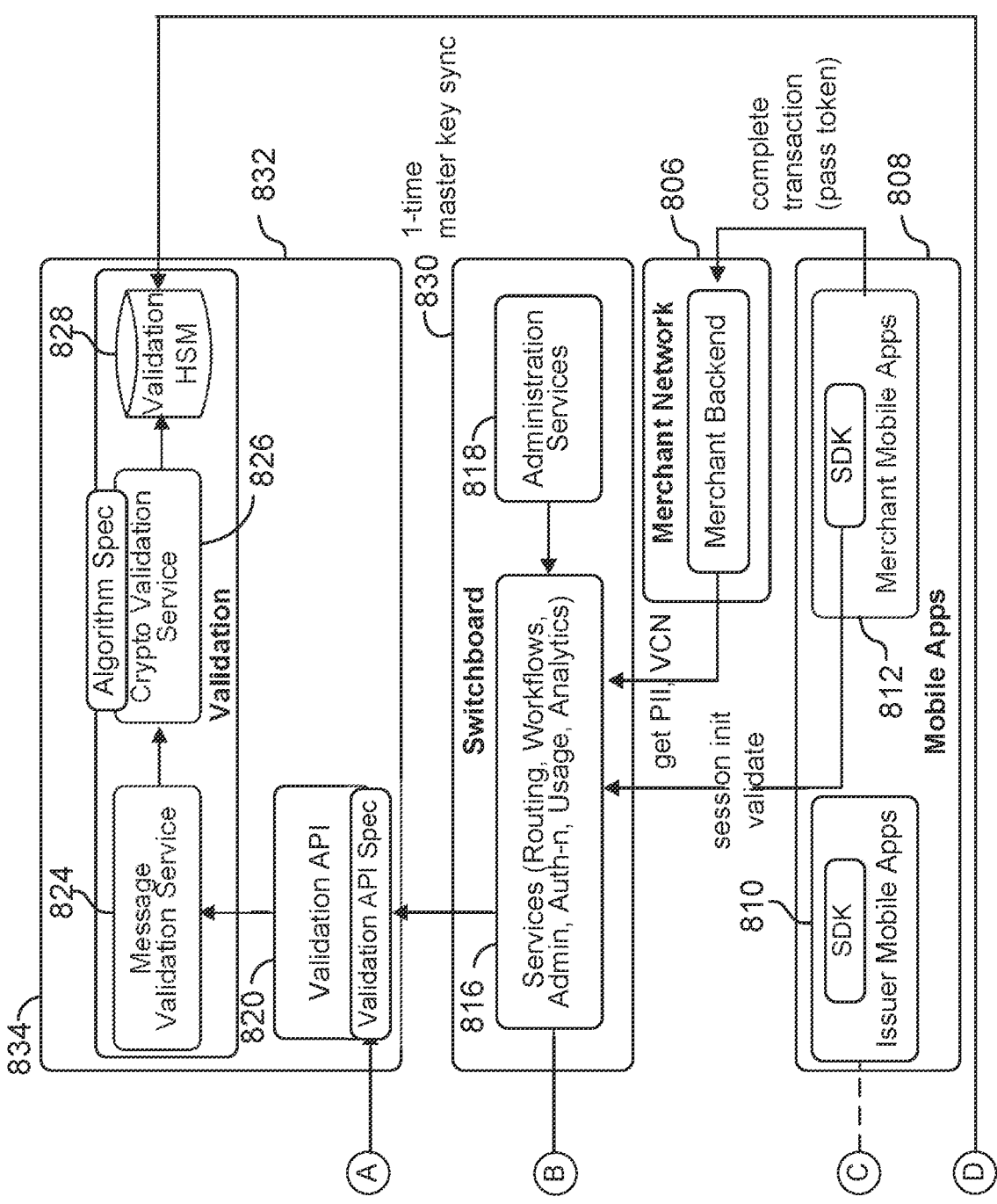

FIGS. 8A and 8B illustrate an example of a system 800 configured in accordance with embodiments discussed herein. In some instances, the system 800 may be a more detailed view of system 100 and its components. The illustrated system 800 includes one or more systems to support processing transactions, performing validation functions, and other functions involving contactless cards issued in a multiple issuer environment. In embodiments, the system 800 includes one or more issuer systems 202, a personalization system 804, one or more merchant systems 806, and a switchboard system 830. The switchboard system 830 may include additional systems to provide the functionality to a plurality of issuer systems, these systems may include switchboard nodes configured to route messages and communicate with other systems.

These systems may be configured with hardware and software components to perform the functions discussed herein. For example, each system may be configured with one or more servers, processors, memory, storage, networking hardware, input/output devices, etc., to process instructions in accordance with embodiments. Moreover, each of the systems may support and implement a number of application programming interfaces (APIs) configured to enable interoperability between each of the systems while maintaining a high level of security.

In embodiments, the system 800 includes at least one issuer system 802. An issuer system 802 may have a number of components and provide the functionality to issue contactless cards to customers, authenticate customers, perform transactions, and enable other contactless card tap-to operations. In one example, the issuer system 802 includes functions to issue cards including processing network contactless card requests, maintaining a system of record (SoR), and providing provisioning services.

In one example, to issue cards, the issuer system 802 may generate card unique identifiers (pUIDs), each of which may be associated with a cardholder and a contactless card when issued. A pUID may be utilized as a part of a validation process and the issuer system 802 may store the pUIDs in a database associated with cardholders, for example. The pUIDs may be written to SoRs and provided to the personalization system 804 to physically generate and issue the contactless cards. In some instances, the pUIDs may be communicated to the personalization system 804 in batch or a batch file. For example, the issuer system 802 may include a process to generate a batch of pUIDs, and a function to communicate the batch, e.g., embossing file batch, to the personalization system 804. The personalization system 804 may configure and physically generate and issue the contactless cards, as will be discussed in more detail below.

In some embodiments, the issuer system 802 may provide additional functionality. In some instances, the issuer system 802 may maintain at least a portion of functionality to perform validation operations for customers once contactless cards have been issued. For example, the issuer system 802 may include functions and APIs that devices, such as a mobile device executing an issuer mobile app 810 may use to validate information originally received from the contactless card. The device may communicate the data from the contactless card to the issuer system 802 via one or more APIs, such as those provided by the MFA service 814, and the issuer system 802 may validate the information based on information stored in a database. The issuer system 802 may return a result to the device.

In some instances, the issuer network 802 includes one or more commerce APIs configured to provide commerce services, e.g., provide PII during a transaction, provide PII to autofill form, provide a VCN to perform a transaction or autofill form, etc. In some instances, these commerce APIs may be hosted outside of the issuer network 802, by a third-party service provided, such as under the service 834.

In other instances, the issuer system 802 may offload the validation operations to the services 834. In these instances, the issuer system 802 may still receive the data from the contactless card via a device, e.g., a mobile device, and through an API. The issuer system 802 may then be configured to send the data to the services 834, and the services 834 may perform the validation operations. In either case, the issuer system 802 may return a result of the validation to the device. The device, such as a mobile device, may use the result as a part of a validation request, e.g., to access a mobile app, as part of a multifactor authentication operation, or enable the performance of another function.

In embodiments, the system 800 includes a personalization system 804 to perform operations on contactless cards to issue them to customers. For example, the personalization system 804 may obtain and/or generate data that may be copied to each contactless card for each customer. The data may be unique to each customer and include information such as an account number, a customer's name, an expiration date, a card verification value (CVV), etc. In embodiments, the personalization system 804 may store the data in a secure memory, such as a hardware security module (HSM) of a contactless card. The data may also be provided to the issuer system 802 and/or the services 834 such that they can perform contactless card operations, e.g., validation, authentication, tap-to, etc.

The personalization system 804 may also generate unique keys for each of the contactless card. Each of the contactless card may have a unique pair of keys that may be further used to generate derived keys that are used to perform cryptographic operations for the card to communicate data in a secure manner. Each of the card's unique keys may be based on and/or associated with the issuer bank. In addition, the issuer system 802 and/or the switchboard system 830 may have each card's unique set of keys that they may use to perform validation operations by being able to generate the same derived keys to decrypt the data received from the contactless card during a validation or transaction process.

The personalization system 804 may also install one or more applets on the card. The applets may be used to perform various functions including performing crypto-graphic operations and generating a message and crypto-gram including data to perform card verification and trans-actions. In some instances, the personalization system 804 may install an applet to perform functions and include an applet version number. System versioning may be required such that other systems can operate accordingly. The system version dictates the applet version to embed in the cards by the personalization system 804 as well as the validation logic. For example, first-party systems may operate under version 0100, and utilization of a central system may operate under a different version, e.g., version 0200, to simplify the implementation and enable an authentication network. JavaCard and MultOS implementations of the applet may share the same version number.

The personalization system 804 may also include addi-tional applets to perform additional functions. For example, each card may include an applet configured to communicate with other devices either wired and/or wirelessly. In some instances, the communication may be based on the Europay, Mastercard, Visa, (EMV) standard, ISO/IEC 7816 standard for contact cards, and standards based on ISO/IEC 14443 contactless cards.

The system 800 further includes a switchboard system 830 and a services system 834 to enable multiple banks or issuers to provide contactless card tap-to-perform function-ality, e.g, validation, transactions, etc., while maintaining a high level of data security and separation between each of the issuer's data. For example, the switchboard system 830 and a services system 834 provides a set of functions and APIs configured to provide services to multiple issuers to perform validation, transaction, and other contactless card operations. In some instances, the switchboard system 830 may be maintained and provided by a central system that is owned and operated by a separate entity from any of the card issuers.

In embodiments, the switchboard system 830 may include a number of components, and systems, including routing services, workflow services, administrative services, authen-tication services, usage services, analytics services, and admin services 818.

In embodiments, the switchboard system 830 and services are configured to enable the multiple issuers to operate together. For example, the switchboard system 830 is con-figured to route messages and data from devices and con-tactless cards to the card issuer's corresponding services, e.g., services 834. For example, bank A may issue a con-tactless card and provide services A, the switchboard system 830 is configured to process messages and data from the contactless card issued by bank A to services A. In embodi-ments, the switchboard system 830 may utilize information in the messages and data to determine where to send them.

The switchboard system 830 and services also enable merchant systems 806 to process transactions for multiple and different issuers. For example, the switchboard system 830 may include an API that may be used by a merchant backend to get PII associated with a cardholder to perform a transaction. The switchboard system 830 may also include an API configured to initiate a session, e.g., a transaction session, and provide a validation token to a merchant app on a mobile device based on a contactless card performed on a mobile device.

The switchboard system 830 also includes validation functions and validation APIs, e.g., validation services 820, to perform validation operations. The switchboard system 830 may also be coupled with a message validation service 824 configured to communicate with the validation func-tions/APIs to provide cryptogram validation services 826. The cryptogram validation services 826 include a tap algo-rithm and are coupled with the validation HSM 828 to perform validation operations. Each of the APIs are dis-cussed in more detail in the following description.

In embodiments, the system 800 includes a number of systems to provide functionality and services utilizing con-tactless cards. At least a portion of these services may be performed with a contactless card and another device, such as a mobile device. As will be discussed in more detail, a mobile device may execute one or more apps that may be configured to operate with the functions and APIs provided by the system 800. In one example, the one or more apps may be developed utilizing a software development kit including instructions and functions to operate with the functions and APIs. The mobile apps may include an issuer mobile app 810, such as a banking app, and merchant mobile app 812. However, embodiments are not limited in this manner, and other applications such as web browsers, mini or micro apps (e.g., app clips), an operating system, and so forth may be configured to operate and utilize the function-ality provided by the system 800.

The system 800 provides many benefits. For example, under certain exemplary applet or application versions, validation can require access to a database, and new con-tactless cards can be added to the database at personalization time. This dependency between personalization and valida-tion may be undesirable in some examples, such as when the personalization and validation functions are performed by different actors and/or entities. Utilizing the system 800, under other exemplary applet or application versions, vali-dation does not require access to database and instead only uses data from the data payload and/or another message. In these embodiments, personalization and validation may be decoupled and the dependency noted above may be elimi-nated.

In embodiments of the system 800, a shared secret is not transmitted between devices and not recorded in a database. In these embodiments, instead of being stored in and retrieved from a database, a shared secret may be modified to be derived from a master key. In some embodiments, modifying the shared secret is not a change to an applet or other software application.

Deriving a shared secret from a master key can result in several advantages, including that this may remove the need for a card-level secret to be stored in a database. This may further remove the need to convey the shared secret between devices (e.g., between the contactless card and the client device). In addition, this may protect the secret in request data that is communicated between devices (e.g., contactless card request data).

In embodiments, the shared secret can be derived from a third key. The third key may be a key previously used to perform an operation with respect to the contactless card and/or the client device, or the third key may be a key that has not been previously used. In some examples, the shared secret may be personalized into the applet or other software application as is done, which may result in the avoidance of the need to change the applet or other software application.

The shared secret may be enciphered before including the contactless card to minimize the footprint for a potential attack.

Accordingly, embodiments of the system 800 have the benefit of personalization and validation operating independently.

Figure 9:
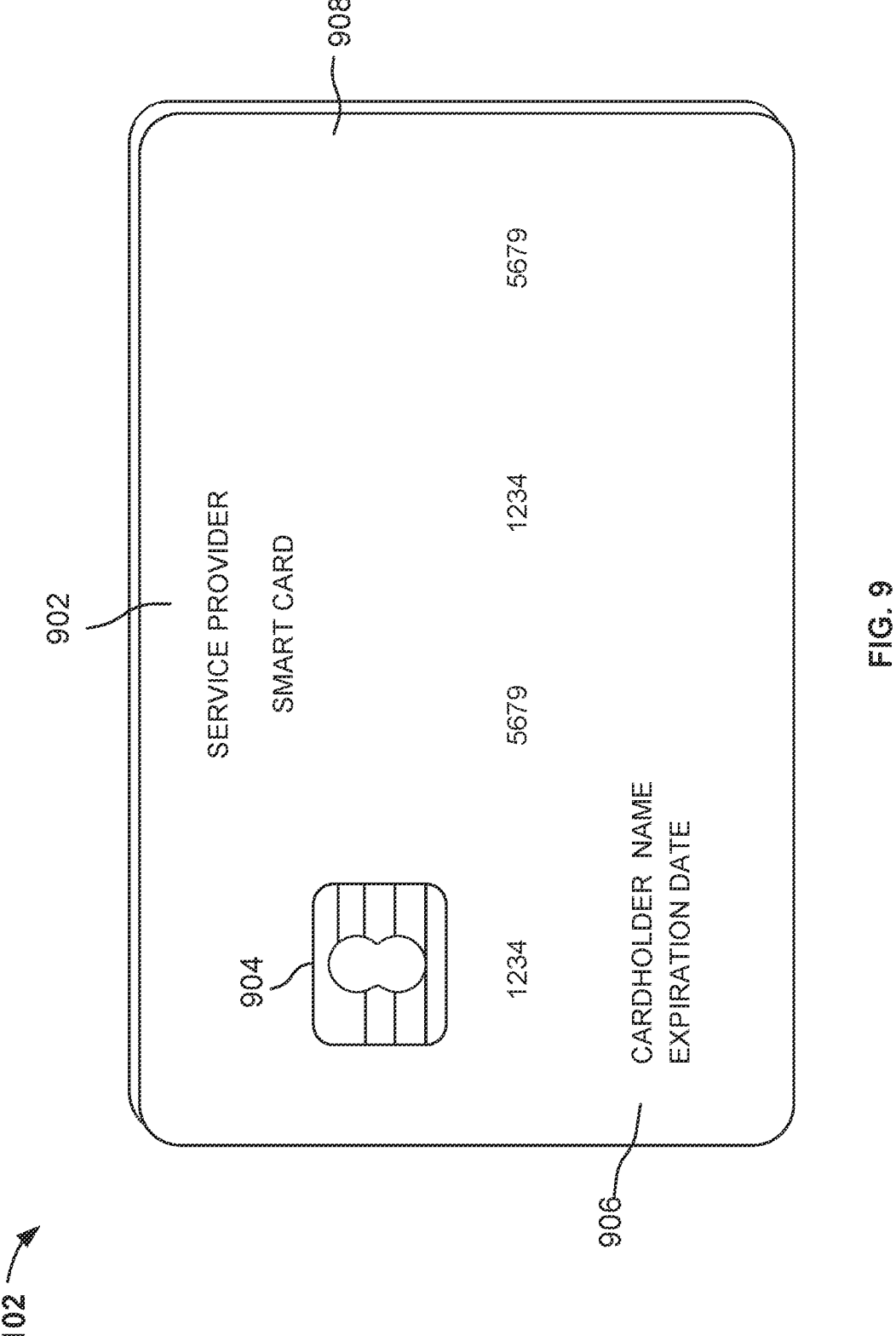
FIG. 9 illustrates an example of a contactless card 102 in accordance with embodiments.

FIG. 9 illustrates an example configuration of a contactless card 102 in accordance with embodiments discussed herein. The contactless card 102 may include a contactless card, a payment card, such as a credit card, debit card, or gift card, issued by a service provider or issuer as displayed as service provider indicia 902 on the front or back of the contactless card 102. In some examples, the contactless card 102 is not related to a payment card, and may include, without limitation, an identification card, a membership card, a hotel keycard, etc. In some examples, the transaction card may include a dual interface contactless payment card, a rewards card, and so forth. The contactless card 102 may include a substrate 908, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

Figure 10:
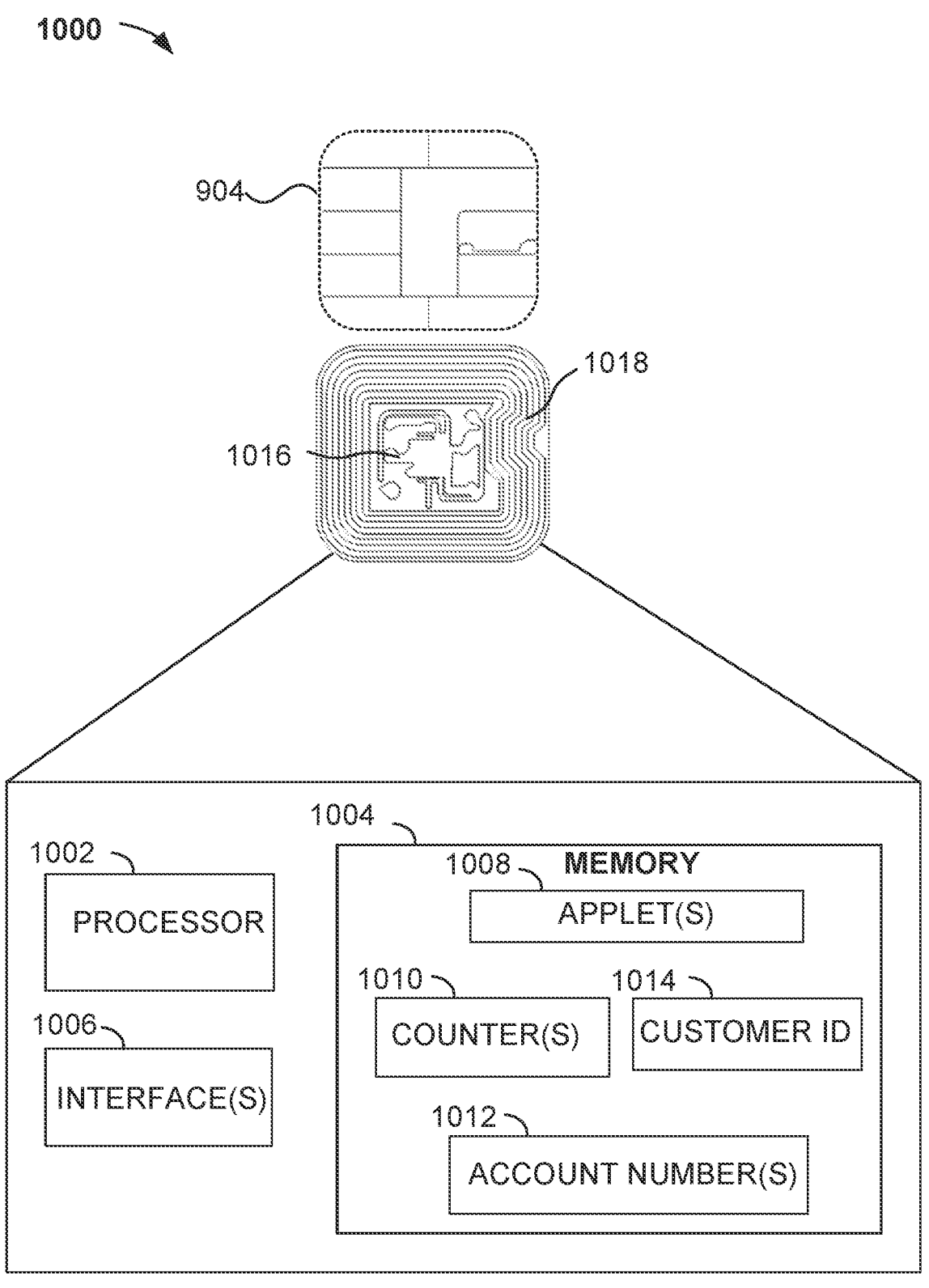
FIG. 10 illustrates an example of a contactless card components 1000 in accordance with one embodiment.

The contactless card 102 may also include identification information 906 displayed on the front and/or back of the card, and a contact pad 904. The contact pad 904 may include one or more pads and be configured to establish contact with another client device, such as an ATM, a user device, smartphone, laptop, desktop, a mobile device, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 10. These components may be located behind the contact pad 904 or elsewhere on the substrate 908, e.g. within a different layer of the substrate 908, and may electrically and physically coupled with the contact pad 904. The contactless card 102 may also include a magnetic strip or tape, which may be located on the back of the card (not shown in FIG. 8). The contactless card 102 may also include a Near-Field Communication (NFC) device coupled with an antenna capable of communicating via the NFC protocol. Embodiments are not limited in this manner.

As illustrated in FIG. 8, the contact pad 904 of contactless card 102 may include processing circuitry 1016 for storing, processing, and communicating information, including a processor 1002, a memory 1004, and one or more interface(s) 1006. It is understood that the processing circuitry 1016 may contain additional components, including processors, memories, hardware security module (HSM), error and parity/CRC checkers, data encoders, anticollision algorithms, controllers, command decoders, security primitives and tamperproofing hardware, as necessary to perform the functions described herein.

The memory 1004 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory, e.g., personalization system 804. Once the memory is programmed, it may not be rewritten, but it may be read many times. A read/write memory may be programmed and reprogramed many times after leaving the factory. A read/write memory may also be read many times after leaving the factory. In some instances, the memory 1004 may be encrypted memory utilizing an encryption algorithm executed by the processor 1002 to encrypted data. In some embodiments, at least a portion of the memory may be implemented as part of an HSM to store secret data, such as the card's master keys.

The memory 1004 may be configured to store one or more applet(s) 1008, one or more counter(s) 1010, a customer identifier 1014, and the account number(s) 1012, which may be virtual account numbers. In some instances, the customer identifier 1014 may be the card's unique identifier, such as the pUID. The memory 1004 may be configured to store additional information, such as a version identifier to identify an applet version, an issuer identifier to identify the issuer or bank, one or more key identifiers, and so forth.

The one or more applet(s) 1008 may comprise one or more software applications configured to execute on one or more contactless cards, such as a Java® Card applet. However, it is understood that applet(s) 1008 are not limited to Java Card applets, and instead may be any software application operable on contactless cards or other devices having limited memory. The one or more counter(s) 1010 may comprise a numeric counter sufficient to store an integer. The customer identifier 1014 may comprise a unique alphanumeric identifier assigned to a user of the contactless card 102, and the identifier may distinguish the user of the contactless card from other contactless card users and/or a contactless card from another contactless card. In some examples, the customer identifier 1014 may identify both a customer and an account assigned to that customer and may further identify the contactless card 102 associated with the customer's account.

As stated, the account number(s) 1012 may include thousands of one-time use virtual account numbers associated with the contactless card 102. An applet(s) 1008 of the contactless card 102 may be configured to manage the account number(s) 1012 (e.g., to select an account number(s) 1012, mark the selected account number(s) 1012 as used, and transmit the account number(s) 1012 to a mobile device for autofilling by an autofilling service.

The processor 1002 and memory elements of the foregoing exemplary embodiments are described with reference to the contact pad 904, but the present disclosure is not limited thereto. It is understood that these elements may be implemented outside of the contact pad 904 or entirely separate from it, or as further elements in addition to processor 1002 and memory 1004 elements located within the contact pad 904.

In some examples, the contactless card 102 may comprise one or more antenna(s) 1018. The one or more antenna(s) 1018 may be placed within the contactless card 102 and around the processing circuitry 1016 of the contact pad 904. For example, the one or more antenna(s) 1018 may be integral with the processing circuitry 1016 and the one or more antenna(s) 1018 may be used with an external booster coil. As another example, the one or more antenna(s) 1018 may be external to the contact pad 904 and the processing circuitry 1016.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 1018, processor 1002, and/or the memory 1004, the contactless card 101 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 1008 may be added to contactless cards to provide a one-time password (OTP) for multifactor authentication (MFA) in various mobile application-based use cases. Applet(s) 1008 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag. FIG. 6 illustrates an example of a message that may be generated by the contactless card 102 and communicated to perform validation and transaction operations.

One example of an NDEF OTP is an NDEF short-record layout (SR=1). In such an example, one or more applet(s) 1008 may be configured to encode the OTP as an NDEF type 4 well known type text tag. In some examples, NDEF messages may comprise one or more records. The applet(s) 1008 may be configured to add one or more static tag records in addition to the OTP record.

In some examples, the one or more applet(s) 1008 may be configured to emulate an RFID tag. The RFID tag may include one or more polymorphic tags. In some examples, each time the tag is read, different cryptographic data is presented that may indicate the authenticity of the contactless card. Based on the one or more applet(s) 1008, an NFC read of the tag may be processed, the data may be transmitted to a server, such as a server of a banking system, and the data may be validated at the server.

In some examples, the contactless card 102 and the issuer system 802 and/or switchboard system 830 may include certain data such that the card may be properly identified. The contactless card 102 may include one or more unique identifiers (not pictured). Each time a read operation takes place, the counter(s) 1010 may be configured to increment. In some examples, each time data from the contactless card 102 is read (e.g., by a mobile device), the counter(s) 1010 is transmitted to the validation service for validation and determines whether the counter(s) 1010 are equal (as part of the validation) to a counter of the issuer system 802 and/or switchboard system 830.

The one or more counter(s) 1010 may be configured to prevent a replay attack. For example, if a cryptogram has been obtained and replayed, that cryptogram is immediately rejected if the counter(s) 1010 has been read or used or otherwise passed over. If the counter(s) 1010 has not been used, it may be replayed. In some examples, the counter that is incremented on the card is different from the counter that is incremented for transactions. The contactless card 102 is unable to determine the application transaction counter(s) 1010 since there is no communication between applet(s) 1008 on the contactless card 102.

In some examples, the counter(s) 1010 may get out of sync. In some examples, to account for accidental reads that initiate transactions, such as reading at an angle, the counter(s) 1010 may increment but the application does not process the counter(s) 1010. In some examples, when the mobile device 10 is woken up, NFC may be enabled and the device 110 may be configured to read available tags, but no action is taken responsive to the reads.

To keep the counter(s) 1010 in sync, an application, such as a background application, may be executed that would be configured to detect when the mobile device 110 wakes up and synchronize with the issuer system 802 and/or switchboard system 830 indicating that a read that occurred due to detection to then move the counter 104 forward. In other examples, Hashed One Time Password may be utilized such that a window of mis-synchronization may be accepted. For example, if within a threshold of 10, the counter(s) 1010 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 1010 increases in the appropriate sequence, then it possible to know that the user has done so.

The key diversification technique described herein with reference to the counter(s) 1010, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from master key(s) based upon uniquely identifiable information for each entity that requires a key. In some instances, the master key(s) may be based on an issuer identifier, such as an issuer's BIN.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by one or more applets and derived by using the application transaction counter with one or more algorithms.

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 11:
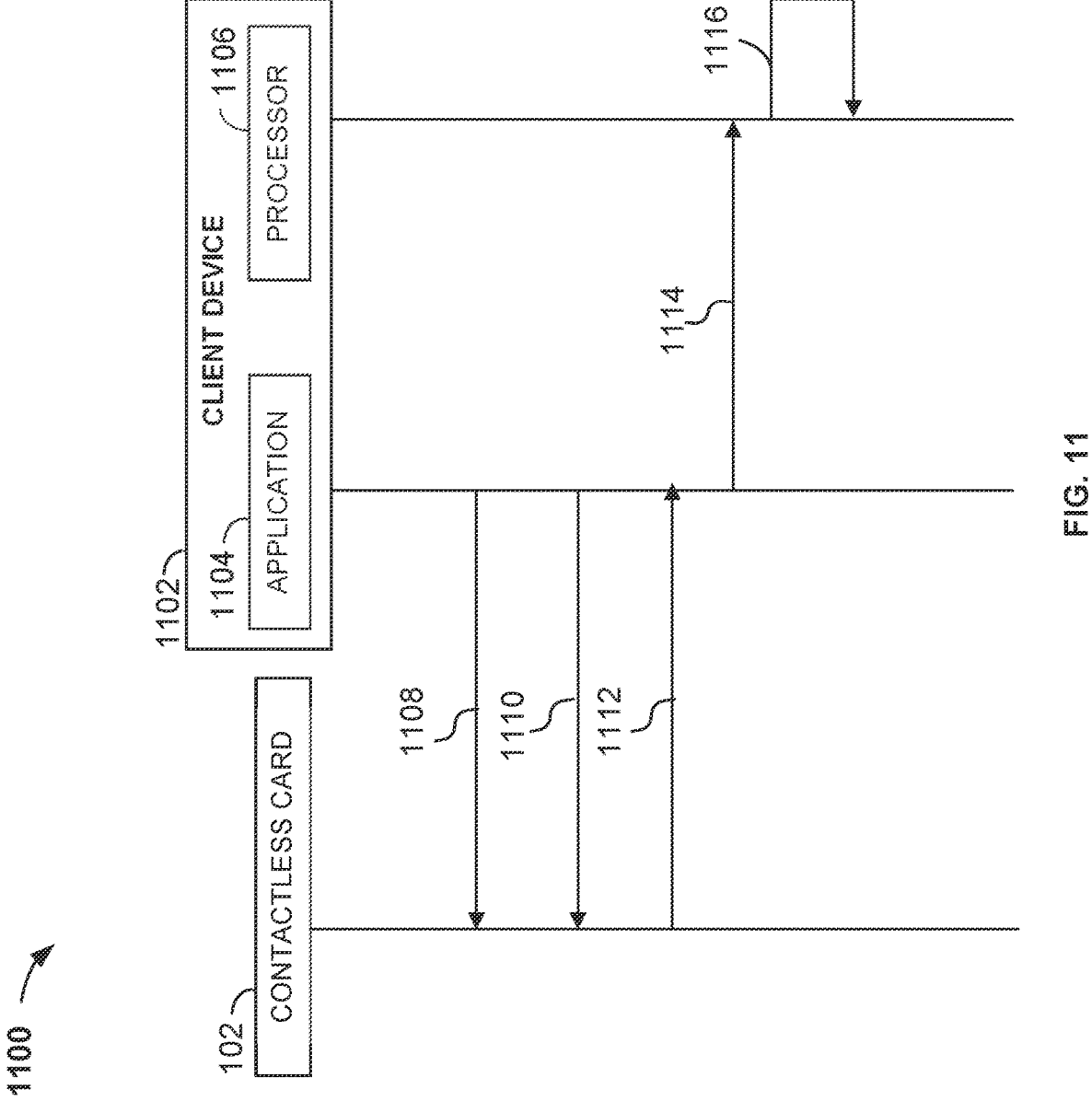
FIG. 11 illustrates an example of a sequence flow 1100 in accordance with embodiments.

FIG. 11 is a timing diagram illustrating an example sequence for providing data between a contactless card and a client device according to one or more embodiments of the present disclosure. Sequence flow 1100 may include communications between contactless card 102 and client device 1102. The client device 1102 may include an application 1104 and processor 1106. In embodiments, application 1104 may be a banking or issuer application. Other examples of applications may include a merchant application, a web browser, a gaming application, etc. In embodiments, the client device 1102 may include any number of applications, and embodiments are not limited in this manner. In embodiments, the client device 1102 may be a mobile device, a point-of-sale terminal, a personal computer, etc. Further, the client device 1102 may include additional components, such as additional apps, memory to store instructions for processing by the processor 1106, interfaces, and so forth.

At line 1108, the application 1104 communicates with the contactless card 102 (e.g., after being brought near the contactless card 102). In one example, a customer may be instructed to tap the contactless card 102 on a surface of the device ensuring that the card comes within wireless communication range of the card. Communication between the application 1104 and the contactless card 102 may involve the contactless card 102 being sufficiently close to a card reader (not shown) of the client device 1102 to enable NFC data transfer between the application 1104 and the contactless card 102. In some instances, the communication between the application 1104 and the contactless card 102 may be via the operating system supporting the wireless protocol, such as NFC, Bluetooth, WiFi, etc., and utilizing a wireless interface.

At line 1110, after communication has been established between client device 1102 and contactless card 102, the contactless card 102 generates a message authentication code (MAC) cryptogram, such as message 600. In some examples, this may occur when the contactless card 102 is read by the client device. In particular, this may occur upon a read, such as an NFC read, of a near field data exchange (NDEF) tag, which may be created in accordance with the NFC Data Exchange Format. For example, a reader application, such as application 1104, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message, such as message 600, may be generated which may include a header and a shared secret.

Session keys may then be generated. The MAC cryptogram may be created for the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some instances, the message communicated to the client device 1102 may include an encrypted portion and an unencrypted portion, as discussed herein.

In some examples, the MAC cryptogram may be transmitted as an NDEF tag, and in other examples the MAC cryptogram may be included with a link or uniform resource indicator (e.g., as a formatted string). In some examples, application 1104 may be configured to transmit a request to contactless card 102, the request comprising an instruction to generate a MAC cryptogram. In some examples, the MAC cryptogram may be included with additional data as illustrated in FIG. 6, e.g., an applet version, an issuer identifier, a card unique identifier, and a key identifier. In embodiments, at least the applet version and the issuer identifier may be unencrypted in the unencrypted portion of the message. The applet version and/or issuer identifier may be used by the switchboard system 118 to determine where to route the message.

At line 1112, the contactless card 102 sends the message including the MAC cryptogram to the application 1104. In some examples, the transmission of the MAC cryptogram occurs via NFC, however, the present disclosure is not limited thereto. In other examples, this communication may occur via Bluetooth, Wi-Fi, or other means of wireless data communication. At line 1114, the application 1104 communicates the message including the MAC cryptogram to the processor 1106.

In the illustrated sequence, at line 1116, the client device 1102 including the processor 1106 may verify the message including the contents, such as the MAC cryptogram pursuant to an instruction from the application 1104. For example, the MAC cryptogram may be verified, as explained below, e.g., by being processed through the switchboard system 118 and verification services. In some examples, verifying the MAC cryptogram may be performed by the client device 1102 or another device, such as a server of a banking system, an issuer system 802, a switchboard system 118, etc., in data communication with the client device 1102. For example, processor 1106 may output the message including the MAC cryptogram for transmission to the server of the issuer system or switchboard system 118, which may verify data in the message including the MAC cryptogram, the shared secret, and the counter. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

In embodiments, the exchange between a contactless card 102 and a client device 1102 may be executed to perform any number of functions as discussed herein. As discussed, embodiments include utilizing the contactless card 102 and tapping the card to a device to perform validation operations, e.g., MFA. In another example, the contactless card 102 may be used to perform a transaction for a good or service. Other tap-to conduct a function also exist including tap to autofill one or more fields, tap to launch an application, tap to initialize a contactless card, tap to install an application, tap to open a door, tap to start/enter a car, tap to unlock a device, and so forth. Embodiments are not limited to these examples. One or more operations discussed with respect to sequence flow 1100 may be performed as part of the tap-to functions operations.

As mentioned, the systems described herein are configured to support any number of tap-to functions using a contactless card, e.g., authentication/validation, performing a transaction, auto-filling fields, etc. FIG. 12 illustrates one example of a routine 1200 that may be performed by systems herein to perform authentication or validation with a contactless card. In the illustrated example, the system may receive contactless card information from a contactless card via a device, such as a mobile device or a POS terminal. The system may process the information to determine whether it's authentic or not and generate a result. If the card is authenticated, the result may include a generated validation token indicating that the card is successfully validated. In some instances, as discussed in more detail in FIG. 14 and routine 1400, the validation token may be used to perform additional functions, such as performing a transaction. Other functions may include opening a door, obtaining information, auto-filling fields, launching applications, providing multi-factor authentication, and so forth.

In block 1202, the routine 1200 includes receiving, by a system, a request comprising a message associated with performing a validation. In embodiments, the request may be sent to the switchboard system 1808 via a post to an API. Specifically, the switchboard system 1808 may include a set of APIs configured to receive requests and provide responses to authenticate user. In this example, the request may be validation or authentication and include a message having an encrypted portion and an unencrypted portion. In some embodiments, the request may also include a session token and extensions. Below is one example format of the request.

```
POST/validation
{ "tapMessage": "encrypted_portion/decrypted_portion",
```

-continued

```
"sessionToken": "abcdefg..." //Token from Session Initialization
"extensions": {...}}
```

Note that embodiments are not limited to this example. In embodiments, the encrypted portion of the message may be used by the switchboard system 1808 to authenticate and the decrypted or unencrypted portion may be used by the switchboard system 1808 to route the message to the appropriate processes to perform authentication. FIG. 6 illustrates an example of a message 600. In embodiments, the unencrypted portion may be utilized by the system to determine where to route at least the message to perform validation.

In some instances, a client session may first be required to be established between the device and the system to obtain the validation token. In these instances, the device may send a request or post to a session initialization API which may include usage information for the validation token. For example, the validation token may be utilized as a part of a transaction and the session initialization may be established by posting to an API with information, such as a merchant identifier, a reader identifier, and client information including one or more of an Internet Protocol (IP) addresses, a geolocation, a device identifier, a user agent, and a hostname. The post to establish a session to perform a transaction may have the following format, but is not limited in this manner:

```
POST /session{
    "merchantId": "3fa85f64-5717-4562-b3fc-2c963f66afa6"
    "readerId": "3fa85f64-5717-4562-b3fc-2c963f66afa6",
    "clientInformation": { "ipAddress": "198.xx.xxx.xx", "geolocation": { },"device":
{ }, "userAgent": "string", "hostname": "example.com"}}
```

In embodiments, the switchboard system 1808 may process the post and perform one or more operations to determine risk factors based on the client information and a determination whether to issue a session token. In response, the system may return a session token in a JavaScript Object Notation (JSON) Web Token (JWT) format:

```
{"sessionToken": "<jwt>".
    "valid": true,
    "validUntil": "2022-02-04T19:15:39.693Z"}
```

Further, the session token JWT signed by the session API may include the following embedded details:

```
{iss: ", //Identifies the issuer of the JWT, will be the same for every JWT
sub: '<uuid>', //Randomly generated UUID representing the session ID
exp: 1648217401, //Epoch timestamp representing the point in time in which this JWT
expires
    merchantId: <merchantIdUuid>, //Merchant ID from request payload
    readerId: <readerIdUuid>, //Reader ID from request payload
creationTime: 1648217401, //Epoch timestamp representing the point in time in which the
session was created}
```

As mentioned, the session token may also be included with the request for the validity token. In some instances, the session token may be included in a first request for a validity token, but is not required for future requests. In embodiments, the post and response to establish a session may include different usage information based on what the session is being established for. For example, if the session is to perform validation or authentication, the post may include information about the requesting party. For example, suppose the session is being established as part of an autofill process. In that case, the session is being established as part of an autofill process, the post may include usage information such as the website receiving the data, the requested data session is being established as part of an autofill process, the post may include usage information such as the website receiving the data, the data being requested, etc. Embodiments are not limited in this manner.

In block 1204, the routine 1200 includes determining, by the system, a validation service associated with a contactless card issuer based on information in the unencrypted portion of the message. For example, the switchboard system 1808 may determine the contactless card issuer based on the issuer identifier including the message. The validation service(s) may include a number of processes and/or functions that may be executed to validate the information in the encrypted portion of the message.

In block 1206, the routine 1200 includes sending at least the encrypted portion of the message to the validation service. As the validation service is associated with the contactless card issuer, it is enabled to access secure data associated with that particular issuer, but not any other issuer. Thus, each issuing bank's information may be siloed to increase data security.

In embodiments, the validation service is configured to validate the information in the message, e.g., the MAC cryptogram, the counter value, etc. The validation service may send the message or at least a portion of the message (e.g., encrypted portion) to a message validation service 824 and a cryptogram validation service 826 to perform the validation, as illustrated and discussed in FIG. 13A and FIG. 13B.

In embodiments the validation service may determine a result of the validation operations performed by the message validation service 824 and cryptogram validation service 826 and return the result. In some instance, the request may include an indication that the validation was successful or not successful. In addition, the validation may determine and/or generate a validation token that may be returned to the system to return to the device.

In block 1208, routine 1200 includes generating a validation token based on the validation service successfully validating the information in the encrypted portion of the message. The validation token may be in a JWT format, such as:

FIG. 12 includes a routine performed by the switchboard system 1808 and a device, such a mobile device, to validate the contactless card information through the switchboard system 1808. However, in some instances, the device may send the request including the message directly to the issuer system 802, and the issuer system 802 may route the message through the validation service of the switchboard system 1808 to perform the validation and receive a validity token. In even other instances, the issuer system 802 may perform the validation itself and return an indication as to whether the contactless card is valid or not valid.

FIG. 13A illustrates a detailed view of the validation system 1304 that may perform one or more operations to validate information and may be part of the switchboard system 1808.

In some example embodiments, the validation system 1304 includes message validation service 824 configured to receive the incoming validation request, e.g., the message generated by a contactless card when performing a tap or NFC read or at least the encrypted portion of the message. In one example, the request may be directed to the message validation service 824 based on processing preformed by the switchboard system 1808 processing the issuer identifier in unencrypted portion of the message, as discussed in FIG. 4A-FIG. 4C, e.g., via a switchboard node. In some instances, the message may be received from another system, such as the issuer system 802.

In embodiments, the message validation service 824 may perform one or more services to perform an initial validation of the message. For example, the message validation service 824 may parse the message fields to determine the card's unique identifier, e.g., pUID. The message validation service 824 may utilize the unique identifier as a key to retrieve associated card record data stored in a database, such as a card database 1302, and perform basic validations with the record data. For example, the message validation service 824, may validate the information in the message against the information in the record, e.g., app version, issuer ID, pKeyID, pUID, pATC, nonce, and/or pSHSEC. Additional information in the message may include account information, customer data, and/or card information, and the message validation service 824 may validate it matches the stored data for the card.

In embodiments, the card database 1302 may store additional information such as card personalization details

---

{ iss: "DistributionPartner", //The unique identifier of the Validation API implementor
    exp: "2022-02-04T16:57:19Z", //The point in time where the validity token should expire (Recommended 15 min TTL)
    puid: 0123456789101112, //Unique identifier of the card tapped
    clientId: "3fa85f64-5717-4562-b3fc-2c963f66afa6", //Unique identifier of the client
    timeVerified: "2022-02-04T16:57:19Z" //The point in time where the card was deemed valid}

---

55

In block 1210, routine 1200 returns, by the system, the validation token to the mobile device. In embodiments, the validation token may be in a response to the post and be in a format, such as:

including a card platform and the applet version (app version), and the message validation service 824 may also ensure the card platform and/or the applet version in the message matches the stored information.

---

{"requestId": "3fa85f64-5717-4562-b3fc-2c963f66afa6",
    "valid": true,
    "validityToken": "eyJhbGciOiJIUzI1NiIsInR5cCI6IkpXVCJ..."}
    Note that if the validation operation(s) fails, the routine 1100 may return a failure indication to the requesting device.

In some instances, the card database 1302 may also store an index or key identifier to retrieve cryptographic keys from the validation HSM 828, and the expected counter value. The cryptographic keys may be used to decrypt the encrypted portion of the message. In other instances, the key identifier or index may be provided in a field in the message itself. The message validation service 824 also validates and checks that the counter value is in sequence if the card record is found in the card database 1302.

In response to the initial validation being successful, the message validation service 824 logs the validation request in the card database 1302, and requests the cryptogram validation service 826 to validate the cryptogram and information in the cryptogram.

In embodiments, the message validation service 824 may also compare the counter value in the message matches a counter value maintained in the card database 1302. In some instances, the counter value (pATC) on the card may become out of sync with the stored counter value, e.g., an unregistered read. In these instances, the message validation service 824 may ensure that the card counter value is within an acceptable range of the stored counter value. In some instances, of the card counter value is out of an acceptable range of the stored counter value or is less than the stored counter value, the message validation service 824 may determine that fraud has occurred.

In embodiments, the message validation service 824 basic validations are successful, the message validation service 824 may log transaction and validation details for auditability and communicates with the cryptogram validation service 826 to validate the cryptogram. To validate the cryptogram, the cryptogram validation service 826 may generate one or more pairs of keys to first decrypt the cryptogram. In some instances, the cryptogram validation service 826 may retrieve master keys associated with the issuer using the key identifier in the unencrypted portion of the message from the validation HSM 828. The cryptogram validation service 826 may use the master keys to generate derived keys based on the card or the unique identifier. The derived keys may then be used to generate session keys for a given session using the counter value maintained by the validation system and/or provided in the message. The counter value should match or be within a range of the counter value on the contactless card. Note that in some embodiments, the cryptogram validation service 826 may start with the derived keys instead of the master keys, which may be stored in the validation HSM 828 and then generate the session keys. Embodiments are not limited in this manner.

In embodiments, the cryptogram validation service 826 may decrypt the cryptogram with the decrypt session key and compare the information from the cryptogram to stored information, e.g., information stored in card database 1302. The information may include a shared secret. In some instances, the counter value may be in the encrypted portion of the message and the cryptogram validation service 826 may perform the validation of the counter value.

In embodiments, the cryptogram validation service 826 may validate additional information including the card identifier, an account number, customer name, etc., if they are also in the encrypted portion. If the cryptogram is successfully decrypted and the information matches, the cryptogram validation service 826 may validate the message, and the validation service may return a successful validation result to the device. In some instances, the result may include a validity token that may be used to perform additional operations.

In some embodiments, the system 800 may utilize a validation HSM 828, which may be payment-grade HSM to store the master keys used in the cryptography and to perform operations that involve them, e.g., derive other keys, encrypt, decrypt. However, payment-grade HSMs are very restricted and require proprietary libraries to interact with them. To avoid the dependency on hardware and make the reference implementation easier some embodiments use a java key storage 1306, as illustrated in FIG. 13B, that follows the same steps but uses an open source cryptographic library. Embodiments are not limited in this manner.

Figure 14:
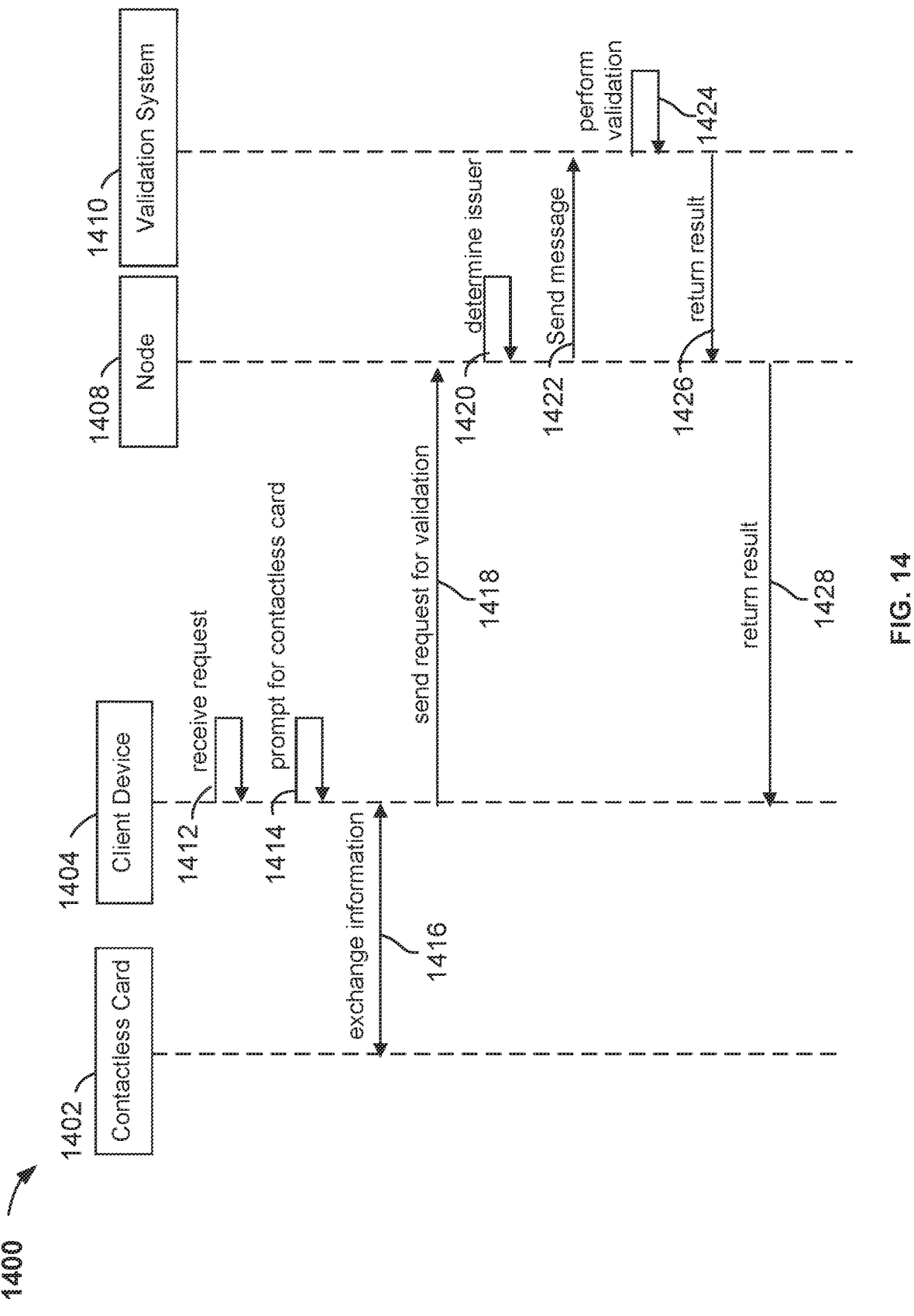
FIG. 14 illustrates an example of a sequence 1400 in accordance with embodiments.

FIG. 14 illustrates an example sequence diagram 1400 in accordance with embodiments discussed herein. The sequence diagram 1400 illustrates the high level steps that may be performed to validate a user and their contactless card with a switchboard system 1406. FIG. 14 illustrates one possible sequence and embodiments are not limited to this sequence. In some instances, one or more steps may occur before other steps and/or in parallel with each other.

At 1412, the client device 1404 receives a request to perform a validation of a user. For example, a mobile app, such as a merchant app, may generate a request to validate the user of the client device 1404 to perform a transaction. In another example, an app may request to validate the user as part of a multi-factor authentication sequence. In a third example, an app may request to validate the user as part of a login sequence. Embodiments are not limited in this manner. In some instances, the request may be generated by the user themselves, e.g., via a user interface, or by an external system, such as a POS transactional system.

At 1414, the client device 1404 may generate a prompt for the user to bring the contactless card 1402 with a specified range of the client device 1404. The prompt may be a visual prompt displayed on a display of the client device 1404 and/or an audio prompt played through a speaker. In some instances, the prompt may instruct the user to tap the card on a surface of the client device 1404.

At 1416, the client device 1404 may conduct a communication exchange with the contactless card 1402. For example, in response to the user bringing the contactless card 1402 within a distance of the 1404, a wireless communication exchange may occur between the client device 1404 and the contactless card 1402. The wireless exchange may be in accordance with a wireless protocol, such as Bluetooth, NFC, WiFi, etc. In some instances, the exchange may be a "wired" exchange based on a the client device 1404 contacting contacts of the 1402. In embodiments, the exchange may be accordance with EMV with modifications made to the messages, as discussed herein. In some instances, the client device 1404 may read and/or receive a message from the contactless card 1402. Additionally, the client device 1404 may also write and/or send data to the card, e.g., a nonce, that may be incorporated back into the data read by the client device 1404.

In embodiments, the client device 1404 may receive data, such as in a message, from the contactless card 1402 as part of the exchange. The message may include an encrypted portion, in a cryptogram, for example, and an unencrypted portion. FIG. 6 illustrates an example of a message 600.

At 1418, the client device 1404 may send a request for validation to the switchboard system 1406. The request may include the message. As discussed in FIG. 11, the request may be a post to an API of the switchboard network 1408. At 1420, the switchboardnetwork 1408 may determine where to route the request and which validation services to perform the validation. Specifically, the switchboard network 1408 may utilize an issuer identifier in the unencrypted portion of the message to determine an issuer and their validation services.

At 1422, the hub network 1408 may send the message to the validation system 1410 to be validated. The validation system 1410 may process the message with services that are specifically allocated to the issuer and/or with data that is associated with the issuer. At 1424, the validation system 1410 may perform one or more validations, as discussed with respect to FIG. 13A and FIG. 13B.

At 1426, the validation system 1410 may return a result of the validation to the switchboard network 1408, and the switchboard network 1408 may forward the result to the client device 1404 at 1428. The result may include a validation token that may be used to validate the user. For example, the validation token may be used as a login for the is authenticated by the system. In some instances, the contactless card may have been previously authenticated or as part of the transaction process.

The encryption parameters may include a merchant certificate that may have been previously provided to the merchant. For example, the system may provide each merchant a unique certificate during an onboarding process. In addition to the merchant certificate, the encryption parameters may also include a public key and a public key signature. The public key signature along with the merchant may be utilized to validate the public key.

In embodiments, the request may be a post to an API interface of the switchboard system 830. Below is one example format of an API POST in accordance with embodiments. Note that embodiments are not limited in this manner the request may be other formats.

```
POST /cardholder-information
    {"fields": ["firstName", "middleName", "lastName", "dob", "ssn", "address", "card"], //Fields
to return from customer record
        "validity Token": "eyJhbGciOiJIUzI1NiIsInR5cCI6IkpXVCJ...",
        "encryptionParameters": {"certificate": "-----BEGIN CERTIFICATE-----\nQWERT....",
        "ephemeralPublicKey": "eyJhbGciOiJIUzI1NiIsInR5cCI6IkpXVCJ...",
        "publicKey Signature": "eyJhbGciOiJIUzI1NiIsInR5cCI6IkpXVCJ..." //Signature of the
public key. Should be used in conjunction with the certificate to validate the public key
        }}
``` user to log into an app. In another example, the validation token may be provided to another system as part of an MFA sequence. In a third example, the validation token may be provided to an entry system to gain access to a door or room. As will be discussed in more detail in FIG. 15, the validation token may be determined and then provided to a merchant system to perform a transaction.

In embodiments, the system 800 may be utilized to perform additional functions, such as conducting transac- In some instances, the customer may first have to consent before the information requested by the merchant will be provided to the merchant. In one example, the merchant app on a device, such as the mobile device or POS device, may confirm with customer to consent to providing the information to the merchant. The merchant app may then send a consent message to the system 800, e.g., switchboard system 830, as an API post. Below is one example format of the POST.

```
POST /cardholder-information/consent
{"fields": ["firstName", "middleName", "lastName", "dob", "ssn", "address", "card"],
//Fields to return from customer record
"validity Token": "eyJhbGciOiJIUzI1NiIsInR5cCI6IkpXVCJ...",
"sessionToken": "abc..." //From session initialization
}
``` tions between cardholders, issuers, and merchants. FIG. 15 illustrates one example routine 1500 that may be performed by system 800 including the switchboard system 1808 to process a transaction for a merchant. In some instances, the transaction may be initiated on a device, such as a mobile device or a POS terminal.

In block 1502, the routine 1500 includes receiving a request for contactless card holder information, the request may include one or more indicators, a validation token, and encryption parameters. The request for information may be required to perform a transaction. The one or more indicators may indicate what information is being requested by a merchant system to perform the transaction, e.g., fields. The information may include a customer's name (first, middle, and last), date of birth, social security number, address, account number, contactless card information (account number, cvv, expiration date), etc.

In embodiments, the validation token may be a token provided by the system that may be used to perform functions, as discussed in FIG. 12, FIG. 13A, FIG. 13B, and FIG. 14. The validation token indicates that the contactless card The consent may include an indication of the information permitted to provide to the merchant, the validity token, and the session token. In some instances, the system 800 may send a confirmation request to the device, e.g., via the issuer's mobile app. If consent is successfully given, the system 800 may return a success response to the consent to share request. Below is one example response.

```
700 OK
{"requestId": "3fa85f64-5717-4562-b3fc-2c963f66afa6",
    "success": true }
```

In block 1504, the routine 1500 includes determining a commerce service associated with the contactless card issuer. For example, the switchboard system 830 may perform a lookup to determine which issuer is associated with a contactless card based on the information in the cardholder information request. In a specific example, the switchboard system 830 may utilize the validity token to determine the issuer. As discussed, the validity token includes information, such as the issuer or distribution partner and the switchboard system 830 may utilize the information to determine associated commerce service(s) that may further process the request.

In block 1506, the routine 1500 includes sending at least a portion of the request to the commerce service. The commerce service may be part of the switchboard system 1808, e.g., "merchant/commerce api," and perform one or more operations. Specifically, the commerce service may validate the validity token and the information in the validity token. In embodiments, the validity token may be communicated to the commerce service(s) encrypted via a public key obtained by the merchant. The commerce service(s) may include an associated private key and perform a decryption prior to validating the information within the token.

The commerce service(s) may also ensure that the cardholder has consented to providing the request information. For example, the commerce service may ensure that the customer has a consent to share record on the services system 734.

to whether the request is successful or not, and encryption parameters. The encryption parameters may include a public key, an issuer certificate, and a public key signature to verify the public key with issuer certificate. The public key, the public key signature, or both may be encrypted with the merchant's public key, such that only the merchant system 806 may decrypt the public key and signature. The unencrypted public key may be used to encrypt information to send to the issuer system 802, and the issuer system 802 may decrypt the information with an issuer's private key.

The merchant system 806 may validate the issuer certificate based on information exchanged between the merchant system 806 and the issuer system 802 during an onboarding process. The merchant system 806 may decrypt the public key and the signature with the merchant's private key to obtain the key and signature. The signature with the certificate may be used to verify the issuer's public key. Below is an example response. Note that embodiments are not limited this manner and the response may take different formats.

```
{"requestId": "3fa85f64-5717-4562-b3fc-2c963f66afa6",
  "success": true,
  "cardholderInformation": "eyJhbGciOiJIUzI1NiIsInR5cCI6IkpXVCJ....", //Encrypted
cardholder information
  "encryptionParameters": { "ephemeralPublicKey":
"eyJhbGciOiJIUzI1NiIsInR5cCI6IkpXVCJ...." // Ephemeral key, encrypted with the Merchant's
passed public key
    "certificate": "-----BEGIN CERTIFICATE-----\nQWERT....",
    "publicKey Signature": "eyJhbGciOiJIUzI1NiIsInR5cCI6IkpXVCJ..." //Signature of the
public key. Should be used in conjunction with the certificate to validate the public key
    },}
```

In embodiments, the commerce service(s) may be configured to obtain the data requested in response to validating the validity token, and that the customer has consented to share. In some instances, the commerce service may obtain the information from the issuer system 802 via an API. For example, the commerce service sends a request to the issuer system 802, which may include the one or more indicators, the validity token, and encryption parameters. In embodiments, the issuer system 802 may validate the merchant certificate based on information provided by the merchant during an onboarding process.

The issuer system 802 may also obtain the requested information from one or more data stores, e.g., databases. The information may then be encrypted by the issuer system 802 such that the switchboard system 830 may not be able to 'see' or decrypt the information. Therefore, the customer's information is securely maintained by the issuer system 802 and/or switchboard system 830 is only visible to the merchant system to perform the transaction.

In one example, issuer system 802 may generate an eliptic-curve Diffie-Hellman (ECDH) secret and encrypts requested cardholder data. The issuer system 802 may return the encrypted data and contactless card issuer certificate to the commerce service and switchboard system 830. Further and at block 908, the routine 1500 includes receiving the contactless card holder information and a contactless card issuer certificate, e.g., from the issuer system 802.

At block 1510, the routine 1500 includes sending a response to the request for the contactless cardholder information to the merchant system. The response may include the cardholder information encrypted. Thus, the information may be passed between the issuer system 802 and the merchant system 806 securely. The response may include additional information, such as a request identifier identifying the associated request (see block 1502), an indication as In embodiments, the merchant system 806 may receive the encrypted cardholder information and decrypt it with the merchant's private key. In embodiments, the merchant system 806 may use the information to perform a transaction or another function, e.g., populate one or more fields of checkout form, save the information in secure data store for future use, and so forth.

Figure 16:
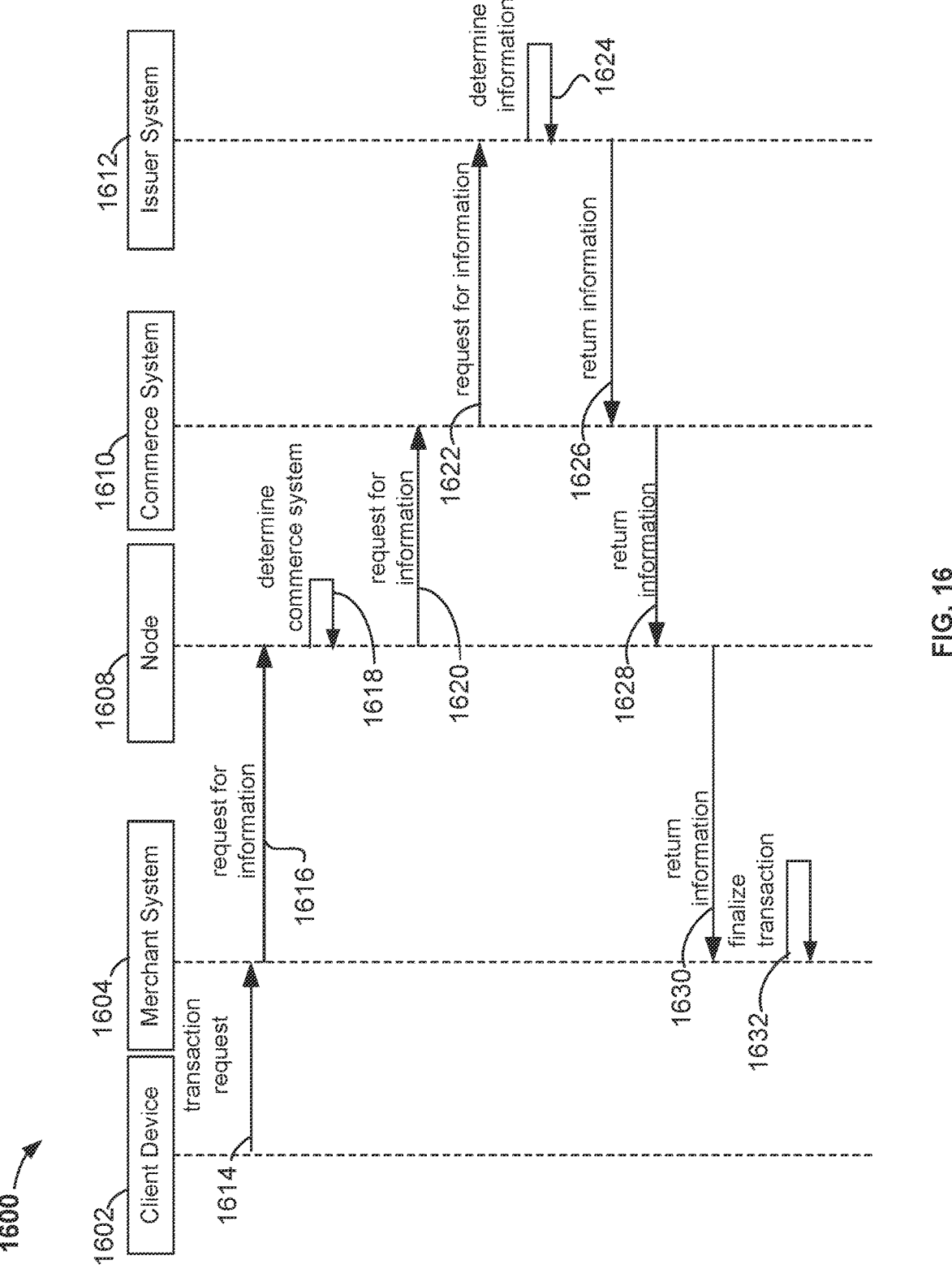
FIG. 16 illustrates an example of a sequence 1600 in accordance with embodiments.

FIG. 16 illustrates an example of a sequence diagram 1600 performed in accordance with embodiments. The sequence may be performed between systems discussed herein as part of a transaction process that utilizes a validation token to obtain the information to perform the transaction by the merchant.

At 1614, a client device 1602 may send a request to a merchant system 1604 to perform a transaction. The transaction may be for a purchase for a good or service, and embodiments are not limited in this manner. In embodiments, the request may include information about the transaction, an identifier, item(s) for purchase, customer information, etc. In embodiments, the request may also include a validation token that may be used by the merchant system 1604 to perform the transaction with the backend banking systems, e.g., the switchboard system 1606 and the issuer system 1612. The validation token may have been previously obtained in accordance with the previously described processing flows and sequences.

At 1616, the merchant system 1604 may send a request for information to perform the transaction to the switchboard system 1608 of the switchboard system 1606. The request may be an API POST and includes a listing of the information requested (fields), the validation token, and encryption information that may be used to encrypt the requested information. FIG. 14 at block 1402 discusses one example API POST format in accordance with embodiments.

At 1618, the switchboard system 1608 may utilize the information in the request to determine an issuer and/or a commerce system associated with the transaction. For example, the switchboard system 1608 may utilize the validation token to determine the associated issuer bank and the corresponding commerce system.

At 1620, the switchboard system 1608 may send a request to the determined commerce system 1610 to process the request and determine the information. Further and at 1622, the commerce system 1610 may send a request to the issuer system 1612 for the requested information. The request may include encryption information may be used to by the issuer system 1612 to encrypt the requested information such that data remains secure and unidentifiable until the merchant system 1604 receives and decrypts the information, as discussed in FIG. 14.

At 1624, the issuer system 1612 may determine the information based on the request and encrypt the information. The encrypted information may be returned to the commerce system 1610 at 1626. The commerce system 1610 may send the encrypted information to the switchboard system 1808 at 1628. The encrypted information may remain secure and the none of the systems switchboard system 1606 have the ability to decrypt the information. And the information remains secure until it is decrypted by the merchant system 1604. At 1630, the switchboard system 1808 may send the encrypted information to the merchant system 1604. The merchant system 1604 may decrypt the information and use the information finalize the transaction at 1632.

Figure 17:
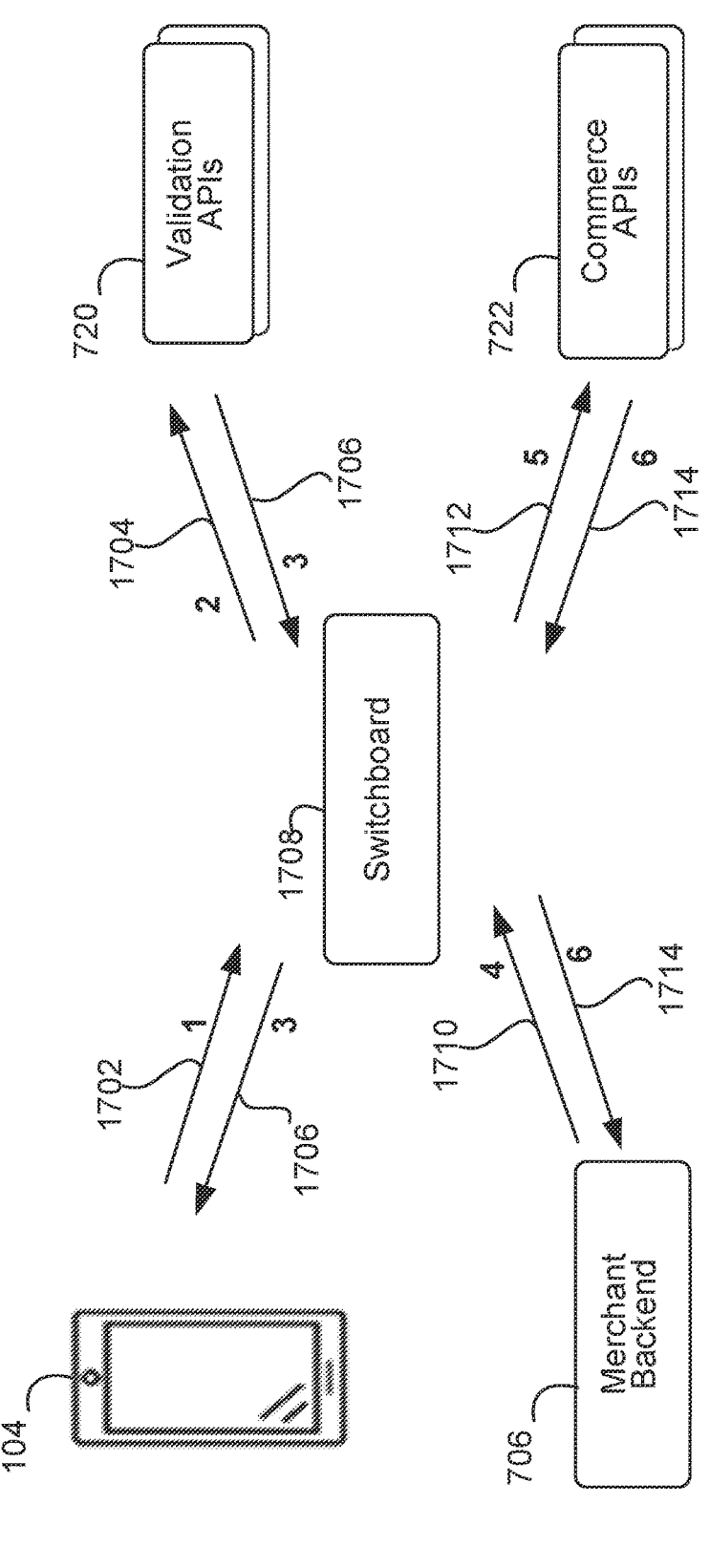
FIG. 17 illustrates an example of a sequence 1700 in accordance with embodiments.

FIG. 17 illustrates an example of a simplified processing flow 1700 that may be performed in accordance with embodiments. Specifically, the processing flow 1700 may be performed in environments utilizing a switchboard system 108/208 to provide processing and communication in a multiple bank issuing system environment. The processing flow 1700 is one example of a flow to perform a transaction between a merchant and a customer utilizing a contactless card issued by one of a plurality issuing banks and includes both, obtaining a validation token (as discussed in, e.g., FIGS. 7, 8A, and 8B), and obtaining transaction information (as discussed in, e.g., FIGS. 10 and 11).

At line 1702, the user may tap their contactless card on the mobile device 104. In one example, the user may tap their contactless card on the device in response to a mobile app presenting a prompt to tap the card. The contactless card provides data to the mobile device 104, and the mobile device 104 may forward the data to the switchboard system 1708. The data may include encrypted and unencrypted data in a message, such as message 900*b*.

At line 1704, the switchboard system 1708 may utilize the data in the message to determine a card validator, e.g., a validation service. For example, the switchboard system 1708 may perform a lookup with the unencrypted data, e.g., the issuer ID, to determine the validation service 820 to route the message.

The switchboard system 1708 may send the message to a corresponding validation service 820 including a validation API configured to process the message including the encrypted portion. Specifically, the corresponding validation service 820 may decrypt the encrypted portion and authenticate the data, e.g., as described in FIG. 13A or FIG. 13B.

At line 1706, the validation service 820 may communicate a validity token back to the switchboard system 1708 and the mobile device 104. At line 1710, the merchant system 806 requests user/consumer information from the switchboard system 1708 with a request for cardholder information including the validity token and other data, as discussed in FIG. 14. The switchboard system 1708 may perform a lookup with a corresponding card issuer based on information received from the merchant system 806, e.g., a validity token.

The switchboard system 1808 communicates with the commerce service of the issuer network and corresponding card issuer and receives encrypted user/consumer information at line 1714. The switchboard system 1808 may return the encrypted user/consumer to the merchant system 806 and the merchant system 806 will decrypt the information to perform the transaction or another function.

Figure 18:
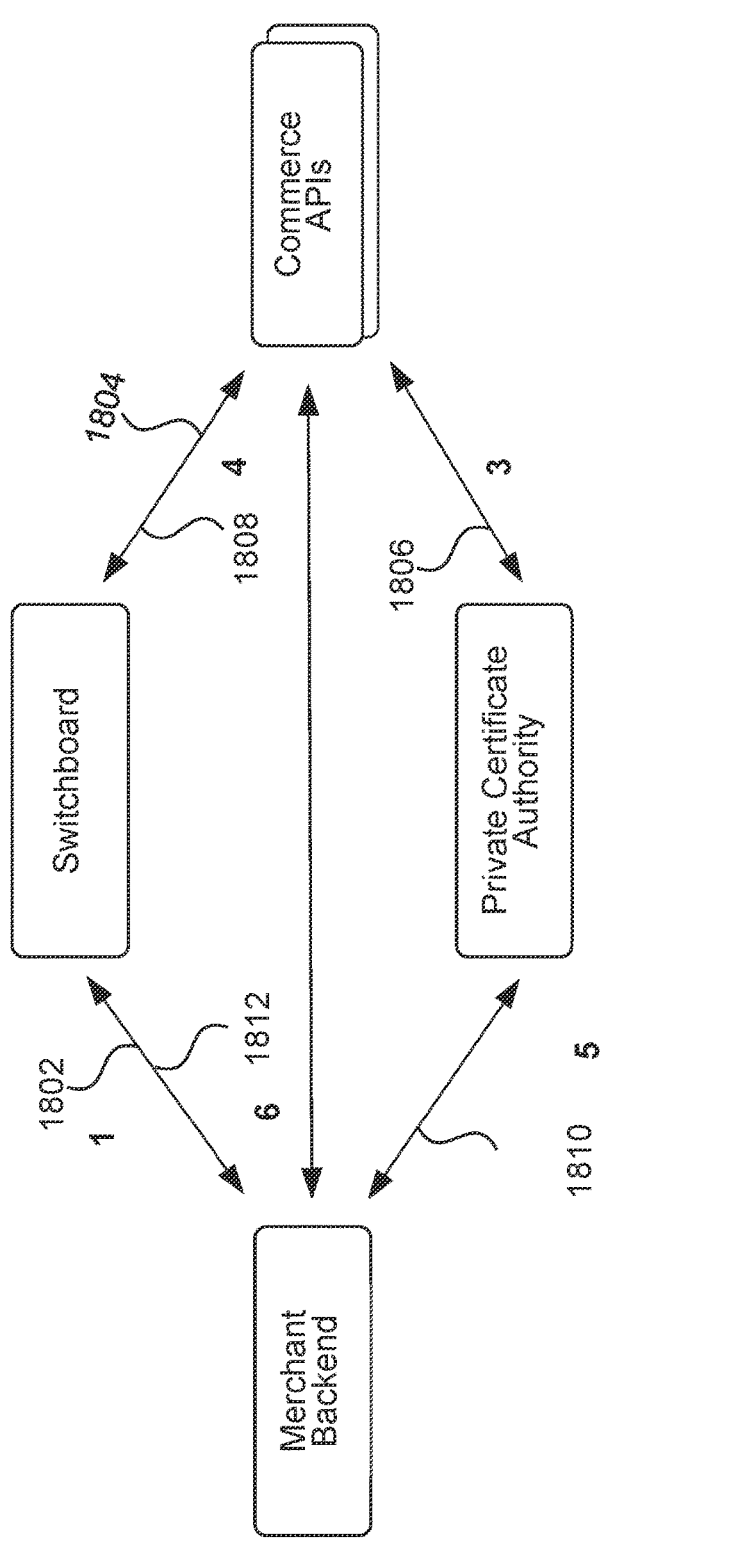
FIG. 18 illustrates an example of a sequence 1800 in accordance with embodiments.

FIG. 18 illustrates a simplified example of an encryption flow 1800 that may be performed in accordance with embodiments discussed herein to ensure that data communicated between an issuer system and a destination system, such as a merchant system 1814, is secure. At 1802, the merchant 1814 requests cardholder information from the switchboard system 1816, e.g., in a request message through an API. At 1804, the encryption flow 1800 includes the switchboard system 1816 performing a look-up to determine the card issuer to determine which Commerce API 1818 to route data. The data is communicated to the associated commerce API services. At 1806, an certificate authority 1820 validates a merchant certificate and/or a result is returned. At 1808 the flow includes the service 1818 generating an ECDH secret (or public/private key pair) and encrypts cardholder data. The cardholder data is communicated to the merchant 1814 at 1808. At 1810, the encryption flow 1800 includes the merchant system validating the certificate. Further and at 1812, the encryption flow 1800 includes the merchant generating the ECDH secret and decrypts cardholder data.

Figure 19:
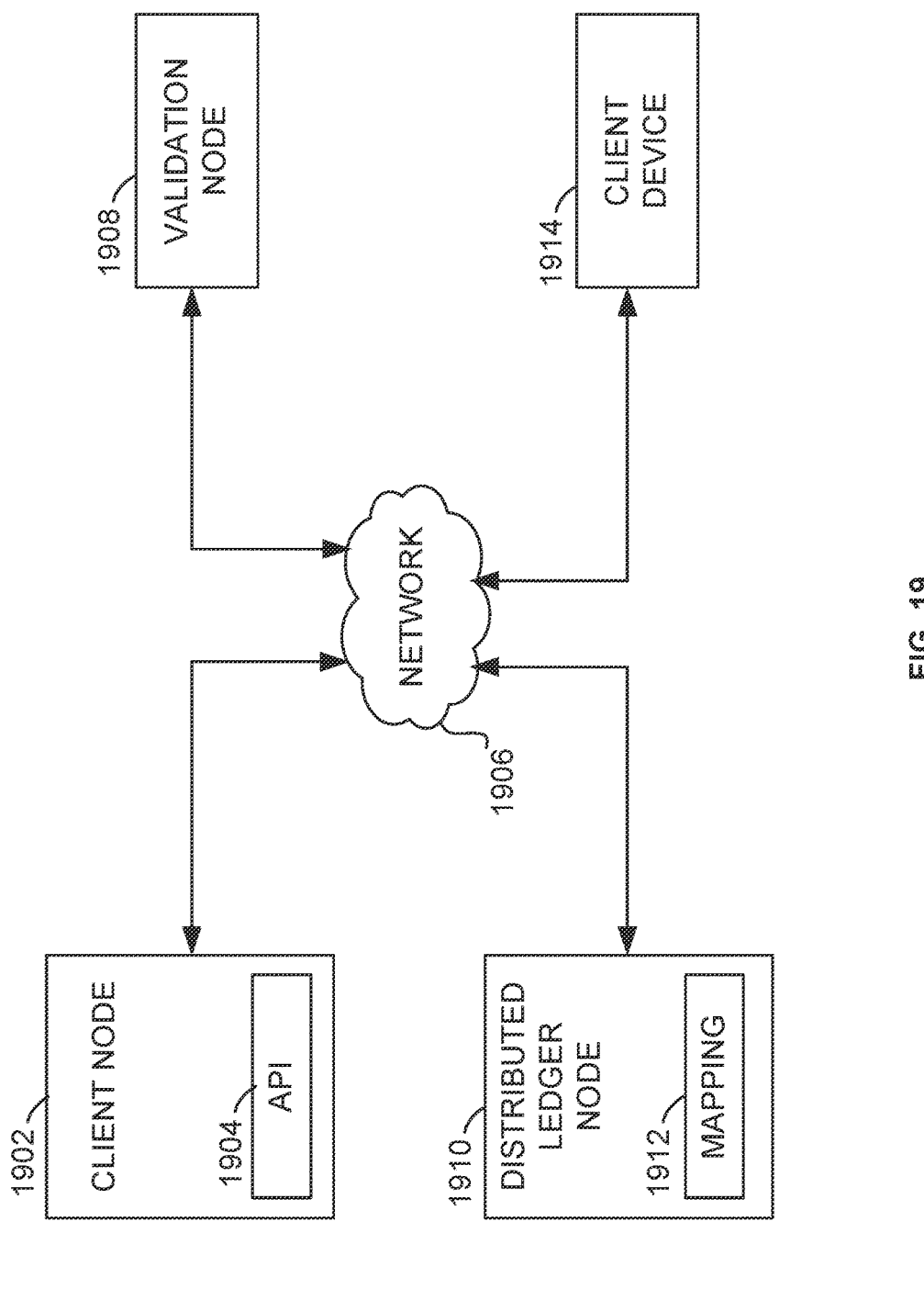
FIG. 19 illustrates an example of a system 1900 in accordance with embodiments.

FIG. 19 illustrates a distributed network authentication system 1900 according to an example embodiment. As further discussed below, system 1900 can include client node 1902, API 1904, network 1906, distributed ledger node 1910, mapping 1912, and client device 1914. Although FIG. 19 illustrates single instances of the components, system 1900 can include any number of components.

System 1900 can include a client node 1902, which can be a network-enabled computer as described herein. In some examples, client node 1902 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1900.

In some examples, client node 1902 can execute one or more applications, such as software applications, that enable, for example, network communications with one or more components of system 1900, transmit and/or receive data, and perform the functions and processes described herein.

The client node can contain an API 1904. For example, various different APIs can be provided for an application (e.g., executed on a computing device, such as a network-enabled computer) that can interact with a service. For example, an application executed on a device (e.g., a smart phone, smart watch, tablet, laptop, or other device) call interact with a web-based service by calling the API 1904 to interact with the service, such as by performing a remote call to an API for interacting with a web-based service.

API 1904 can be provided in the form of a library that includes specifications for routines, data structures, object classes, and variables. In some cases, such as for representational state transfer (REST) services, an API (e.g., a REST API or RESTful API, or an API that embodies some RESTful practices) is a specification of remote calls exposed to the API consumers (e.g., applications executed on a client computing device can be consumers of a REST API by performing remote calls to the REST API). REST services generally refer to a software architecture for coordinating components, connectors, and/or other elements, within a distributed system (e.g., a distributed hypermedia system).

Client node 1902 can communicate with one or more other components of system 1900 either directly or via network 1906. Network 1906 can comprise one or more of a wireless network, a wired network or any combination of wireless network and wired network, and may be configured to connect the components of system 1900. While FIG. 19 illustrates communication between the components of system 1900 through network 1906, it is understood that any component of system 1900 can communicate directly with another component of system 1900, e.g., without involving network 1906.

System 1900 can include a validation node 1908, which can be a network-enabled computer as described herein. In some examples, validation node 1908 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1900.

In some examples, validation node 1908 can execute one or more applications, such as software applications, that enable, for example, network communications with one or more components of system 1900, transmit and/or receive data, and perform the functions and processes described herein.

In some examples, each validation node can be associated with a routing number, and the routing number identifies the entity controlling the keys for the authentication namespace. The authentication namespace can be related to one or more of a particular entity, a particular set of cards, or a particular set of security keys (e.g., master keys, diversified keys, session keys) associated with an entity, a set of cards, or a type of cards.

System 1900 can include a distributed ledger node 1910, which can be a network-enabled computer as described herein. In some examples, distributed ledger node 1910 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1900.

In some examples, distributed ledger node 1910 can execute one or more applications, such as software applications, that enable, for example, network communications with one or more components of system 1900, transmit and/or receive data, and perform the functions and processes described herein.

Distributed ledger node 1910 can containing a mapping 1912. In some examples, mapping 1912 can be in the form of one or more databases. Exemplary databases can include, without limitation, relational databases, non-relational databases, hierarchical databases, object-oriented databases, network databases, and any combination thereof. The one or more databases can be centralized or distributed. The one or more databases can be hosted internally by any component of system 1900, or the one or more databases can be hosted externally to any component of the system 1900. In some examples, the one or more databases can be contained in the distributed ledger node 1910, and in other examples the one or more databases can be stored outside of distributed edger node 1910 but in data communication with distributed ledger node 1910. The one or more databases can be implemented in a database programming language. Exemplary database programming languages include, without limitation, Structured Query Language (SQL), MySQL, HyperText Markup Language, JavaScript, Hypertext Preprocessor Language, Practical Extraction and Report Language, Extensible Markup Language, and Common Gateway Interface. Queries made to the one or more databases can be implemented in the same database programming language used to implement the one or more databases. For example, if the one or more databases are an SQL database, then queries made to the database can be made in SQL (e.g., SELECT column1, column2 FROM table1, table2 WHERE column2='value';). It is understood that the one or more databases can be implemented in any database programming language and that the programming implementation of the query can be adjusted as necessary for compatibility with the one or more databases and to reflect the particular information to be queried.

In some examples, the one or more databases can be contained within distributed ledger node 1910. In other examples, the one or more databases can be remote from distributed ledger node 1910 but in data communication with distributed ledger node 1910. Data communication between the one or more databases and distributed ledger node 1910 can be a direct data communication or data communication via a network, such as the network 1906.

In some examples, client node 1902 can be in data communication with distributed ledger node 1910. Distributed ledger node 1910 can contain mapping 1912. Mapping 1914 may include, e.g., a mapping between a validation node address and the validation node 1908, a mapping between a routing number and a validation node address, and/or a mapping between a routing number and validation node 1908. In some examples, mapping 1912 can include a digital signature associated with an entity having permission to validate for a routing number. Based on one or more of these associations, client node 1902 can call validation node for validation and/or provide direction to the client device to reach the appropriate validation node. This can be accomplished by calling a validation API associated with validation node 1908.

In some examples, iterations of the mappings described herein, such as mapping 1912, can also include a software or applet version number. The version number can be used to identify a validation node or validation node address or choose between multiple validation addresses for one validation node.

In some examples, client node 1902 and distributed ledger node 1910 can be permissioned (e.g., allowed to join a network) with the aid of a certificate and/or a cryptographic authentication mechanism (e.g., a non-fungible token). The certificate and/or a cryptographic authentication mechanism may be issued by, e.g., a consortium authority or other administrative entity associated with the distributed network. If granted appropriate permissions, distributed ledger node 1910 can update mapping 1912 to reflect a different association between, e.g., a routing number, a validation node address, and a validation node. In some examples, degrees of permissions can be issued. For example, if client node 1902 were to function to route data to validation node 1908 (or other validation nodes), client node 1902 can be given a certain level of permissions. As another example, if distributed ledger node 1910 were to have the capability to update mapping 1912, distributed ledger node 1910 can have a different, higher level of permissions.

System 1900 can include a client device 1914, which can be a network-enabled computer as described herein. In some examples, distributed ledger node 1914 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1900. Client device 1914 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, client device 1914 can be in data communication with another network-enabled computer not shown in FIG. 19, such as a smart card (e.g., a contactless card or a contact-based card).

In some examples, client device 1914 can execute one or more applications, such as software applications, that enable, for example, network communications with one or more components of system 1900, transmit and/or receive data, and perform the functions and processes described herein.

In some examples, upon receipt of an authentication request, client device 1914 can call (e.g., via an API) client node 1902. The call can include a routing number and/or an applet or software version number, and client node 1902 can query distributed ledger node 1910 and mapping 1912. Once the query returns the identification of a validation node (e.g., validation node 1908) and/or a validation node address associated with that routing number and/or applet or software version, client node 1902 can reply to client device 1914. Client device 1914 can then proceed with authentication with the validation node. The authentication can be performed by, e.g., the systems and methods described herein, such as by the generation, encryption, transmission, decryption, and validation of a cryptogram as described herein.

In some examples, client node 1902 can be co-resident with validation node 1908. In these examples, client node 1902 can handle the authentication in a single call from client device 1914. In some examples, this can be acceptable only if it is permissible for the full authentication transmission (e.g., a cryptogram as described herein) to be sent to client nodes that are not involved in authentication.

In some examples, if client node 1902 receives, from client device 1914, a routing number that is not handled by its location, client node 1902 can return a code indicating that this routing number is not handled, along with validation node address for the responsible validation node. Client device 1914 can then send the full authentication transmission to validation node 1908 using the received validation node address.

In some examples, client node 1902 can enter the distributed network with different permissions. For example, client node 1902 can be a read-only router of data. As another example, client node 1902 can have permission to send messages to distributed ledger node 1910 updating one or more routing paths for one or more routing numbers. However, client node 1902 would be prevented from updating one or more routing paths for one or more routing numbers for other entities that control other routing numbers which are not associated with client node 1902 or that did not grant this permission. As another example, distributed ledger node 1910 can contain contracts and/or records that can validate the permission of a specific entity to change a specific routing record based on its digital signature. As another example, the consortium authority or other administrative entity controlling the distributed network can have additional privileges to, without limitation, add new members (e.g., client nodes, distributed ledger nodes, validation nodes, and/or client devices), add new signature credentials, add new keys, add new certifications, and also to revoke any of the foregoing. In some examples, the foregoing permissions can be delegated to client node 1902, distributed ledger node 1910, and/or validation node 1908, if security, legal, and/or financial conditions are met, however, delegation is not required.

In some examples, one or more APIs can facilitate communication between components of system 1900 via network 1906. In other examples, one or more APIs are not required. Rather, the components of system 1900 could be in direct communication and/or dedicated to one or more specified entities, to allow the specified entities to keep data from being transferred to, transferred from, or transferred via, non-specified entities. This may further promote data security and avoid detection of data traffic patterns by non-specified entities.

In some examples, entities could establish a standard for nodes having APIs based on the intended function of those nodes. For example, a first standard could be established for data routing nodes and a second standard could be established for nodes performing mapping and/or authentication functions. As another example, a routing API, a mapping API, and a validation API can be established, which can allow for the same device or hardware configuration to perform these functions. However, the use of keys, including secret keys by validation node 1908 for authentication, can require storage of the keys in one or more HSMs, to promote key security and ensure that the keys are never entered into memory.

FIG. 20 illustrates a method 2000 performed by a distributed network authentication system according to an example embodiment. For example, the method can be performed by distributed network authentication system 1800 and or by another distributed network authentication system.

In block 2002, a client device can transmit an authentication request to a client node. The authentication request can include, without limitation, a routing number, a software version number, and/or an applet version number. The request can be made by an API call or other communication between the client device and the client node.

In block 2004, after receiving the authentication request, the client node can transmit a query (e.g., via an API call) to a distributed ledger node. The distributed ledger node contains a mapping, and the distributed ledger node can submit the query to the mapping.

In block 2006, the query can return an identification of a validation node and/or a validation node address, and the distributed ledger node can transmit this identification to the client node.

In block 2008, the client node can transmit the identification to the client device. After receiving the identification, the client device can proceed with authentication with the identified validation node and/or validation node address, in block 2010.

FIG. 21 illustrates a routine 2100 for card personalization according to an example embodiment. For example, the routine 2100 can be performed by the devices and systems described herein, including without limitation the issuer system 802 and the personalization system 804.

In block 2102, the contactless card 102 can be initially provisioned with one or more applets stored in memory in at least one selected from the group of a dormant state, a deactivated state, a locked state, and a versioning state (e.g., a first version state or a second version state). The one or more applets can be configured for the performance of specific functions. For example, a first applet of the one or more applets can be configured to conduct payment transactions, such as EMV transactions. As another example, a second applet of the one or more applets can be configured to perform authentication operations, such as the authentication operations described herein. The one or more applets are provisioned in a dormant state in advance of an agreement with a card issuing entity to activate or otherwise commence transactions.

In block 2104, the contactless card 102 can be further provisioned with a unique identifier, such as pUID 610.

In block 2106, the identity of a user to be associated with the contactless card can be verified. In embodiments, the identity of a user can be verified by the users of a login credentials (e.g., a username and password), one-time passcode, text message, pop-up notification, or biometric input. The user can interact with a device, such as a mobile device, POS terminal, or a personal computer, to verify the identity.

In block 2108, upon a successful verification, the first applet can be activated or otherwise change state. Once it is activated or its state is changed, the first applet can no longer be in a dormant state, a deactivated state, a locked state, and/or a first version state. Instead, the first applet can be in a non-dormant state, an activated state, an unlocked state, and/or a second version state. The first applet can then conduct payment transactions.

In block 2110, upon a successful verification, the second applet an be activated or otherwise change state. Once it is activated or its state is changed, the second applet can no longer be in a dormant state, a deactivated state, a locked state, and/or a first version state. Instead, once activated, the second applet can be in a non-dormant state, an activated state, an unlocked state, and/or a second version state. The second applet can then perform authentication operations.

In embodiments, the routine 2100 can be performed at card activation and/or at the first use of the card. Once activated, the first applet and the second applet can perform payment transactions and authentication operations, respectively and communicate with each other. The first applet and second applet can also communicate externally to identify the contactless card.

The systems and methods described herein can provide additional improvements to data security, authentication, and validation. For example, the use of a bespoke NFC specification can promote performance and simplify the NFC protocol. The use of a signed hash of the card product customer identifier can simplify policy decision, which may enable confirmation that an instance owned by the appropriate customer without a mapping file relating identifiers (e.g., unique identification numbers) to customer numbers. The use of a centralized validator, such as keys in a hub, may enable light touch deployment models for issuing entities (e.g., for a pilot). In addition, the use of generic cryptography (e.g., root of trust) may enable deployment on general purpose cloud hardware security modules (HSMs).

Figure 22:
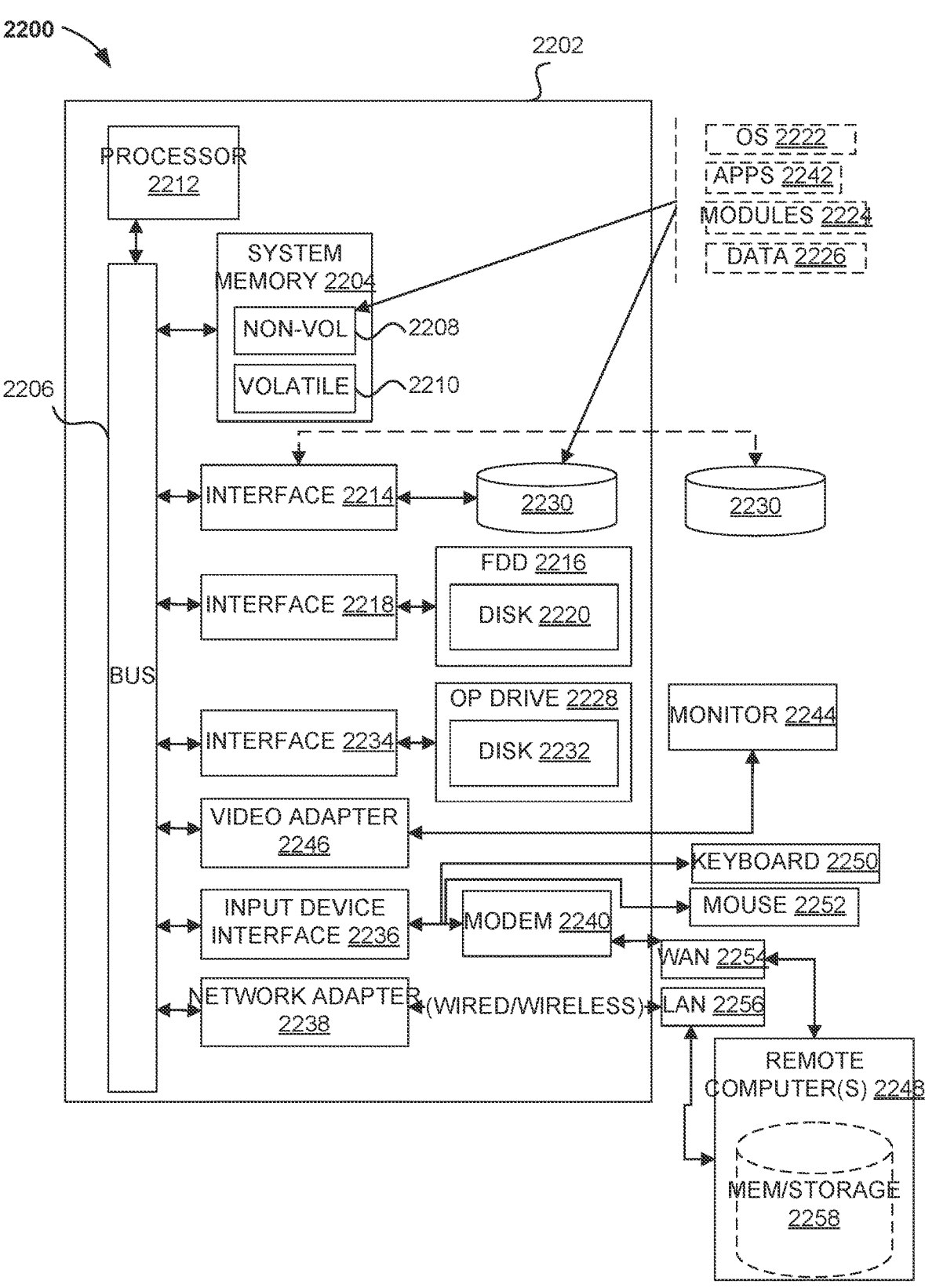
FIG. 22 illustrates an example of a computer architecture 2200 in accordance with embodiments.

FIG. 22 illustrates an embodiment of an exemplary computer architecture 2200 suitable for implementing various embodiments as previously described. In one embodiment, the computer architecture 2200 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2200.

As shown in FIG. 22, the computing architecture 200 includes a processor 2212, a system memory 2204 and a system bus 2206. The processor 2212 can be any of various commercially available processors.

The system bus 2206 provides an interface for system components including, but not limited to, the system memory 2204 to the processor 2212. The system bus 2206 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2200 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 22, the system memory 2204 can include non-volatile 2208 and/or volatile 2210. A basic input/output system (BIOS) can be stored in the non-volatile 2208.

The computer 2202 may include various types of computer-readable storage media in the form of one or more lower speed memory units, including an internal (or external) hard disk drive 2230, a magnetic disk drive 2216 to read from or write to a removable magnetic disk 2220, and an optical disk drive 2228 to read from or write to a removable optical disk 2232 (e.g., a CD-ROM or DVD). The hard disk drive 2230, magnetic disk drive 2216 and optical disk drive 2228 can be connected to system bus 2206 the by an HDD interface 2214, and FDD interface 2218 and an optical disk drive interface 2234, respectively. The HDD interface 2214 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 2208, and volatile 2210, including an operating system 2222, one or more applications 2242, other program modules 2224, and program data 2226. In one embodiment, the one or more applications 2242, other program modules 2224, and program data 2226 can include, for example, the various applications and/or components of the systems discussed herein.

A user can enter commands and information into the computer 2202 through one or more wire/wireless input devices, for example, a keyboard 2250 and a pointing device, such as a mouse 2252. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 2212 through an input device interface 2236 that is coupled to the system bus 2206 but can be connected by other interfaces such as a parallel port, IEEE 1394 serial port, a game port, a USB port, an IR interface, and so forth.

A monitor 2244 or other type of display device is also connected to the system bus 2206 via an interface, such as a video adapter 2246. The monitor 2244 may be internal or external to the computer 2202. In addition to the monitor 2244, a computer typically includes other peripheral output devices, such as speakers, printers, and so forth.

The computer 2202 may operate in a networked environment using logical connections via wire and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all the elements described relative to the computer 2202, although, for purposes of brevity, only a memory and/or storage device 2258 is illustrated. The logical connections depicted include wire/wireless connectivity to a local area network 2256 and/or larger networks, for example, a wide area network 2254. Such LAN and WAN networking environments are commonplace in offices and companies, and facilitate enterprise-wide computer networks, such as intranets, all of which may connect to a global communications network, for example, the Internet.

When used in a local area network 2256 networking environment, the computer 2202 is connected to the local area network 2256 through a wire and/or wireless communication network interface or network adapter 2238. The network adapter 2238 can facilitate wire and/or wireless communications to the local area network 2256, which may also include a wireless access point disposed thereon for communicating with the wireless functionality of the network adapter 2238.

When used in a wide area network 2254 networking environment, the computer 2202 can include a modem 2240, or is connected to a communications server on the wide area network 2254 or has other means for establishing communications over the wide area network 2254, such as by way of the Internet. The modem 2240, which can be internal or external and a wire and/or wireless device, connects to the system bus 2206 via the input device interface 2236. In a networked environment, program modules depicted relative to the computer 2202, or portions thereof, can be stored in the remote memory and/or storage device 2258. It will be appreciated that the network connections shown are exemplary and other means of establishing a communications link between the computers can be used.

The computer 2202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 23:
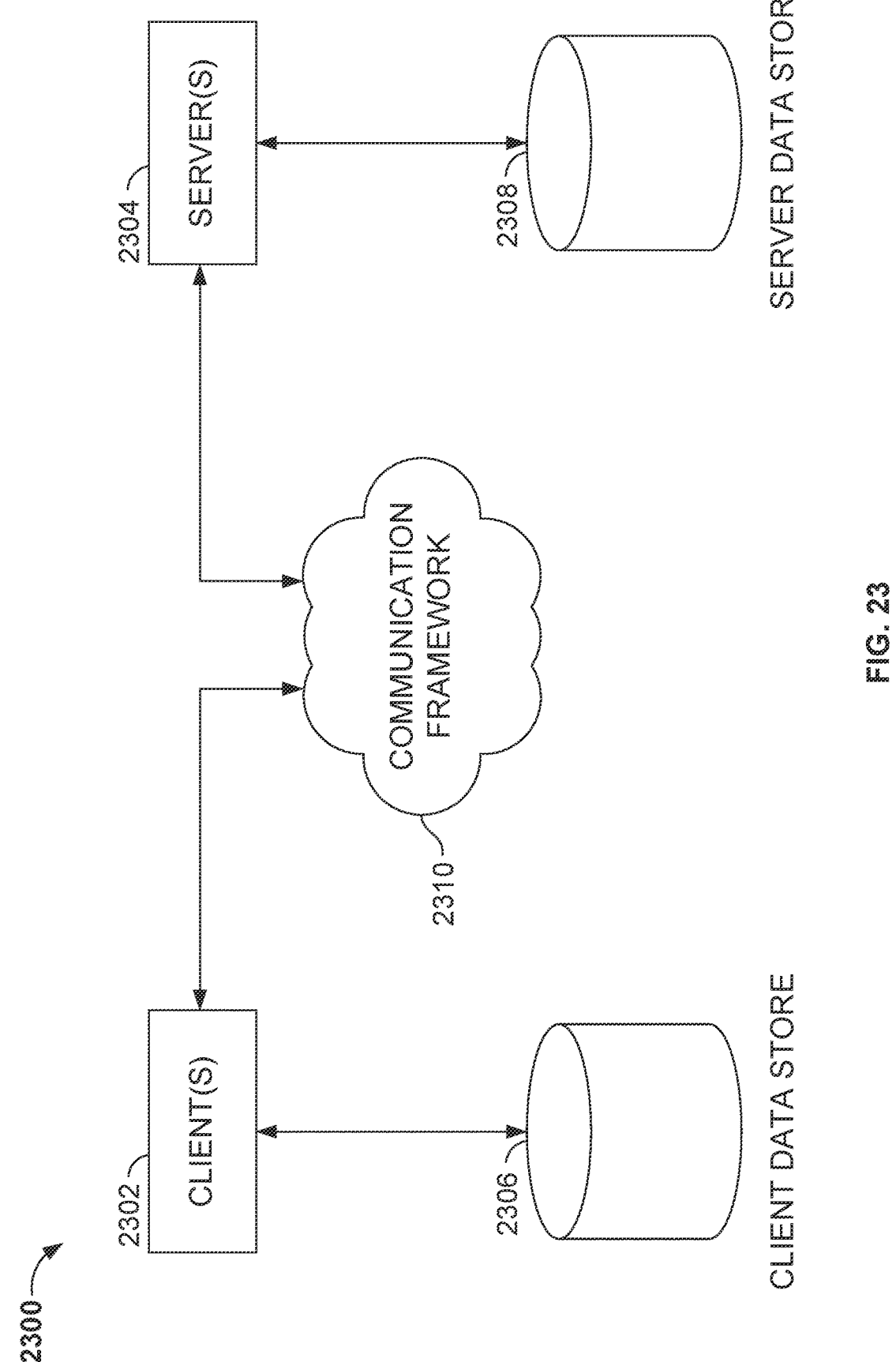
FIG. 23 illustrates an example of a communications architecture 2300 in accordance with embodiments.

FIG. 23 is a block diagram depicting an exemplary communications architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300, which may be consistent with systems and devices discussed herein.

As shown in FIG. 23, the communications architecture 2300 includes one or more client(s) 2302 and server(s) 2304. The server(s) 2304 may implement one or more functions and embodiments discussed herein. The client(s) 2302 and the server(s) 2304 are operatively connected to one or more respective client data store 2306 and server data store 2308 that can be employed to store information local to the respective client(s) 2302 and server(s) 2304, such as cookies and/or associated contextual information.

The client(s) 2302 and the server(s) 2304 may communicate information between each other using a communication framework 2310. The communication framework 2310 may implement any well-known communications techniques and protocols. The communication framework 2310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2310 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 2302 and the server(s) 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

In some aspects, the techniques described herein relate to a computer-implemented method, including: reading, by a computing apparatus after entry of a contactless card into a communication field, the contactless card; selecting, by the computing apparatus based on the read of the contactless card, an applet stored in a memory of the contactless card; transmitting, by the computing apparatus to the contactless card, a first command; and transmitting, by the computing apparatus to the contactless card, a second command.

In some aspects, the techniques described herein relate to a computer-implemented method, wherein the first command includes a custom command.

In some aspects, the techniques described herein relate to a computer-implemented method, wherein the custom command includes a command to update a file stored by the contactless card to include a nonce.

In some aspects, the techniques described herein relate to a computer-implemented method, wherein the custom command includes a command to change a state of the applet.

In some aspects, the techniques described herein relate to a computer-implemented method, wherein the custom command includes at least one selected from the group of a command to change a format of a message stored on the contactless card and a command to change a format of a message generated by the contactless card.

In some aspects, the techniques described herein relate to a computer-implemented method, wherein the custom command includes at least one selected from the group of a command to change a parameter used for a calculation performed by the contactless card and a command to transmit a certificate.

In some aspects, the techniques described herein relate to a computer-implemented method, wherein the custom command includes at least one selected from the group of, a command to change a form of authentication operation used by the contactless card.

In some aspects, the techniques described herein relate to a computer-implemented method, wherein the form of authentication includes at least one selected from the group of a cryptographic message authentication code (MAC) operation, and a signed message with a public key certificate.

In some aspects, the techniques described herein relate to a computer-implemented method, wherein the second command includes a command for the contactless card to calculate a cryptogram.

In some aspects, the techniques described herein relate to a computer-implemented method, wherein the calculation of the cryptogram utilizes the nonce.

In some aspects, the techniques described herein relate to a computing system, including: a computing apparatus including a processor and a memory, wherein the memory stores instructions that, when executed by the processor, cause the processor to: read, after entry of a contactless card into the communication field, the contactless card, select, based on the read of the contactless card, an applet stored in a memory of the contactless card, transmit, to the contactless card, a first command, and transmit, to the contactless card, a second command.

In some aspects, the techniques described herein relate to a computing system, wherein the first command includes a command to update a file stored by the contactless card to include a nonce.

In some aspects, the techniques described herein relate to a computing system, wherein the second command includes a command for the contactless card to calculate a cryptogram.

In some aspects, the techniques described herein relate to a computing system, further including: the contactless card, wherein the contactless card calculates the cryptogram using the nonce value.

In some aspects, the techniques described herein relate to a computing system, wherein: the instructions further cause the processor to read a capabilities container stored in the memory of the contactless card, and the capabilities container is associated with the selected applet.

In some aspects, the techniques described herein relate to a computing system, wherein the read of the capabilities container collects information including at least one selected from the group of a size of the capabilities container and a number of files stored in the capabilities container.

In some aspects, the techniques described herein relate to a computing system, wherein the information further includes at least one selected from the group of file sizes of files stored in the capabilities container, file names of files stored in the capabilities container, a read status of files stored in the capabilities container, and a write status of files stored in the capabilities container.

In some aspects, the techniques described herein relate to a non-transitory computer-readable storage medium, the computer-readable storage medium storing instructions that, when executed by a computing apparatus, cause the computing apparatus to perform procedures including: reading the contactless card; selecting, based on the read of the contactless card, an applet stored in a memory of the contactless card; transmitting, to the contactless card, a first command; and transmitting, to the contactless card, a second command.

In some aspects, the techniques described herein relate to a non-transitory computer-readable storage medium, wherein the first command includes a command to update a file stored by the contactless card to include a nonce.

In some aspects, the techniques described herein relate to a non-transitory computer-readable storage medium, wherein the second command includes a command for the contactless card to calculate a cryptogram using the nonce.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Steps described herein need not be performed in the same sequence discussed or with the same degree of separation. Likewise various steps may be omitted, repeated, or combined, as necessary, to achieve the same or similar objectives. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A computer-implemented method, comprising:
reading, by a computing apparatus after entry of a contactless card into a communication field, the contactless card;
selecting, by the computing apparatus based on the read of the contactless card, an applet stored in a memory of the contactless card;
transmitting, by the computing apparatus to the contactless card, a first command, wherein the first command comprises a custom command;
transmitting, by the computing apparatus to the contactless card, a second command;
receiving, by the computing apparatus from the contactless card, a message based upon at least one selected from the group of the first command and the second command, the message comprising encrypted data and an issuer identifier, the issuer identifier associated with an issuer of the contactless card; and
sending, by the computing apparatus to a switchboard node, the received message.

2. The computer-implemented method of claim 1, wherein the custom command comprises a command to update a file stored by the contactless card to include a nonce.

3. The computer-implemented method of claim 1, wherein:
the custom command comprises a command to change a state of the applet, and
the change of state of the applet comprises at least one selected from the group of a change from a dormant state to an active state, a change from a locked state to an unlocked state, and a change from a deactivated state to an activated state.

4. The computer-implemented method of claim 1, wherein the custom command comprises at least one selected from the group of a command to change a format of a message stored on the contactless card and a command to change a format of a message generated by the contactless card.

5. The computer-implemented method of claim 1, wherein the custom command comprises at least one selected from the group of a command to change a parameter used for a calculation performed by the contactless card and a command to transmit a certificate.

6. The computer-implemented method of claim 1, wherein the custom command comprises at least one selected from the group of a command to change a form of authentication operation used by the contactless card.

7. The computer-implemented method of claim 6, wherein the form of authentication comprises at least one selected from the group of a cryptographic message authentication code (MAC) operation, and a signed message with a public key certificate.

8. The computer-implemented method of claim 1, wherein the second command comprises a command for the contactless card to calculate a cryptogram.

9. The computer-implemented method of claim 8, wherein the custom command comprises a command to update a file stored by the contactless card to include a nonce, wherein the calculation of the cryptogram utilizes the nonce.

10. A computing system, comprising:
a computing apparatus comprising a processor and a memory,
wherein the memory stores instructions that, when executed by the processor, cause the processor to:
read, after entry of a contactless card into a communication field, the contactless card,
select, based on the read of the contactless card, an applet stored in a memory of the contactless card,
transmit, to the contactless card, a first command, wherein the first command comprises a custom command,
transmit, to the contactless card, a second command,
receive, from the contactless card, a message based upon at least one selected from the group the the first command and the second command, the message comprising encrypted data and an issuer identifier, the issuer identifier associated with an issuer of the contactless card; and
send, to a switchboard node, the received message.

11. The computing system of claim 10, wherein the first command comprises a command to update a file stored by the contactless card to include a nonce.

12. The computing system of claim 10, wherein the second command comprises a command for the contactless card to calculate a cryptogram.

13. The computing system of claim 12, further comprising:
the contactless card,
wherein the contactless card calculates the cryptogram using the nonce.

14. The computing system of claim 10, wherein:
the instructions further cause the processor to read a capabilities container stored in the memory of the contactless card, and
the capabilities container is associated with the selected applet.

15. The computing system of claim 14, wherein the read of the capabilities container collects information comprising at least one selected from the group of a size of the capabilities container and a number of files stored in the capabilities container.

16. The computing system of claim 15, wherein the information further comprises at least one selected from the group of file sizes of files stored in the capabilities container, file names of files stored in the capabilities container, a read status of files stored in the capabilities container, and a write status of files stored in the capabilities container.

17. A non-transitory computer-readable storage medium, the computer-readable storage medium storing instructions that, when executed by a computing apparatus, cause the computing apparatus to perform procedures comprising:
reading a contactless card;
selecting, based on the read of the contactless card, an applet stored in a memory of the contactless card;
transmitting, to the contactless card, a first command, wherein the first command comprises a custom command;
transmitting, to the contactless card, a second command;
receiving, from the contactless card, a message based upon at least one selected from the group of the first command and the second command, the message comprising encrypted data and an issuer identifier, the issuer identifier associated with an issuer of the contactless card; and
sending, to a switchboad node, the received message.

18. The non-transitory computer-readable storage medium of claim 17, wherein the first command comprises a command to update a file stored by the contactless card to include a nonce.

19. The non-transitory computer-readable storage medium of claim 18, wherein the second command comprises a command for the contactless card to calculate a cryptogram using the nonce.

20. The computer-implemented method of claim 1, wherein:
the message is formatted to include an issuer identifier field, and
the issued identifier is in the issuer identifier field.

* * * * *